US011601719B2

(12) United States Patent
Gao et al.

(10) Patent No.: US 11,601,719 B2
(45) Date of Patent: Mar. 7, 2023

(54) METHOD FOR PROCESSING TELEVISION SCREENSHOT, SMART TELEVISION, AND STORAGE MEDIUM

(71) Applicant: JUHAOKAN TECHNOLOGY CO., LTD., Qingdao (CN)

(72) Inventors: Sitai Gao, Qingdao (CN); Zhitao Yu, Qingdao (CN); Shan Zhou, Qingdao (CN)

(73) Assignee: JUHAOKAN TECHNOLOGY CO., LTD., Qingdao (CN)

( * ) Notice: Subject to any disclaimer, the term of this patent is extended or adjusted under 35 U.S.C. 154(b) by 114 days.

(21) Appl. No.: 16/905,332

(22) Filed: Jun. 18, 2020

(65) Prior Publication Data

US 2020/0322689 A1     Oct. 8, 2020

Related U.S. Application Data

(63) Continuation of application No. PCT/CN2018/096528, filed on Jul. 20, 2018.

(30) Foreign Application Priority Data

Dec. 20, 2017  (CN) .......................... 201711381674.0

(51) Int. Cl.
*H04N 21/431*      (2011.01)
*H04N 21/472*      (2011.01)
(Continued)

(52) U.S. Cl.
CPC ..... *H04N 21/47205* (2013.01); *G06F 3/1454* (2013.01); *H04N 21/4312* (2013.01);
(Continued)

(58) Field of Classification Search
CPC ......... H04N 21/47205; H04N 21/4312; H04N 21/4532; H04N 21/643; G06F 3/1454; G06K 7/1417; G06K 19/06037
(Continued)

(56) References Cited

U.S. PATENT DOCUMENTS 7,231,419 B1    6/2007  Gheorghe et al.
9,635,195 B1    4/2017  Green et al.
(Continued)

FOREIGN PATENT DOCUMENTS

CN    101535927 A    9/2009
CN    101853299 A    10/2010
(Continued)

OTHER PUBLICATIONS

Office Action from Chinese Application No. 201711381674.0 dated Feb. 28, 2019 (6 pages).
(Continued)

*Primary Examiner* — Alfonso Castro
(74) *Attorney, Agent, or Firm* — Workman Nydegger

(57) ABSTRACT

The present invention relates to the technical field of televisions, and provides a method for processing a television screenshot, a smart television, and a storage medium. To meet the demands of a more intuitive user interface and a seamless user interaction function, multiple sets of optional bars are displayed while displaying current playback content on a display screen in response to an input screenshot operation instruction, wherein optional bars are respectively used for displaying a picture thumbnail of a screenshot, recognizing content-related recommended content on the basis of an image of the screenshot, and/or responding to a user control instruction input interface for an operation associated with the screenshot.

16 Claims, 35 Drawing Sheets

(51) Int. Cl.
  *G06F 3/14* (2006.01)
  *H04N 21/45* (2011.01)
  *H04N 21/643* (2011.01)
  *G06K 7/14* (2006.01)
  *G06K 19/06* (2006.01)

(52) U.S. Cl.
  CPC ....... *H04N 21/4532* (2013.01); *H04N 21/643* (2013.01); *G06K 7/1417* (2013.01); *G06K 19/06037* (2013.01)

(58) Field of Classification Search
  USPC .......................................................... 725/37
  See application file for complete search history.

(56) References Cited

U.S. PATENT DOCUMENTS

| | | | |
|---|---|---|---|
| 2008/0066135 A1 | 3/2008 | Brodersen et al. | |
| 2011/0282906 A1 | 11/2011 | Wong | |
| 2013/0098982 A1* | 4/2013 | Adams | H04N 21/41265 235/375 |
| 2014/0168117 A1* | 6/2014 | Kim | H04M 1/6505 345/173 |
| 2015/0296250 A1* | 10/2015 | Casper | G06Q 30/0267 725/34 |
| 2016/0182948 A1* | 6/2016 | Shang | H04N 21/4383 725/41 |
| 2016/0269675 A1* | 9/2016 | Tsujimoto | H04N 9/8233 |
| 2016/0299911 A1 | 10/2016 | Grigoreva et al. | |
| 2017/0235768 A1* | 8/2017 | Amrutkar | G06F 16/70 707/722 |
| 2017/0289643 A1 | 10/2017 | Kachkova et al. | |
| 2019/0065032 A1* | 2/2019 | Lin | G06F 16/9535 |
| 2019/0354601 A1 | 11/2019 | dePaz et al. | |
| 2019/0354603 A1 | 11/2019 | Selim et al. | |
| 2019/0354608 A1 | 11/2019 | dePaz et al. | |
| 2019/0356949 A1 | 11/2019 | dePaz et al. | |
| 2019/0356951 A1 | 11/2019 | Selim et al. | |
| 2019/0356952 A1 | 11/2019 | Leung et al. | |
| 2020/0106984 A1 | 4/2020 | Fu et al. | |
| 2020/0275048 A1 | 8/2020 | Fu et al. | |

FOREIGN PATENT DOCUMENTS

| | | |
|---|---|---|
| CN | 102938861 A | 2/2013 |
| CN | 103185538 A | 7/2013 |
| CN | 103186538 A | 7/2013 |
| CN | 103198424 A | 7/2013 |
| CN | 103248943 A | 8/2013 |
| CN | 103428571 A | 12/2013 |
| CN | 103647989 A | 3/2014 |
| CN | 103828388 A | 5/2014 |
| CN | 104572804 A | 4/2015 |
| CN | 104699800 A | 6/2015 |
| CN | 104881287 A | 9/2015 |
| CN | 105373552 A | 3/2016 |
| CN | 105792010 A | 7/2016 |
| CN | 105959740 A | 9/2016 |
| CN | 105979382 A | 9/2016 |
| CN | 106294770 A | 1/2017 |
| CN | 106604089 A | 4/2017 |
| CN | 106708823 A | 5/2017 |
| CN | 106921876 A | 7/2017 |
| CN | 107105340 A | 8/2017 |
| CN | 107315844 A | 11/2017 |
| CN | 107371066 A | 11/2017 |
| CN | 107480236 A | 12/2017 |
| CN | 107888985 A | 4/2018 |
| CN | 108055589 A | 5/2018 |
| CN | 108156552 A | 6/2018 |
| CN | 108259973 A | 7/2018 |
| CN | 108289236 A | 7/2018 |
| CN | 108322806 A | 7/2018 |
| CN | 108416018 A | 8/2018 |
| CN | 109168069 A | 1/2019 |
| CN | 109271983 A | 1/2019 |
| CN | 109388461 A | 2/2019 |
| CN | 109922363 A | 6/2019 |
| EP | 3188107 A1 | 7/2017 |
| WO | WO-2019120008 A1 | 6/2019 |
| WO | WO-2020063095 A1 | 4/2020 |

OTHER PUBLICATIONS

Office Action from Chinese Application No. 201711381674.0 dated Mar. 4, 2020 (10 pages).
Office Action from Chinese Application No. 201711381674.0 dated Sep. 4, 2019 (4 pages).
Office Action from Chinese Application No. 201711381674.0 dated Sep. 2, 2020 (5 pages).
Office Action from Chinese Application No. 201811244228.X dated Jul. 2, 2020 (9 pages).
International Search Report for PCT Application No. PCT/CN2019/098446 dated Nov. 1, 2019 (4 pages).
International Search Report from PCT Application No. PCT/CN2019/099631 dated Nov. 13, 2019 (4 pages).
Office Action from Chinese Application No. 201810141211.5 dated Apr. 23, 2019 (8 pages).
Office Action from Chinese Application No. 201810141211.5 dated Jan. 9, 2020 (5 pages).
Office Action from Chinese Application No. 201810141949.1 dated Apr. 23, 2019 (8 pages).
Office Action from Chinese Application No. 201810141968.4 dated Apr. 23, 2019 (8 pages).
Office Action from Chinese Application No. 201810141968.4 dated Jan. 9, 2020 (5 pages).
Extended European Search Report from European Application No. 18892605.9 dated Aug. 25, 2020 (9 pages).
International Search Report from PCT Application No. PCT/CN2018/115482 dated Feb. 14, 2019 (6 pages).

* cited by examiner

METHOD FOR PROCESSING TELEVISION SCREENSHOT, SMART TELEVISION, AND STORAGE MEDIUM

CROSS-REFERENCE TO RELATED APPLICATIONS

This application is a continuation of International Application No. PCT/CN2018/096528 filed Jul. 20, 2018, which claims priority to Chinese Patent Application No. 201711381674.0 filed Dec. 20, 2017. The entire disclosures of the above applications are incorporated herein by reference.

FIELD

The present disclosure relates to a display receiving terminal, and more particularly relates to a method for processing television screen shot, smart television and storage medium.

BACKGROUND

This section provides background information related to the present disclosure which is not necessarily prior art.

A smart television generally focuses on an online interactive media, an Internet television and an on-demand streaming media, instead of a traditional broadcast media, and it can provide users with sufficient content and services, and TV manufacturers are committed to developing various functions that are easy for use by users to enhance the use experience of a product.

Thus, it is particularly important to provide existing smart TVs with simpler and more intuitive features, and to seamlessly connect user interfaces and visual content links according to user habits to browse and/or perform various functions of smart television.

SUMMARY

This section provides a general summary of the disclosure, and is not a comprehensive disclosure of its full scope or all of its features.

The present disclosure provides a smart television to meet requirements for a more intuitive user interface and a seamless user interaction function. This content describes these improvement function demands through all its aspects, examples and/or configurations. In addition, although this content is described according to exemplary examples, it should be understood that claims can be made respectively to all the aspects of the present disclosure. This content can provide many advantages which are determined specifically according to specific aspects, examples and/or configurations.

First of all, the present disclosure provides a smart television, including: a display; a memory; and a processor in communication with the memory and the display. The processor is configured to: in response to an input instruction for capturing a screen shot, display a set of option bars while displaying the currently-played content on the display screen, wherein the option bars are used to display an image thumbnail of the screen shot and content-related recommended items identified on the basis of the image of the screen shot, and/or user input interfaces for operations in association with the screen shot.

In some embodiments, the recommended items include keywords matched with corresponding content identified on the basis of the image of the screen shot, recommended descriptions related to the keywords, and/or sources or types of the items.

In some embodiments, the option bar is associated with a service or application corresponding to a silo according to its content. The content of the option bar is selected to activate the service or application.

In some embodiments, the application is any one of a webpage application, a video application, a TV program application and a shopping application.

In some embodiments, the service is any one of a webpage application, a video application, a TV program application and a shopping application.

In some embodiments, the webpage is any one of a text content recommendation, a video on demand recommendation, a shopping webpage link and an application recommendation.

Secondly, the present disclosure provides a method for displaying a graphical user interface of a television screen shot. The method includes: in response to an input instruction for capturing a screen shot, displaying a set of option bars while displaying the currently-played content on the display screen, wherein the option bars are used to display an image thumbnail of the screen shots and content-related recommended items identified on the basis of the image of the screen shot, and/or user input interfaces for operations in association with the screen shot.

In some embodiments, the recommended items include keywords matched with corresponding content identified on the basis of the image of the screen shot, recommended descriptions related to the keywords, and/or sources or types of the items.

In some embodiments, the option bar is associated with a service or application corresponding to a silo according to its content. The content of the option bar is selected to activate the service or application.

In some embodiments, the application is any one of a webpage application, a video application, a TV program application and a shopping application.

In some embodiments, the service is any one of a webpage application, a video application, a TV program application and a shopping application.

In some embodiments, the webpage is any one of a text content recommendation, a video on demand recommendation, a shopping webpage link and an application recommendation is available.

Thirdly, the present disclosure provides a smart television, including a display; a memory; and a processor in communication with the memory and the display. The processor is configured to: in response to an input instruction for capturing a screen shot, display a graphical user interface that includes a currently-played content display layer and a screen shot content display layer on the display. The screen shot content display layer includes a screen shot display bar configured to display an image acquired from a current screen shot, a screen shot sharing instruction bar, and a display bar for QR code information generated from the screen shot.

In some embodiments, the screen shot sharing instruction bar is configured to share the screen shot to a terminal connected with the smart television.

In some embodiments, the processor is configured to execute the computer instructions stored in the memory to generate a QR code information corresponding to the screen shot, and synchronously upload the QR code information and the screen shot to a third-party server.

In some embodiments, the processor is configured to execute the computer instructions stored in the memory to: in response to an input instruction for sharing the screen shot, when it is determined that the terminal with which the television established connection is not connected with the smart television, the QR code information of the screen shot image is output, so that the terminal can scan the QR code information to acquire the screen shot image from the third-party server.

In some embodiments, the processor is configured to execute the computer instructions stored in the memory to: in response to an instruction for sharing the screen shot, when it is determined that the terminal connected with which the television established connection is connected with the smart television, the screen shot is transmitted to the terminal according to a transmission protocol between the terminal and the smart television.

Fourthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a screen shot display bar configured to display an image acquired from a current screen shot, and a plurality of option bars for indicating inputting control instructions in association with the screen shot for a user.

In some embodiments, the method further includes: in response to an instruction for selecting a screen shot image, displaying images acquired from a plurality of continuous screen shots. In response to a selection of an image among the images, the selected screen shot image is stored in a preset image storage region.

In some embodiments, the method further includes: in response to a control instruction for sharing a screen shot, when it is determined that the television device is connected with an electronic terminal through a network, the television device sends information that indicates a screen shot is available for push to the electronic terminal.

In response to an instruction that the electronic terminal is acknowledged to receive the screen shot, the television device sends the screen shot to the terminal.

In some embodiments, the method further includes: generating a QR code information of the screen shot, and uploading the screen shot and QR code information synchronously to the server.

In some embodiments, the method further includes: in response to a control instruction for sharing a screen shot, when it is determined that the television device is not connected with a terminal through a network, the television device displays QR code information of the screen shot image, so that the terminal connected with the television device gets the screen shot image from a server through scanning the QR code information.

Fifthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars for displaying an image acquired from a current screen shot, and a webpage recommended text and/or images related to the content identified on the basis of the image of the screen shot.

In some embodiments, the content displayed by the option bars of webpage recommendations includes an identifier of a search source, a description of the recommended text and/or images, and/or a subject or keyword of a search result.

In some embodiments, the method further includes: in response to a selection for an option bar among the option bars of webpage recommendations from a user, one or more information windows float above of the screen shot content display layer. The information window is configured to display detailed content of the selected option bar.

In some embodiments, the method further includes: in response to a selection for an option bar among the option bars of webpage recommendations from a user, a plurality of information windows float above the screen shot content display layer. The plurality of information windows are configured to display a plurality of different pieces of webpage information.

In some embodiments, the method further includes: in response to a user's selection for an information window among the information windows, an information child window floats on the plurality of information windows, and the child window is configured to display detailed content of the selected information window.

Sixthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars used to display webpage recommendation profiles related to the content identified on the basis of the image of screen shot.

In some embodiments, the webpage recommendation profiles include texts and/or images.

In some embodiments, the method further includes: in response to a user's selection for an option bar among the option bars, at least one information window floats above the screen shot content display layer. The information window is configured to display detailed content of the selected option bar.

In some embodiments, the content displayed in the information window contains a website bar that indicates a content source, a related keyword bar, an entry detail bar, and/or an album bar for recommending related pictures.

In some embodiments, the entry detail bar includes a keyword overview, basic information and a text.

Seventhly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars, at least one of which is configured to display a program guide of TV program channels identified on the basis of the image of the screen shot.

In some embodiments, the content displayed in the program guide option bar includes: names or TV station logos that mark TV program channels, and a thumbnail image of the program guide.

In some embodiments, the method further includes: in response to a user's selection of the program guide option bar, at least one information window floats above the screen shot content display layer. The information window is configured to display a detailed list of the program guide.

In some embodiments, at least one program in the detailed list of the program guide include an icon for scheduling programs. In response to a selection on the icon, a program is scheduled.

In some embodiments, the method further includes: in response to a user's selection for a program in the detailed list, the video on demand application is activated, and the presentation of the information window is updated or a child information window is displayed overlaying on the information window, so as to present available previous or related episodes of the selected program on the video on demand application.

In some embodiments, the method further includes: in response to a user's selection for a program among the previous or related episodes, the currently-played content display layer is switched to play the selected program from the video on demand.

Eighthly, the present disclosure provides a method for displaying a graphical user interface of a television screen shot. The method includes: in response to an input instruction for capturing a screen shot, displaying a graphical user interface on a display which includes a currently-played content display layer and a screen shot content display layer. The screen shot content display layer includes a plurality of option bars, at least one of which is configured to display related video recommendations of TV programs identified on the basis of the image of the screen shot.

In some embodiments, the content displayed in the option bar for video recommendation includes: names of videos, and content profile image of the videos.

In some embodiments, the method further includes: in response to a user's selection for an option bar for video recommendation, at least one information window is displayed. The information window is configured to display a detailed introduction of a selected recommendation video.

In some embodiments, the method further includes: in response to a user's selection for an option bar for video recommendation, the video on demand application is activated, and the currently-played content display layer is switched to display a corresponding selected recommendation video in the video on demand.

Ninthly, the present disclosure provides a method for displaying a graphical user interface of a television screen shot. The method includes: in response to an input instruction for capturing a screen shot, displaying a graphical user interface that includes a currently-played content display layer and a screen shot content display layer on a display. The screen shot content display layer includes a plurality of option bars, at least one of which is configured to display commodity shopping information recommendations related to objects identified on the basis of the image of the screen shot.

In some embodiments, the method further includes: in response to a user's selection for an option bar for the shopping information recommendations, activating a shopping application to display at least one window configured to display webpage content of the shopping application.

In some embodiments, the method further includes: in response to a user's selection for an option bar for the shopping information recommendations, displaying at least one shopping information list window, and contents displayed in the window include an option bar for related commodity description, and an option bar for activation of a shopping application.

In some embodiments, the method further includes: in response to a user's selection for the option bar for activation of a shopping application, activating a corresponding shopping application.

In some embodiments, the method further includes: after the shopping application is activated, switching the currently-played content display layer to a page related to an identified commodity in the shopping application.

In some embodiments, the method further includes: in response to a user's selection for the option bar for the shopping information recommendation, displaying at least one shopping information list window, and contents displayed in the window include a sub-option bar for related commodity description, and a sub-option bar for activation of a shopping application.

In some embodiments, the contents displayed in the window further include a sub-option bar for QR code information for indicating commodity information related to an identified commodity in the shopping application.

In some embodiments, the method further includes: in response to a user's selection for the sub-option bar for QR code information, zooming in on the QR code information such that other electronic terminals is able to scan the QR code to acquire information of related commodity in the shopping application.

In some embodiments, the method further includes: in response to a user's selection for the sub-option bar for related commodity description, displaying details of commodity; the details of commodity comprise one or a combination of dimension, size, color and specification.

The above is a brief summary of the present disclosure to explain certain aspects of this application. This summary is not an extensive or exhaustive overview of this application and its various aspects, examples and/or configurations. The purpose is neither to determine the primary or critical elements of this application, nor to describe the scope of this application, but to briefly introduce some of the concepts of the application as an introduction to the detailed description below. It should be understood that other aspects, examples, and/or configurations of the present disclosure may utilize one or more of the features set forth above or as detailed below, either singly or in combination.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Figure 1A:
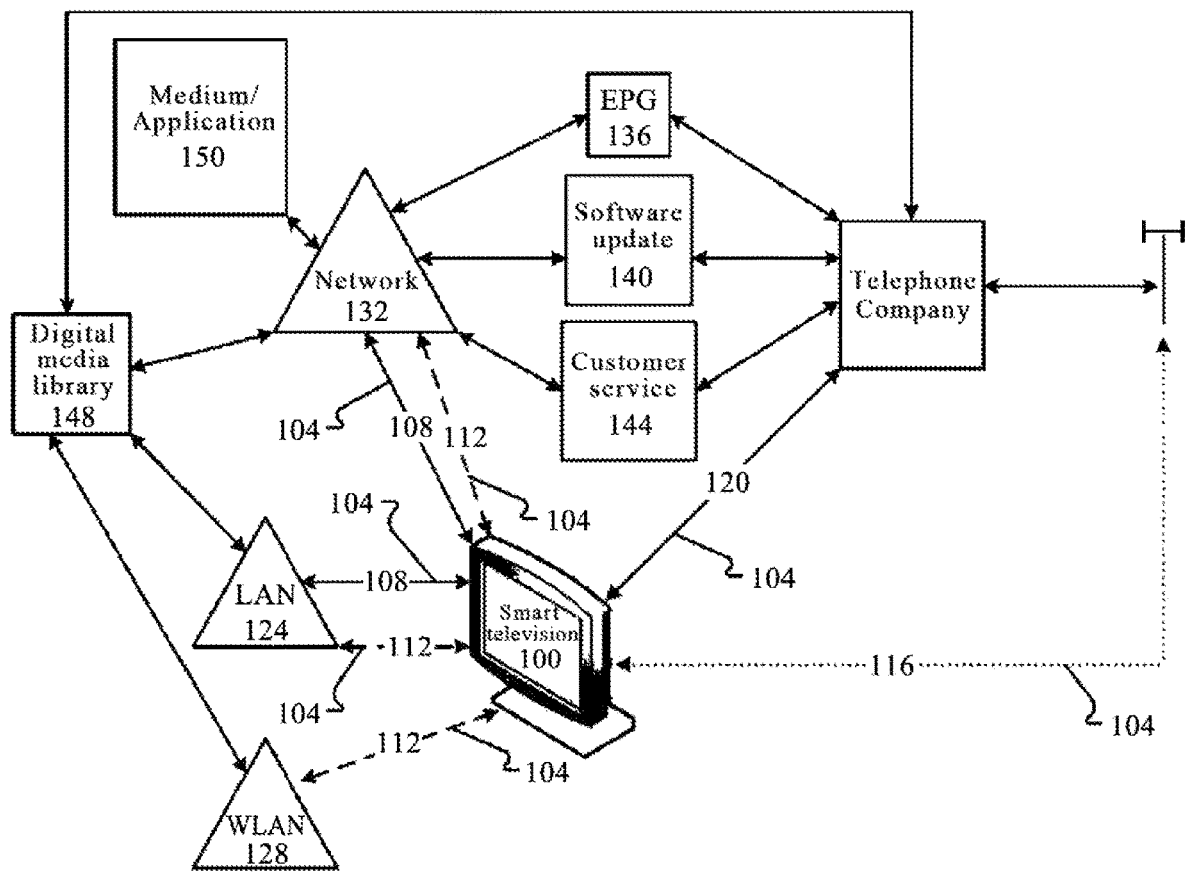
FIG. 1A illustrates a first view of an environment or smart television example.

In these drawings, similar components and/or features may have similar reference numeral. Moreover, various components of the same type can be distinguished from other similar components by reference to the letters in the labels. If only the first reference label is used in the specification, this description is applicable to any similar component with the same first reference numeral, regardless of whether the second reference numeral is the same.

Corresponding reference numerals indicate corresponding parts or features throughout the several views of the drawings.

DETAILED DESCRIPTION

Example embodiments will now be described more fully with reference to the accompanying drawings.

The term "live television" used in the present disclosure refers to real-time television production broadcastings or television production broadcastings basically synchronized with an event occurrence moment.

The term "Video on Demand" (VOD) used in the present disclosure refers to a system and process for allowing a user to select and watch/listen content of videos or audios on demand. A VOD system may shunt a content, so that the content is watched in real time or the content is downloaded to a storage medium for watching later.

The term "display screen" refers to a portion of one or more screens, and is configured to display content output by a computer to a user. The display (or display screen) can be a single-screen display or a multi-screen display (known as a composite display). A single actual screen can contain multiple displays that are managed as separate logical displays. Therefore, different content can be displayed on the separate displays, even though it is in a certain part of the same actual screen.

The term "remote controller" refers to a component of an electronic device (most commonly a television receiver, DVD player, and/or home theater system) that typically wirelessly controls the device over a short line of sight. The remote controller typically uses infrared and/or radio frequency (RF) signals that may include WiFi, a wireless USB, Bluetooth™ connection and a motion sensor to initiate function and/or voice control. A touch screen remote controller is a handheld remote control apparatus that replaces most of physical built-in hard keys in a traditional remote control apparatus with a touch screen user interface.

The term "display image" as used in the present disclosure refers to an image content formed on a display. A typical display image is a television broadcast content. The display image will take up all or part of the display.

The term "panel" as used in the present disclosure may refer to a user interface that is displayed at least in a portion of the display. Panels can be interactive (such as accepting user inputs) or only providing information (such as not accepting the user inputs), and can be semitransparent, so it becomes blurry, but does not obscure the content on the display screen. The panel can be changed based on a user input from a button or a remote controller interface.

The term "silo" as used in the present disclosure may be a logical representation of an input, source, or application. The input can be an electronic device (such as a DVD and a video recorder) that is connected to a television via a port (such as an HDMI and a video/audio input port) or a network (such as local and wide area networks). Unlike a device, the input can be connected to one or more devices as an electrical or physical connection configuration. The source, especially a content source, can be a data service (such as a media center and file system) that provides content. The application can be a software service (such as a live television, video on demand, a user application and picture displaying) that provides a specific function type. The silo, as a logical representation, can have other related definitions or attributes, such as setting, function, or other characteristics.

The terms "determining," "calculating," and "computer computing," and variations thereof, as used in the present disclosure, are used interchangeably and include any type of methodology, process, mathematical operation, or skill.

Thereafter, when user interface elements in "select", "selected" "will select" or "being selecting" graphical user interfaces (GUIs) are mentioned in the present disclosure, these belongings should be understood as including use of a mouse or other input devices to click or "hover" over at least one of the user interface elements, or use of one or more fingers or styluses to touch a screen, tap the screen, or make a gesture on at least one of the user interface elements. The user interface elements can be virtual buttons, menu buttons, selectors, switches, sliders, erasers, knobs, thumbnail images, links, icons, single-click buttons, check boxes, and any other mechanisms that receive inputs from users.

Figure 1B:
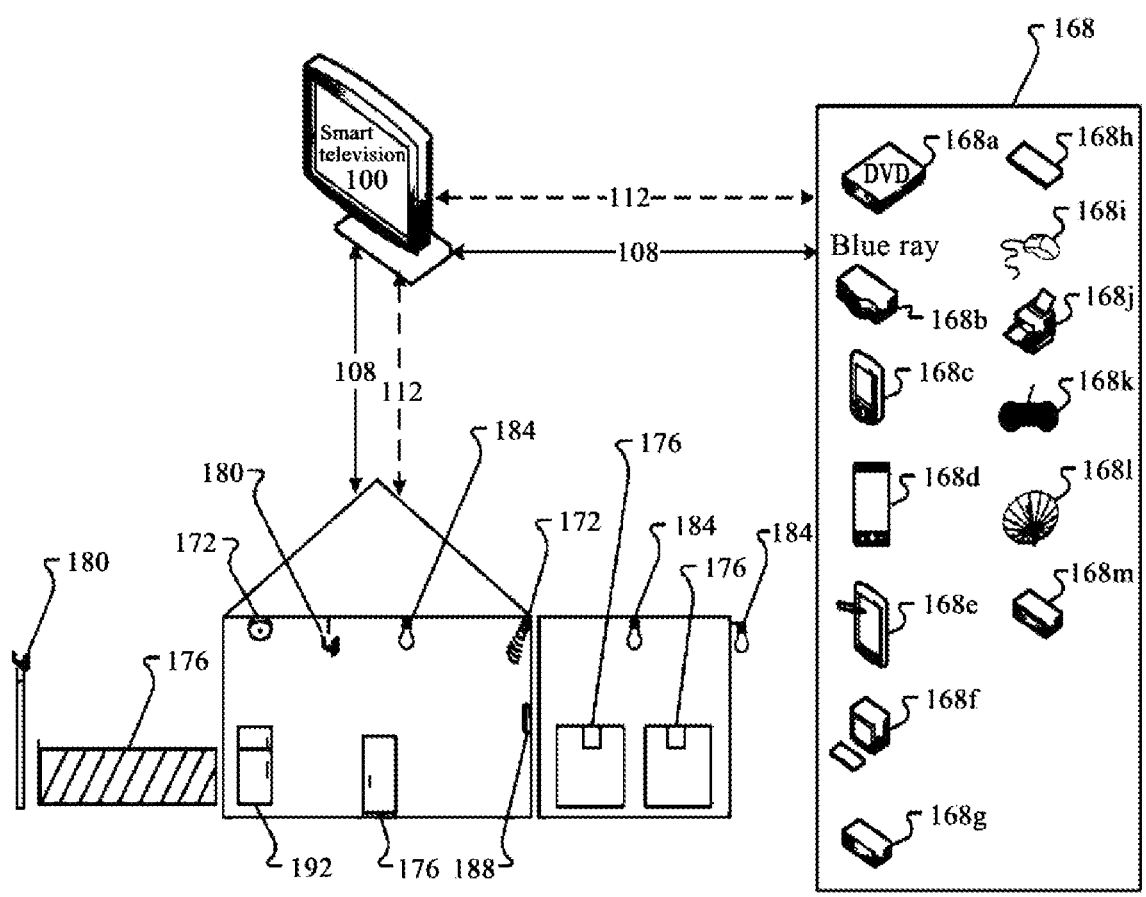
FIG. 1B illustrates a second view of an environment or smart television example.

Smart Television (TV) Environment:
referring to some embodiments of a smart TV 100 as shown in FIGS. 1A and 1B, the smart T may be used for entertainment, business application, social interaction, content creation and/or consumption, and/or further include one or more other devices configured to organize and control a communication with the smart TV 100. Therefore, the smart TV may be used for enhancing the user interaction experience, either at home or in a working place.

In some examples, the smart TV 100 may receive and comprehend various user and/or device inputs via configuration. For example, a user can interact with the smart TV 100 through one or more physical or electronic controls that may include a button, a switch, a touch screen/region (e.g., capacitive touch screen, resistive touch screen and etc.) and/or other controls associated with the smart TV 100. On some circumstances, the smart TV 100 may contain one or more interactive controls. Additionally or alternatively, one or more interactive controls may be associated with a remote controller. The remote controller may communicate with the smart TV 100 through a wired and/or wireless signal. Therefore, it can be understood that the remote controller may work though the radio frequency (RF), infrared ray (IR) and/or a specific wireless communication protocol (e.g., Bluetooth™, Wi-Fi and etc.). In some situations, the smart TV 100 may be configured with aforementioned physical controls or electronic controls (e.g., programming) to fit users' hobby.

In some embodiments, the smart TV 100 may be controlled with a smart phone, a flat computer, a computer, a notebook computer, a netbook and other smart devices. For example, the smart TV 100 is controlled by using an application operated on a smart device. The application can be configured to provide various control functions of the smart TV 100 to a user in an intuitive user interface (UI) on a screen associated with the smart TV 100. The users' option input may be configured and use communication function associated with one or more smart devices through the application program to control the smart TV 100.

The smart TV 100 may be configured to receive inputs through various input devices. The inputs include but not limited to video, audio, radio wave, light, touch and a combination of them. The receive inputs may be configured to make the smart TV see and recognize users' gesture and respond accordingly. For example, the user can talk to the smart TV 100 in a session way. The smart TV 100 may have a role similar to a smart personal assistant for smart devices and a voice-activated navigation application (e.g., Siri of Apple Inc, Skyvi of Android, Robin, Iris and other applications) to receive and understand voice commands.

In addition, the smart TV 100 can be configured as a communication device that can establish network connections 104 and use a telephone line 120 to connect to a telephone network operated by a telephone company in many different manners (including a wired 108 or wireless 112 mode, and a cellular network 116). These connections 104 enable the smart TV 100 to access one or more communication networks. The communication networks include a set of any known communication medium or communication media, and may use any type of protocol to transmit information or signal among terminals. The communication networks may include wire and/or wireless communication techniques. The Internet is an example of the communication networks 132. The Internet, computers, computer networks and other global communication apparatuses constitute IP network, and interconnect with each other through telephone systems and other ways.

In some examples, the smart TV 100 can be equipped with a variety of communication tools. The variety of communication tools may allow the smart TV 100 to communicate with a local area network (LAN) 124, a wireless local area network (WLAN) 128, and other networks 132. These networks can act as redundant connections to ensure network accesses. In other words, if one connection is broken, the smart TV 100 will re-establish and/or maintain the network connections 104 by using another connection path. Moreover, the smart TV 100 also uses these network connections 104 to send and receive information, and to interact with an electronic program guide (EPG) 136, receive software updates 140, contact customer services 144 (such as get help or services) and/or access a remotely stored digital media library 148. Moreover, these network connections further enables the smart TV 100 to phone, send and/or receive emails, send and/or receive text messages (e.g., email and instant messages), surf online using a search engine of the Internet, publish blog via the blog service, and connect to/interact with a social media website and/or an online community maintained by a social network service (e.g., Facebook, Twitter, LinkedIn, Pinterest, GooglePlus, Myspace and etc.). When the network connections 104 and other components (more details are introduced hereinafter) of the smart TV 100 are combined to use, a video conference, an electronic conference and other types of communication may be held on the smart TV 100. The smart TV 100 may use connected camera, microphone and other sensors to capture and store images and sounds.

Additionally or alternatively, the smart TV 100 can create and save screen shots of media, images and data which are displayed on the associated screen of the smart TV 100.

As shown in FIG. 1B, the smart TV 100 may interact with other electronic devices 168 via the wired 108 and/or wireless 112 connection. As described in the present disclosure, the components of the smart TV 100 allow the device 100 to be connected to the devices 168, including, but not limited to, a DVD player 168a, a Blue-ray player 168b, a portable digital media device 168c, a smart phone 168d, a tablet device 168e, a personal computer 168f, an external junction box 168g, a keyboard 168h, a positioning device 168i, a printer 168j, a game controller and/or gamepad 168k, a satellite dish 168l, an external display device 168m and other universal serial buses (USBs), an LAN, Bluetooth™, a high definition multimedia interface (HDMI) component device and/or a wireless device. When connected to the external junction box 168g or satellite dish 168l, the smart TV 100 can access more media content.

Moreover, as detailed below, the smart TV 100 can receive digital and/or analog signal broadcasts from a TV station. It can work as one or more cable TVs, Internet TVs, Internet protocol TVs, satellite TVs, web TVs and/or smart TVs. The smart TV 100 can also be configured to control and interact with other smart components, such as a security system 172, an entrance guard/gate controller 176, a remote video camera 180, a lighting system 184, a thermostat controller 188, a refrigerator 192 and other apparatuses.

Figure 2:
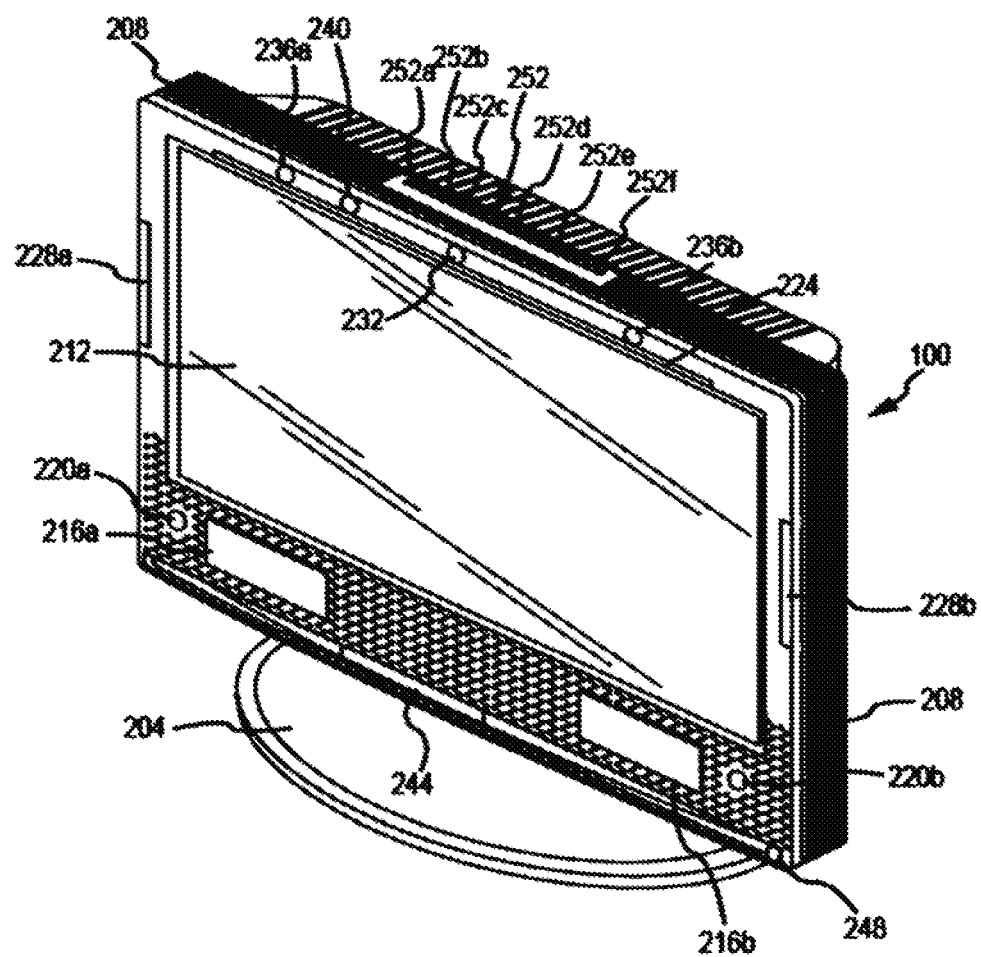
FIG. 2 illustrates a first view of a smart television example.

Smart TV:
FIG. 2 illustrates components of the smart TV 100. As shown in FIG. 2, the smart TV 100 may be supported by a movable base or bracket 204 that is connected to a framework 208. The framework 208 surrounds the edge of a display 212 without covering its front side. The display 212 may include a liquid crystal display (LCD), a plasma screen, a light emitting diode (LED) screen, or other type of screens.

The smart TV 100 may contain an integrated loudspeaker 216 and at least one microphone 220. In some examples, a first region of the framework 208 includes a horizontal gesture capturing region 224, and a second region includes a vertical gesture capturing region 228. The gesture capturing regions 224 and 228 contain regions that can receive inputs by identifying user gestures. In some examples, users do not need to actually touch the surface of the screen 212 of the smart TV 100 at all. However, the gesture capturing regions 224 and 228 do not contain pixels that can perform display functions or capabilities.

In some examples, one or more image capturing devices 232 (such as a camera) are added to capture still and/or video images. The image capturing devices 232 may include or be connected with other elements, such as a flashlight or other light sources 236 and a ranging device 240 to assist in focusing of the image capturing devices. In addition, the smart TV 100 can also identify the respective users by using the microphone 220, the gesture capturing regions 224 and 228, the image capture devices 232 and the ranging device 240. Additionally or alternatively, the smart TV 100 can learn and remember the preferences of the respective users. In some examples, learning and memorizing (such as identifying and calling stored information) may be related to user identification.

In some examples, an infrared transmitter and receiver 244 can also be provided and connected to the smart TV 100 via a remote control device (not shown here) or other infrared devices. Additionally or alternatively, the remote control device can transmit wireless signals by other manners in addition to RF, light and/or infrared rays.

In some examples, an audio jack 248 is hidden behind a foldable or movable panel. The audio jack 248 contains a cuspidal round sleeve or tip-ring-sleeve (TRS) connector that allows, for example, a user to use headphones, a headset, or other external audio devices.

In some examples, the smart TV 100 also includes a plurality of buttons 252. For example, FIG. 2 shows the buttons 252 at the top of the smart TV 100, which can also be located at other positions. As shown in the figure, the smart TV 100 contains six buttons 252 (from a to f) that can be configured for particular inputting. For example, the first button 252 can be configured to be an on/off button for controlling system power of the entire smart TV 100. The buttons 252 can be configured together or separately to control multiple aspects of the smart TV 100. Some non-restrictive examples include, but not limited to, an overall system volume, brightness, image capturing devices, microphones, and holding/ending of video conferences. Different from the independent buttons, two buttons can be combined into one rocker button. This rocker button is very useful in certain situations, such as performing functions of controlling the volume or brightness.

In some examples, one or more buttons 252 can be used to support different user commands. For example, the duration of a normal press is generally less than 1 second, similar to fast input. The duration of a medium press is generally 1 second or longer, but no more than 12 seconds. The duration of a long press is generally 12 seconds or longer. This function of the button generally depends on an application activated on the smart TV 100. For example, in a video conference application, the normal, medium, or long press may mean ending a video conference, increasing or decreasing the volume, increasing the input response speed, and switching the microphone mute according to specific buttons. The normal, medium, or long press can also control the image capturing devices 232 to be zoomed in and zoomed out, take pictures or record videos according to specific buttons.

Figure 3:
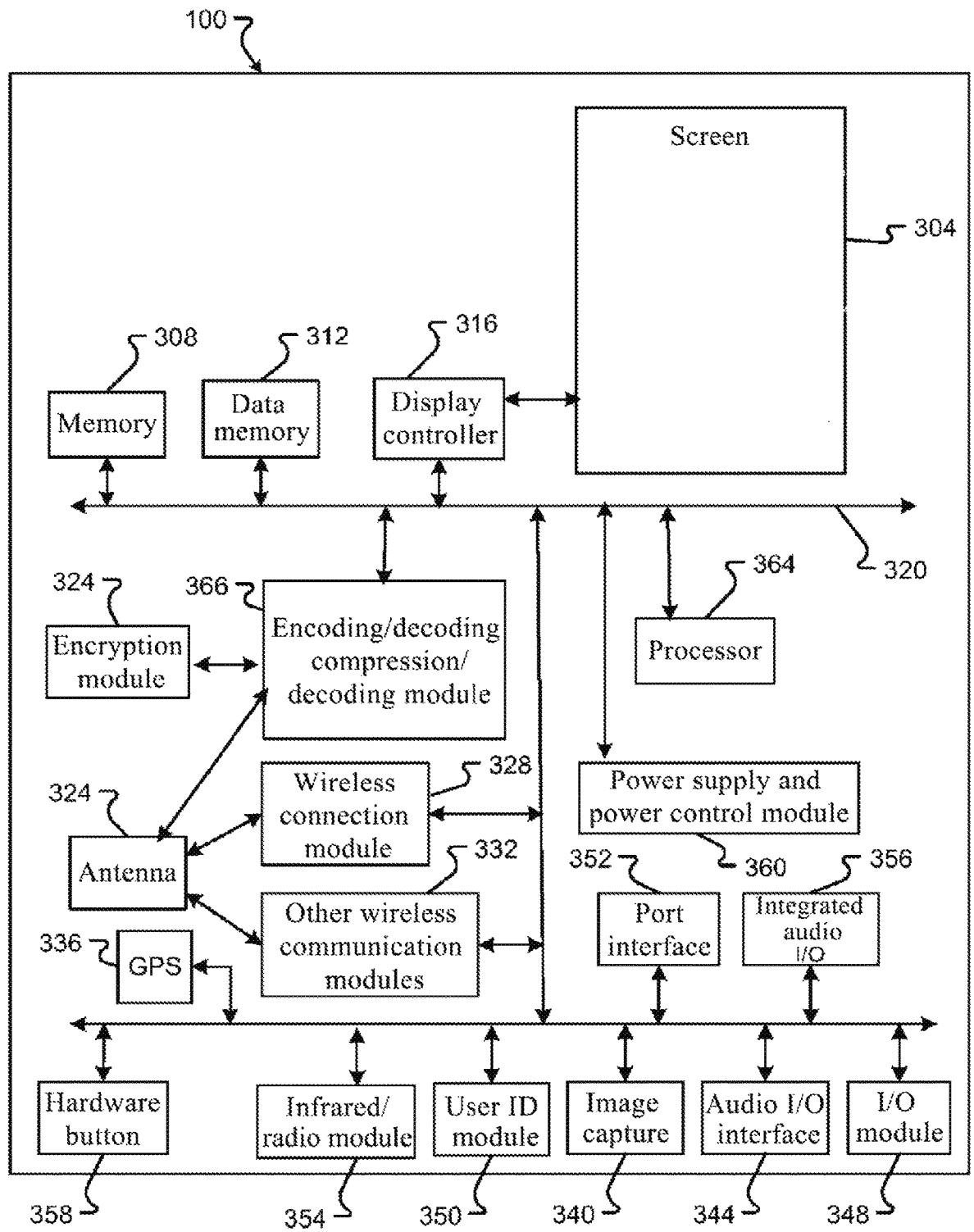
FIG. 3 illustrates a block diagram of a smart television hardware example.

Hardware Functions:
FIG. 3 illustrates some components of the smart TV 100 according to the example of the present disclosure. The smart TV 100 includes a display or screen 304.

One or more display controllers 316 may be used to control the operation of the screen 304. The display controller 316 may control the operation of the screen 304, including input and output (display) functions. The display controller 316 may also control the operation of the screen 304 and interact with other inputs, such as infrared and/or radio input signals (e.g., an entrance guard/door controller and an alarming system component). According to some other examples, the function of the display controller 316 may be possibly added into other components such as a processor 364.

The processor 364 may contain a universal programmable processor or controller for performing application design or instructions. According to at least some examples, the processor 364 contains a plurality of processor cores and/or executes a plurality of virtual processors. According to some other examples, the processor 364 may possibly include a plurality of physical processors. As a specific example, the processor 364 may include a particularly configured application-specific integrated circuit (ASIC) or other integrated circuits, a digital signal processor, a controller, a hard-wired electronic or logic circuit, a programmable logic device or gate array, a special-purpose computer and the like. The processor 364 is generally used to operate program codes or instructions to execute various functions of the smart TV 100.

In order to support a connection function or capacity, the smart TV 100 may include an encoding/decoding and/or compression/decompression module 366 to receive and manage digital TV information. The encoding/decoding and/or compression/decompression module 366 may decompress and/or decode analog and/or digital information sent from a public TV link or in a private TV network and received through an antenna 324, an I/O module 348, a wireless connection module 328 and/or other wireless communication modules 322. The TV information may be sent to the screen 304 and/or an affiliated loudspeaker that receives an analog or digital receiving signal. Any encoding/decoding and compression/decompression may be executed on basis of various formats (such as audio, video and data). An encryption module 324 communicates with the encoding/decoding and/or compression/decompression module 366 such that all data received or sent by a user or supplier are kept confidential.

In some examples, the smart TV 100 includes extra or other wireless communication modules 332. For example, the other wireless communication modules 332 may include Wi-Fi, Bluetooth™, WiMax, infrared or other wireless communication links. A wireless communication module 328 and the other wireless communication modules 332 may be connected with one shared or dedicated antenna 324 and one shared or dedicated I/O module 348.

In some examples, in order to support the communication function or capacity, the smart TV 100 may include the wireless connection module 328. For example, the wireless connection module 328 may include a global system for mobile communications (GSM), a code division multiple access (CDMA), a frequency division multiple access (FDMA) and/or an analog cellular phone transceiver, and can transmit voices, multimedia and/or data through a cellular network.

The I/O module 348 and associated ports can be added, so as to support communication with other communication devices, servers and/or peripherals through a wired network or a link. The I/O module 348 includes an Ethernet port, a universal serial bus (USB) port, a Thunderbolt™ port or a Light Peak port, an Institute of Electrical and Electronic Engineers (IEEE) 1394 port or other ports.

An audio input/output interface/device 344 can be added to output an analog audio to the loudspeaker or other devices connected thereto, and receive an analog audio input from the microphone or other devices connected thereto. For example, the audio input/output interface/device 344 may include an associated amplifier and an analog-to-digital converter. Alternatively or additionally, the smart TV 100 may include an integrated audio input/output device 356 and/or an audio jack connected to an external loudspeaker or microphone. For example, an integrated speaker and an integrated microphone are added to support the near-end conversation or a speaker-phone operation.

A port interface 352 may be added, and includes a peripheral or universal port which provides a support to connection of the device 100 to other devices or components (such as a dock). After mutual connection, these devices or components may possibly or may not possibly provide extra or different functions to the device 100. A docking port and/or the port interface 352 may further supply power to the device 100 or output power from the device 100 in addition to supporting exchange of communication signals between the device 100 and other devices or components. The port interface 352 further includes a smart element which includes a docking module for controlling the communication or other interaction between the smart TV 100 and the device or element connected thereto. The docking module may interact with applications to remotely control other devices or components (e.g., a media center, a media player and a computer system).

The smart TV 100 may further include a memory 308 which facilitates the processor 364 to execute the application design or instruction and is used to store program instructions and/or data temporarily or for a long time. For example, the memory 308 may include a random access memory (RAM), a dynamic random access memory (DRAM), a synchronous dynamic random access memory (SDRAM) or other solid-state memories. In some examples, a data memory 312 is added. Similar to the memory 308, the data memory 312 may include one or more solid-state memories. In some examples, the data memory 312 may include one hard disk driver or other RAMs.

For example, a hardware button 358 may be applied to certain control operations. One or more image capturing interfaces/devices 340 (such as a camera) can be added to capture still and/or video images. In some examples, the image capturing interfaces/devices 340 may include a scanner, a code reader, or an action sensor. The image capturing interfaces/devices 340 may include or be connected with other elements such as a flashlight or other light sources. The image capturing interfaces/devices 340 may interact with a user ID module 350 that helps to identify the identity of a user of the smart TV 100.

The smart TV 100 may also include a global positioning system (GPS) receiver 336. According to some examples of the present disclosure, the GPS receiver 336 may further include a GPS module to provide absolute positioning information to other components of the smart TV 100. Therefore, it can be understood that other satellite positioning system receivers can be replaced or used in conjunction with a GPS.

The components of the smart TV 100 may be powered by a main power supply and/or a power control module 360. For example, the power control module 360 includes a battery, an AC to DC converter, a power control logic and/or a port that interconnects the smart TV 100 with an external power supply.

Figure 4:
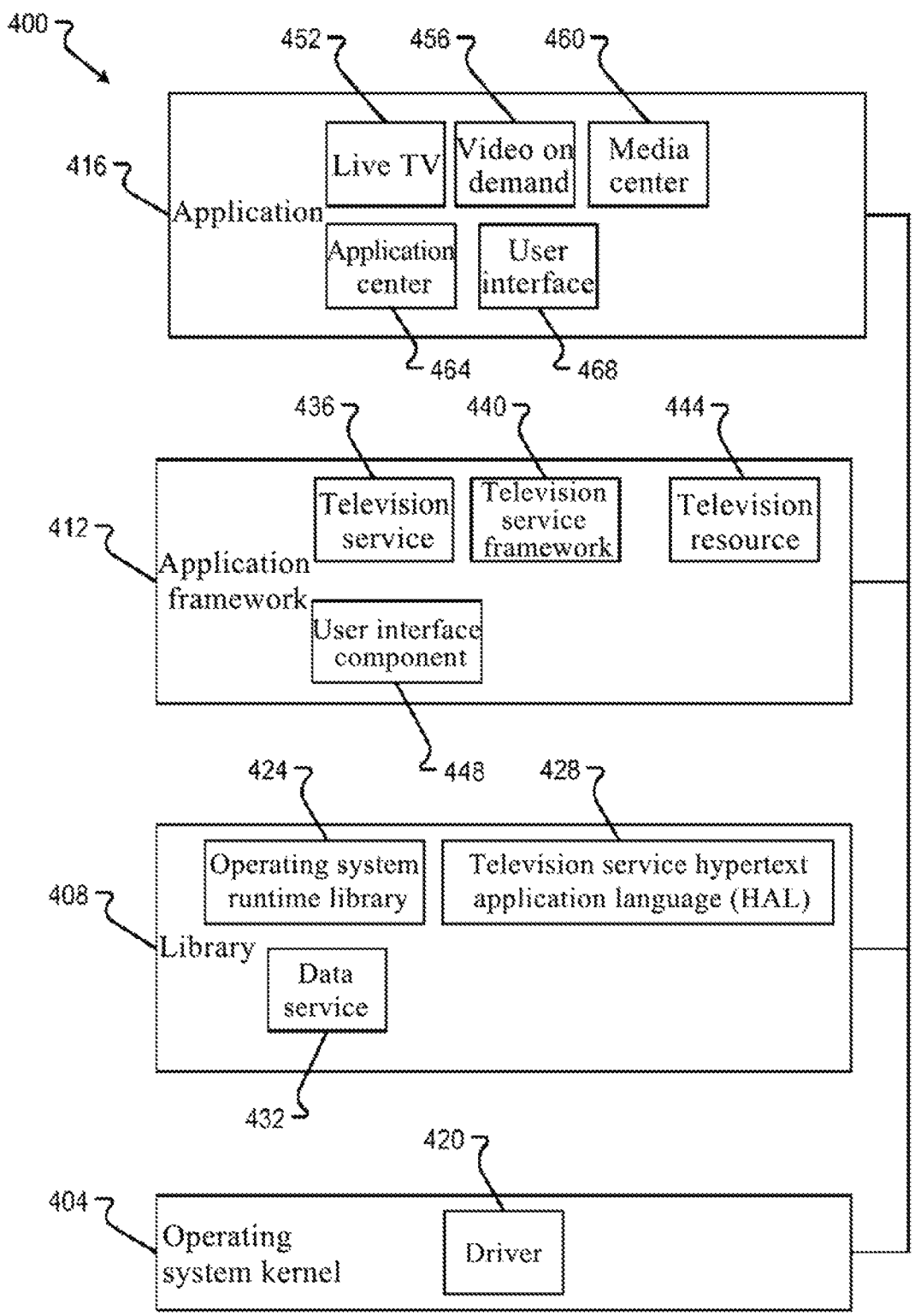
FIG. 4 illustrates a block diagram of a smart television software and/or firmware example.

Firmware and Software:

FIG. 4 illustrates an example of a software system component and module 400. The software system 400 possibly includes one or more layers, including, but not limited to, an operating system (OS) kernel 404, one or more libraries 408, an application framework 412 and one or more applications 416. One or more layers 404 to 416 may communicate with each other to execute the functions of the smart TV 100.

The OS kernel 404 contains a main function that allows software and hardware associated with the smart TV 100 to interact with each other. The kernel 404 may contain a series of software for managing computer hardware resources and servicing other computer programs or software codes. The OS kernel 404 is a main component of an OS and acts as an intermediary between an application and data processing completed by a hardware component. Part of the OS kernel 404 may include one or more device drivers 420. The device driver 420 may be any code in the OS to assist in the operation or control of devices or hardware connected to or associated with the smart TV. The driver 420 may contain a code for operating videos, audios and/or multimedia components of other smart TVs 100. Examples of the drivers include a display, a camera, a Flash, a Binder (IPC), a keyboard, WiFi and an audio driver.

The libraries 408 may contain codes or other components that are accessed and executed during operation of the software system 400, and possibly contain, but not limited to, one or more OS runtime libraries 424, a TV service hypertext application language (HAL) library 428, and/or a data service library 432. The OS runtime library 424 may possibly contain codes required by the OS kernel 404 and other OS functions that are executed during the operation of the software system 400. This library may contain a code that is launched during the operation of the software system 400.

The TV service HAL 428 may contain a code required by a TV service and executed by the application framework 412 or the application 416. The TV service HAL 428 is specific to controlling the operation of the smart TVs 100 with different smart TV functions. In addition, the TV service HAL 428 may also be composed of other types of application languages in addition to an HAL or instances of different code types or code formats.

Figure 6:
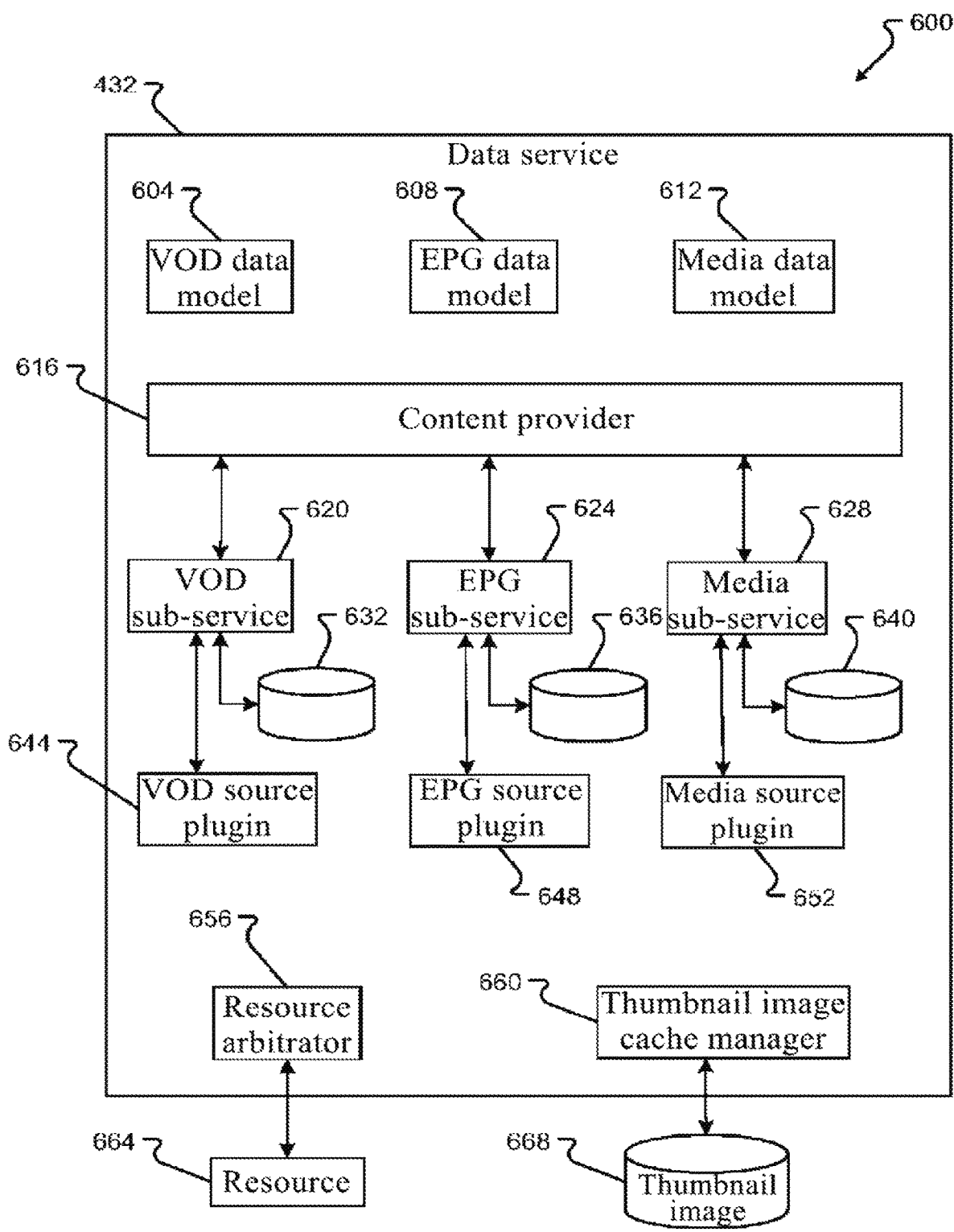
FIG. 6 illustrates a third block diagram of a smart television software and/or firmware example.

The data service library 432 may contain one or more components or codes, and is used for executing components that realize data service functions. The data service functions can be executed in the application framework 412 and/or the application layer 416. FIG. 6 illustrates examples of a data service function and a component type.

The application framework 412 may contain a general abstract concept of a provided function. The function may be selected through one or more applications 416, so as to provide specific application functions or software to these applications. Therefore, the framework 412 may contain one or more different services, or provide other applications having general functions on two or more applications through an access to the applications 416. For example, this function includes management of one or more windows or panels, planes, activities, content and resources. The application framework 412 may contain, but not limited to, one or more TV services 434, TV service frameworks 440, TV resources 444 and user interface components 448.

The TV service framework 440 may provide extra abstract concepts to different TV services. The TV service frameworks 440 allow regular accesses to and operations of services related to TV functions. The TV services 436 are general services provided in the TV service framework 440 that can access the applications in the application layers 416. The TV resources 444 provide codes for accessing TV resources. These resources include any type of stored content, videos, audios or functions provided by other smart TVs 100. The TV resources 444, the TV services 436 and the TV service framework 440 are to execute TV function services of the smart TV 100.

Figure 5:
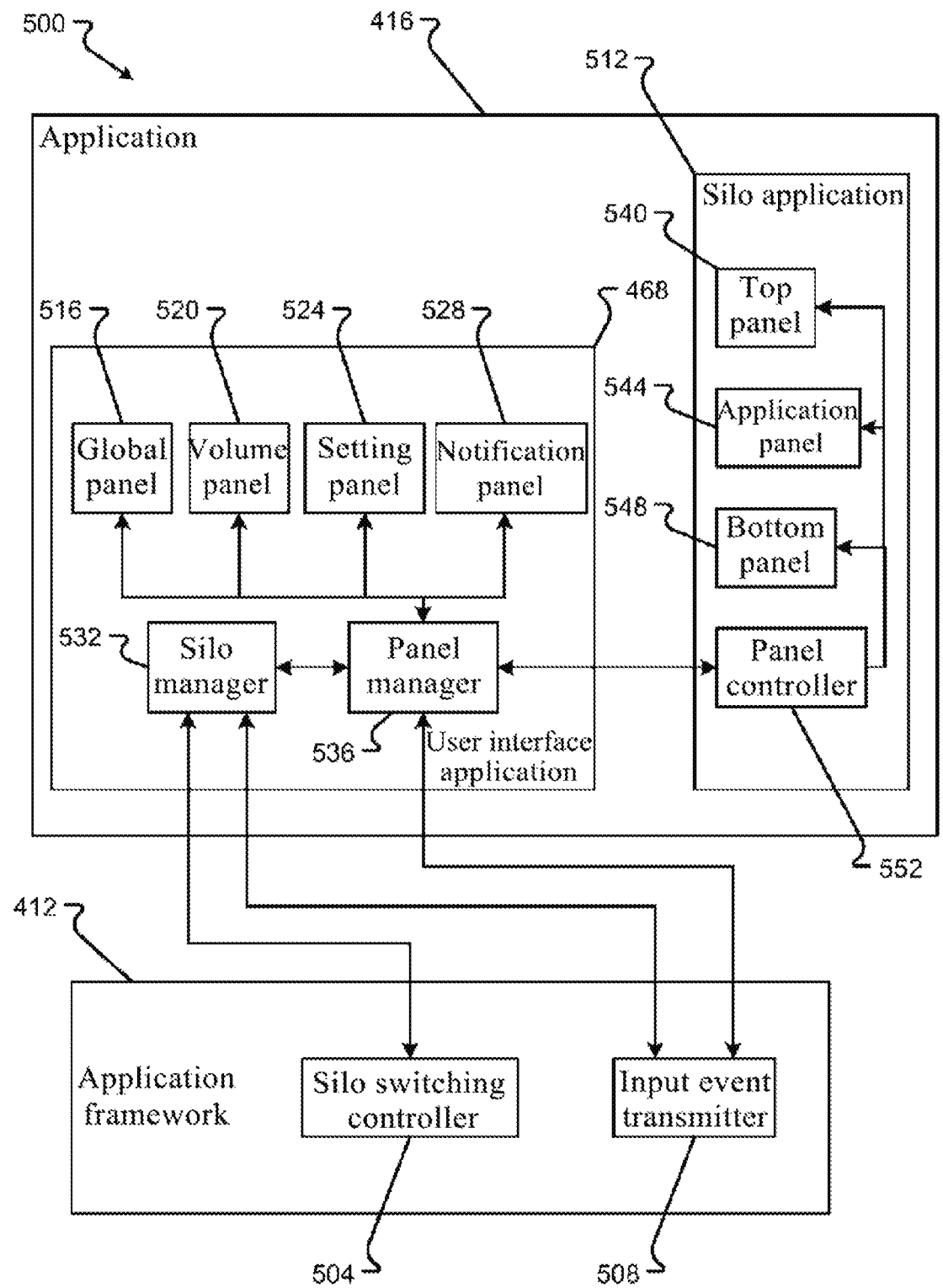
FIG. 5 illustrates a second block diagram of a smart television software and/or firmware example.

One or more user interface components 448 may provide general components for displaying of the smart TV 100. The user interface components 448 may act as general components that are accessed by various applications provided by the application framework 412. The user interface components 448 can be accessed to provide services to the panel and silo as shown in FIG. 5.

The application layer 416 may contain and execute the applications related to the smart TV 100. The application layer 416 possibly contains, but not limited to, one or more live TV applications 452, video on demand applications 456, media center applications 460, application centers 464 and user interface applications 468. The live TV applications 452 can provide live TVs through different signal sources. For example, the live TV applications 452 can use inputs from a wired TV, an air broadcast, a satellite service or other types of live TV services to provide the TVs. Then, the live TV applications 452 can display multimedia presentations or video and audio presentations of live TV signals on the display of the smart TV 100.

The video on demand applications 456 can provide videos from different storage sources. Different from the live TV applications 452, the video on demand applications 456 display videos from some storage sources. Video on demand sources can be associated with users or smart TVs or some other types of services. For example, the video on demand 456 can be provided by the iTunes library stored by a cloud technology, a local hard disk memory that contains stored video programs or some other sources.

The media center applications 460 can provide applications required by various media presentations. For example, the media center 460 can provide services for displaying of images or audios that are different from live TV or video on demand but still can be accessed by users. The media center 460 can acquire media displayed on the smart TV 100 by accessing different sources.

The application center 464 can provide, store and use the applications. The applications can be games, productivity applications or some other applications that are generally related to a computer system or other devices and can be operated in the smart TV. The application center 464 can acquire these applications from different sources, store them in a local memory, and execute these applications for the user on the smart TV 100.

The user interface applications 468 can provide services for specific user interfaces associated with the smart TV 100. These user interfaces can contain the silos and panels in FIG. 5. One example of user interface software 500 is as shown in FIG. 5. The application framework 412 herein contains one or more code components that may help control user interface events. Meanwhile, one or more applications in the application layer 416 affect the use of the user interfaces of the smart TV 100. The application framework 412 may contain one silo switching controller 504 and/or an input event transmitter 508. The code components in the application framework 412 are possibly more or less than those as shown in FIG. 5. The silo switching controller 504 contains a code and language for managing switching between one or more silos. The silos can be vertical user interface functions on the smart TV, and contain user available information. The switching controller 504 can manage switching between two silos when a user interface has an event. The input event transmitter 508 can receive event information of the user interface. The event information is from the OS, and then transmitted to the input event transmitter 508. The event information may contain button selections on the remote controller or the TV, or other types of user interface inputs. Then, the input event transmitter can transmit the event information to a silo manager 532 or a panel manager 536 (depending on the type of the event). The silo switching controller 504 can interact with the silo manager 532 to affect changing of the silos.

The application framework 416 can contain a user interface application 468 and/or a silo application 512. The user interface applications which are contained in the application framework 416 and necessary to the smart TV 100 can be more or less than those as shown in FIG. 5. The user interface applications may contain the silo manager 532, the panel manager 536 and one or more panels 516 to 528. The silo manager 532 manages displaying and/or functions of the silos. The silo manager 532 can receive or transmit information from the silo switching controller 504 or the input event transmitter 508, so as to change a displayed silo and/or determine an input type received by a silo.

The panel manager 536 can display the panels in the user interfaces, so as to manage switching between these panels or affect user interface inputs received in the panels. Therefore, the panel manager 536 can communicate with different user interface panels, such as a global panel 516, a volume panel 520, a setting panel 524 and/or a notification panel 528. The panel manager 536 can display these types of panels, specifically depending on inputs from the input event transmitter 508. The global panel 516 possibly contains information related to a home screen or highest-level information of a user. Information displayed on the volume panel 520 is related to an audio volume control or other volume settings. Information displayed on the setting panel 524 is related to audio or video settings or other settable characteristics of the smart TV 100. The notification panel 528 may provide information related to user notifications. These notifications may be possibly related to video on demand displaying, collection, currently-provided programs and the like or other information. The content of the notifications is related to media or some types of settings or operations or the smart TV 100. The panel manager 536 can communicate with a panel controller 552 of the silo application 512.

The panel controller 552 may control some panels in the above-mentioned several types. Therefore, the panel controller 552 can communicate with a top panel application 540, an application panel 544 and/or a bottom panel 548. The several panels are different when displayed in the user interfaces of the smart TV 100. Therefore, the panel control may be determined on basis of a system configuration or the type of a currently-used display. The panels 516 to 528 are set to in a certain display direction (depending on the top panel application 540, the application panel 544 or the bottom panel application 548).

FIG. 6 is an example of a data service 432 and a data management operation. Data management 600 may contain one or more code components associated with different types of data. For example, the data service 432 may contain a plurality of code components used to execute video on demand, electronic program guide or media data functions and related to these functions. The component types of the data service 432 may be possibly more or less than those as shown in FIG. 6. Each of different types of data may possibly contain data models 604 to 612. These data models determine types of information to be stored in the data service and ways to store the information. Therefore, the data models can manage any data, no matter where they come from and how they will be received and managed in a smart TV system. Thus, the data models 604, 608, and/or 612 can provide the transform capacity or the capacity of affecting the transformation of data from one form into another form available for the smart TV 100.

A variety of different data services (video on demand, electronic program guides and media) each have a data sub-service 620, 624 and/or 628 for communication with one or more internal and/or external content providers 616. The data sub-services 620, 624 and 628 communicate with the content providers 616 to acquire data and then store the data in databases 632, 636 and 640. The sub-services 620, 624 and 628 can communicate with the content providers by initiating or enabling one or more source plugins 644, 648 and 652. The source plugins 644, 648 and 652 are also different for each content provider 616. Thus, if the data have a plurality of content sources, each of the data sub-services 620, 624 and 628 can decide to enable or initiate different source plugins 644, 648 and/or 652. In addition, the content provider 616 can also provide information to a resource arbiter 656 and/or a thumbnail image cache manager 660. The resource arbiter 656 can communicate with a resource 664 outside the data service 432. Thus, the resource arbiter 656 can communicate with a cloud memory, a network memory, or other types of external memories in the resource 664. The information will then be provided to the data sub-services 620, 624 and 628 by the content provider module 616. Similarly, the thumbnail image cache manager contains thumbnail image information from one of the data sub-services 620, 624 and 628 and stores the information in a thumbnail image database 666. Moreover, the thumbnail image cache manager 660 can also extract or retrieve information from the thumbnail image database 666 to provide the information to one of the data sub-services 620, 624 and 628.

Figure 7:
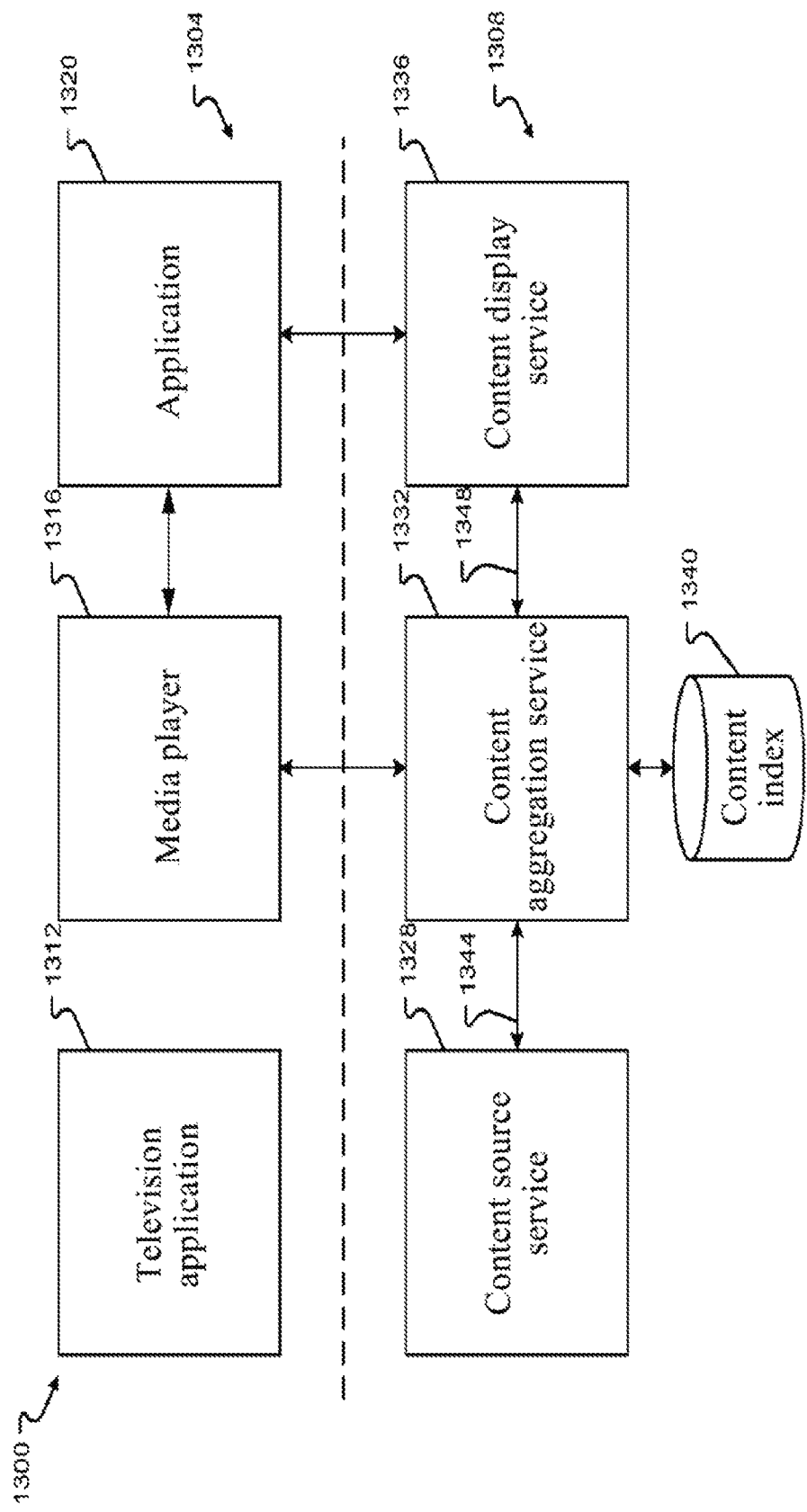
FIG. 7 illustrates a block diagram of a content real data service example.

FIG. 7 illustrates an exemplary content aggregation architecture 1300. The structure may include a user interface layer 1304 and a content aggregation layer 1308. The user interface layer 1304 may include a TV application 1312, a media player 1316, and an application 1320. The TV application 1312 allows audiences to watch channels received via appropriate transmission media (such as a cable, a satellite, and/or an Internet). The media player 1316 can allow the audiences to watch other types of media received via an appropriate transmission medium (such as an Internet). The application 1320 includes other TV-related (pre-installed) applications, such as content checking, content search, device checking and setup algorithms, and can also cooperate with the media player 1316 to provide information to the audiences.

The content source layer 1308, as a data service, includes a content source service 1328, a content aggregation service 1332 and a content presentation service 1336. The content source service 1328 manages a content source investigator, including a local and/or network file system, a digital network device manager (which discovers handheld or non-handheld devices (such as a digital media server, a player, a renderer, a controller, a printer, an uploader, a downloader, a network connection function and an interoperation unit) by a known technique such as multichannel broadcast universal plug-and-play or UPnP discovery technique), and retrieves, analyzes and encrypts device descriptors for each discovered device, informs content source services of the newly discovered devices, and provides information related to previously discovered devices, such as indexes, Internet protocol TV or IPTV, digital TV or DTV (including high definition and enhanced TVs), third-party services (services as quoted above) and applications (such as Android applications).

The content source investigator can track a content source which is generally configured as binary. The content source service 1328 can initiate the content source investigator and maintain an open and persistent communication channel. Communication includes inquiries or commands and response pairs. The content aggregation service 1332 manages a content metadata acquirer, such as a video, audio, and/or image metadata acquirer. The content presentation service 1336 provides a content indexing interface, such as an Android application interface and a digital device interface.

The content source service 1328 may transmit and receive communications 1344 to and from the content aggregation service 1332. The communication contains notifications on the latest and deleted digital devices and/or content and search inquiries and results. The content aggregation service 1332 can transmit and receive communications 1348 to and from the content presentation service 1336, including device and/or content search notifications, consultations and notifications of content of interest, and search inquiries and results.

During searching, particularly when a user is searching or browsing a content, the content presentation service 1336 can receive a user request from the user interface layer 1300, thereby turning on a socket and transmitting the request to the content aggregation service 1332. The content aggregation service 1332 firstly returns a result from a local database 1340. The local database 1340 contains an index or data model and indexed metadata. The content source service 1328 further issues search and browse requests for all content source investigators and other data management systems. The result will be transmitted to the content aggregation service 1332 to update the database 1340 to reflect a further search result, and an original content aggregation database search result and a data updated result reflecting more content source service search results are provided to the content presentation service 1336 through the previously turned on socket. The content presentation service 1336 then provides the results to one or more components of the user interface layer 1304 for presentation to the audiences. When the search phase is ended (e.g., the search phase is ended by a user or an operation of the user), the user interface layer 1304 will turn off the socket. As shown in the figure, the media can be provided directly from the content aggregation service 1332 to the media player 1316 for displaying to the user.

Figure 8:
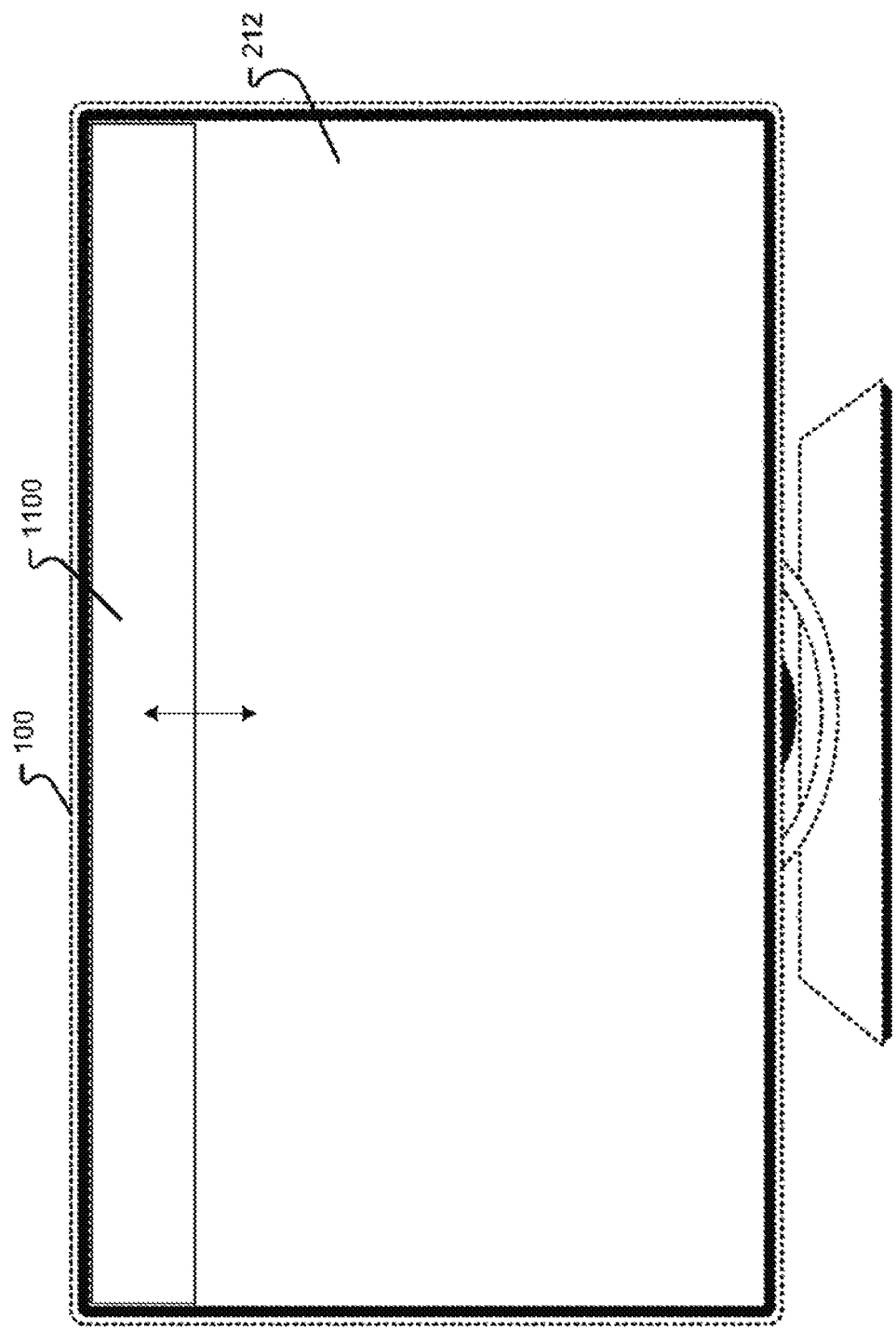
FIG. 8 illustrates a front view of a smart television screen example.

As shown in FIG. 8, the video content (such as TV programs, videos and TVs) is displayed on the front face of the screen 212. The window 1100 covers a portion of the screen 212, and the remaining portion displays the video content. The portion, which displays the video content, of the screen 212 may also be enabled to move up or down and/or be compressed as the height of the window 1100 changes. Furthermore, the window 1100 is superimposed on the video content, so that the height change of the window 1100 does not affect a display position of the video content.

The window 1100 may include one or more pieces of information, such as a panel navigation bar related to a currently-displayed image and/or content, details (e.g., the title, the date/time, an audio/video indicator, a rating and the style), a hot key bar, and a browse request and/or search request related information input bar.

In some examples, the window 1100 contains content-related appropriate information (such as name, duration and/or remaining content browsing time), setup information, TV or system control information, application (activation) icons (e.g., pre-installed and/or downloaded applications), the application center, the media center, a web browser and input source information.

Figure 9:
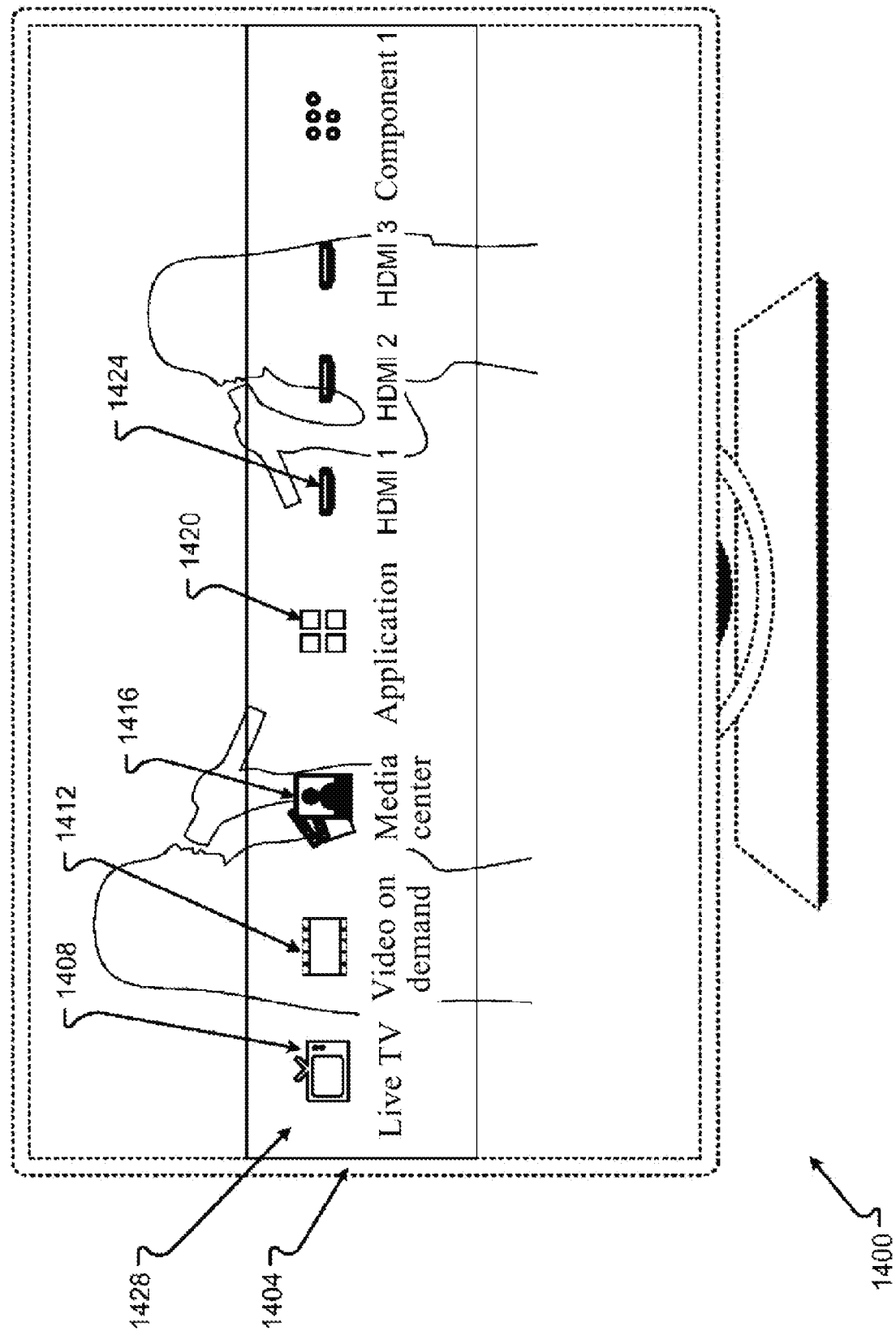
FIG. 9 illustrates an audio-visual image example of a user interface for a content/silo selector.

FIG. 9 is an audio-visual image example of a user interface for a content/silo selector. The audio-visual image 1400 includes a content source selector 1404. The content source selector 1404 includes icons 1428 of one or more silos 1408 to 1424.

The content source selector 1404 may include two or more icons 1408 to 1424 that represent different silos. For example, the icons 1408 to 1420 represent different content application silos. The different content application silos may include a live TV silo represented by the icon 1408. The live TV silo is a logical representation form of a broadcast TV signal application that provides TV content to a user of the TV 100. A video on demand (VOD) silo is represented by the icon 1412. The VOD silo provides a path to access videos that can be selected and available to the user on demand or other types of media. The media center silo is represented by the icon 1416, and it includes an application that provides images and/or films developed or stored by the user. The media center provides a way for the user to store their media by using the smart TV 100. The application silo is represented by the icon 1420, and it provides games and other user applications that can be accessed and used on the TV. The input source silo 1424 can be any type of device that is connected to the TV 100 via an input port or other electrical connection modes, or other storage mechanisms such as other input interfaces, e.g. an HDMI, or an input interface collection silo.

Figure 10:
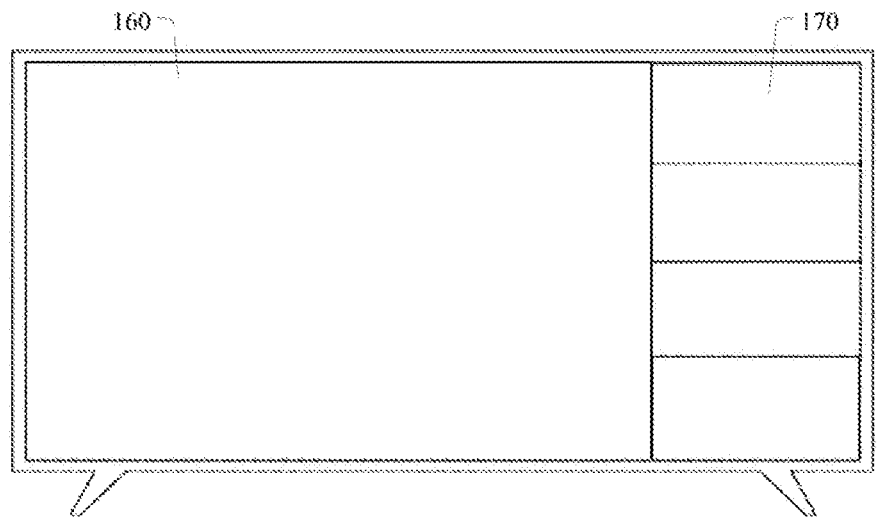
FIG. 10 illustrates a Graphical User Interface (GUI) of an example I for selecting and triggering a screen shot.

FIG. 10 illustrates an exemplary graphical user interface (GUI) I when a user triggers a screen shot operation. When video is being played on the display, after a screen shot instruction is triggered by clicking the remote controller, touching the screen or making a gesture and the like, a GUI is presented on the display, and the GUI includes a currently-played content display layer 160 and a screen shot content display layer 170. The screen shot content display layer 170 includes a set of option bars. The currently-played content display layer 160 continues playing video content. The option bars in the screen shot content display layer 170 display a thumbnail of the screen shot, recommended contents related to the items identified in the screen shot, or an input interface associated with the screen shot for receiving a user's selection input.

The screen shot content display layer 170 is displayed in a screen edge region, such as the right side or the lower side, and may be superimposed on the video content being played. The currently-played content display layer 160 may only display a portion, which is not covered by the screen shot content display layer 170, of the video content, or the video content is moved up or left and displayed in the currently-played content display layer 160 in a compressed manner.

In some examples, the screen shot content display layer 170 is displayed by default at the right edge of the display, and can be moved to the left edge, to be moved to a lower side, or change a layout direction based on a user's selection. In some examples, the user can also set it at any available position by system configuration.

In some examples, no matter what content is displaying on the screen, a screen shot operation can always be performed to acquire an image which is identical with the content displayed on the screen. The screen shot operation may be performed only when a picture or video is displayed on the screen. Otherwise, the screen shot operation cannot be performed. A difference between these two screen shot operations in that the former screen shot is done after the source content and the On Screen Display (OSD) are synthesized, but the later screen shot is done before the source content and the On Screen Display (OSD) are synthesized, that is to say, just capturing the image of the content source.

The screen shot content display layer 170 includes a screen shot display bar, a recommended content display bar and/or a plurality of user control instruction display bars.

Figure 11:
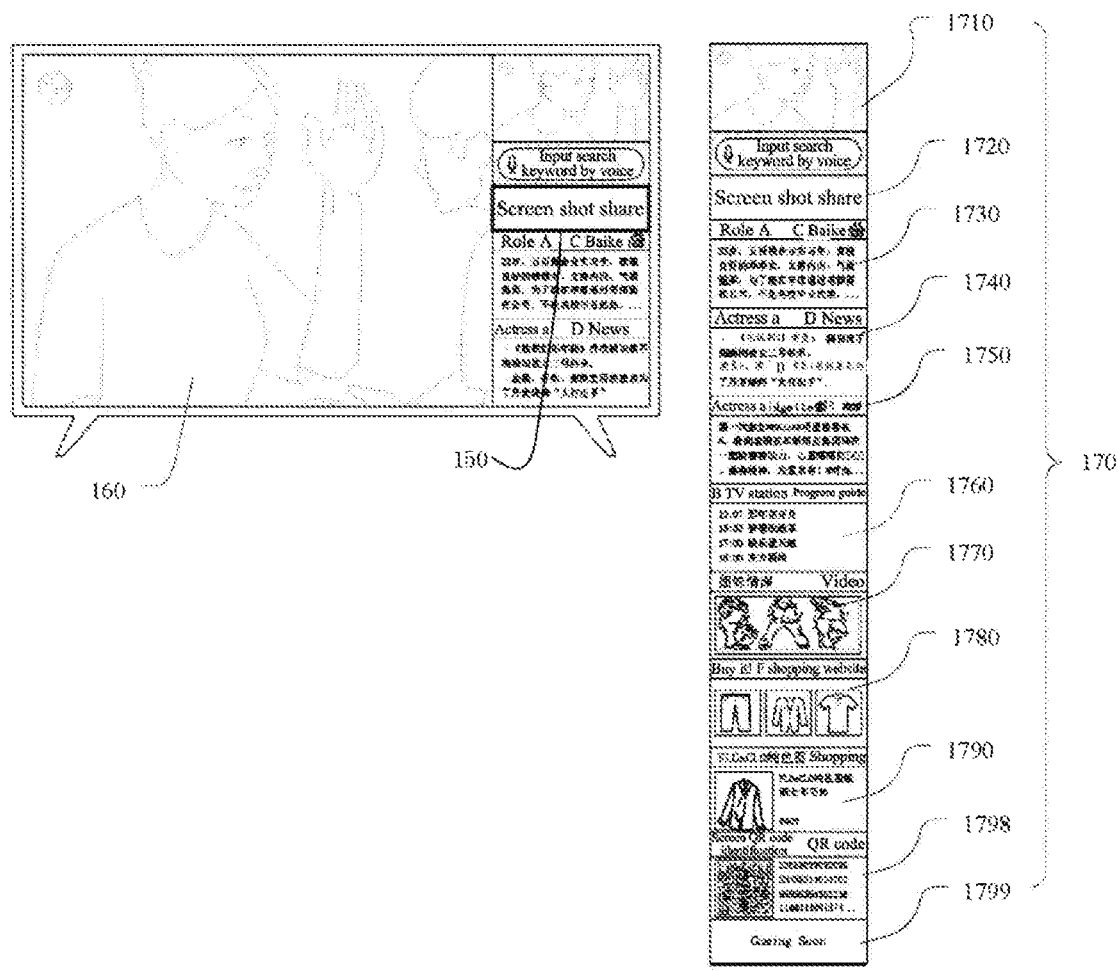
FIG. 11 illustrates another example GUI for selecting and triggering a screen shot.

FIG. 11 illustrates another exemplary GUI when a user triggers a screen shot operation. In the illustrated embodiment, the GUI includes a currently-played content display layer 160 and a screen shot content display layer 170.

As shown in FIG. 11, the screen shot display bar 1710 includes a thumbnail of the current screen shot, and related control instruction display bars include a "Screen shot share" 1720 for providing indications for a user to share the thumbnail of the screen shot in the screen shot display bar 1710 accordingly, and a prompt bar "Input a search keyword by voice" for instructing a user to input a keyword for voice search.

A plurality of recommended content display bars 1730 to 1790 are used to display one or more of the following options: keywords identified or determined from the thumbnail of the screen shots, other content profiles related to the keywords, sources or types of the content profiles.

In an example, when the currently-played content display layer 160 is playing a TV drama 1, a screen shot instruction from a user is received, and a screen shot of a currently-played scene is successfully captured, so that the screen shot display bar 1710 presents a thumbnail of the captured screen shot.

Furthermore, keywords related to the thumbnail are acquired by performing identification processing on the thumbnail, such as a character keyword "Role A", a keyword "Actress a" portraying "Role A", a keyword "B TV station" obtained by identifying the TV station logo of the "B TV station", a keyword "interactions between sisters", obtained by identifying a drama's setting, and a keyword "Pure color round collar female woolen sweater" obtained by identifying the clothing of the characters in the screen shot. It is noted that the above-mentioned image identification process can be performed locally or by a third-party server to acquire those keywords.

According to the above keywords, the recommended content display bars 1730 to 1790 are respectively used to display the keywords, such as "Role A", "Actress a", "B TV station", "interactions between sisters" and "Pure color round collar female woolen sweater", in the above example, content profiles related to these identified keywords, and the sources or types of the content profiles.

For example, if the keyword "Role A" is displayed in the recommended content display bar 1730, the content profile includes a webpage recommended content for introducing "Role A" from a C website, and the icon of the "C" website represents the source of the recommended content, which is specifically as follows.

The keyword "Actress a" is displayed in the recommended content display bar 1740, and the content profiles includes a webpage recommended content for introducing "Actress a"' from "D News". The website icon of the "D News" represents the source of the recommended content. For another example, in the recommended content display bar 1750, the content profile is from a webpage recommended content of the E Weibo.

If the keyword "B TV station" is displayed in the recommended content display bar 1760, the content profile includes recommended information of a program preview list like "15:07 a TV drama name . . . ", and the word "Program guide" represents the type of the recommended information.

If the keyword "interactions between sisters" is displayed in the recommended content display bar 1770, the content profiles includes recommended information of stills of a TV drama named after "interactions between sisters", and the word "Video" represents the type of the recommended information.

The recommended content display bar 1780 is configured to display a keyword "Buy It!", and the content profile includes recommended photos of similar costumes, and the website icon "F Online shopping website" represents the source of the recommended photos.

The keyword "Pure color round collar female woolen sweater" is displayed in the recommended content display bar 1790, and the content profile includes recommended photos, price information and the like of similar costumes, and the website icon "Shopping" represents the source of the recommended photos.

The option bars in the screen shot content display layer in FIG. 11 are each associated with a service or application corresponding to a silo. For example, the recommended content display bar and/or the associated control instruction display bar are each correspondingly associated with a related service or application. When the user selects an option bar, the corresponding service or application of the option bar is activated in response to the user selection.

For example, the "Screen shot share" display bar 1720 is associated with a share function application; and the "Input a search keyword by voice" display bar is associated with a voice recognition application. A plurality of the recommended content display bars 1730 to 1759 and 1780 to 1790 are associated with applications of the browser. The recommended content display bar 1760 is associated with the live TV service application of the silo "Live TV"; the recommended content display bar 1770 is associated with the video on demand application of the silo "Video on demand".

The screen shot content display layer 170 provides access interfaces for users without interfering the currently-played content display layer 160. That is, when the screen shot content display layer 170 is displayed, the user can still watch the content in the currently-played content display layer 160. For example, the screen shot content display layer 170 may be semitransparent to show (that is to say, the user can still watch) the content displayed in the currently-played content display layer 160. The screen shot content display layer 170 allows the user to quickly enter a core function of the smart TV 100, so that the user can see the content activated by triggering the screen shot in the currently-played content display layer 160 all the time. Furthermore, the screen shot content display layer 170 can provide a consistent user experience of all the applications and contain important context content.

The plurality of option bars in the screen shot content display layer 170 can be sorted based on functions and content, including: webpage text content recommendations, such as: C Baike (or Wikipedia) 1730, D News 1740, E Weibo (or blog) 1750, and Video on demand recommendation 1770; and shopping webpage or application recommendations, such as: F Online shopping 1780, Built-in application shopping 1790 and screen QR code 1798, and New function introduction 1799 displayed on the bottommost layer. The screen shot content display layer 170 can be represented by an icon, a text or shortcut, respectively, to describe content found from different media applications. The search content includes texts that include, but not limited to, names (if the search is for identified items brands or similar brands thereof are displayed), titles and main bodies.

In some examples, the user can set the number of lines of a body through the system configuration, such as: not more than four lines. The user can select the option bars in the list to navigate to corresponding content.

The position selected or pre-selected by a user is displayed in a focus frame 150 in the screen shot content display layer 170. For example, the focus frame 150 contains a square frame located around the screen shot. Although the square frame is used in the description, other methods or configurations can also be used to select and/or identify the icons. For example, in addition to the square frame, the focus frame 150 may also adjust the icons of 1720 and the like and the backgrounds of the texts to make the colors, shadows or hues different. Alternatively or additionally, the focus frame 150 may contain magnified icons or texts.

In some examples, the content of the plurality of option bars can be displayed on basis of the user selection in a moving (such as: rolling or sliding) manner. Each option corresponds to a searched or recommended content source, and the type of the content source includes webpage, video, TV program, shopping or QR code.

The content in the option bars is presented as a scrolling or sliding cyclic list, so that the user can search content of interest conveniently, such as: browsing forward or backward. When the last option bar has been browsed through, the page either keeps still or automatically skips to the first option bar.

For the GUI which is presented in response to a screen shot instruction from a user, search results include webpage applications, video applications, TV program applications, shopping applications and the like, and specifically, the search result comprises one or more of the recommended items mentioned above. The types of recommended items can also be configured by a user. For example, the user can decide which type or types of recommended items to display.

Exemplarily, the webpage content source recommendations are generated based on search of a third-party, and a webpage content recommendation related to the screen shot content is displayed by identifying the screen shot content, such as: one or more of following sources: BD Baike 1730, News&Gossip 1740 and Weibo 1750.

In the TV program content recommendations, a third-party application performs image identification on a TV station logo in a video screen shot to display the program guide 1760 of a TV source under this TV station logo.

The video content recommendation is presented in the video recommended content option bar 1770, and a video recommendation related to the screen shot content may be displayed by the third-party application by identifying the screen shot content. A video that is ultimately found for presentation may be a TV drama, a movie or a short webpage video associated with the video content or a currently-played content.

In the shopping content recommendation, the third-party application identifies the screen shot content to display online shopping information of commodities related to the screen shot content. The online shopping information includes one or more of the following items: an F shopping application, a built-in shopping application (such as Juxianggou, amazon, or the like), or a TV shopping channel, and the like.

For QR code displaying, the third-party application generates a corresponding QR code for the screen shot content, so that the user can identify the QR code by scanning to download pictures to another client, or perform other user operations. The QR code information and a thumbnail of the screen shot are synchronously uploaded to the third-party server.

The present disclosure will take an example of playing the TV drama 1 to describe the GUI displayed by the user operation of triggering the screen shot in detail. For example, when the video content of "Role A" in the drama is played, the screen shot operation is triggered by clicking the remote controller or touching the screen or making a gesture, thus presenting the screen shot content to the GUI of the display device. The currently-played content display layer 160 still plays the content of the next moment of the video, and a plurality of option bar lists appear in the screen shot content display layer 170 on the right.

Then, the first option bar displays a thumbnail of the screen shot 1710.

The second option bar displays the control instruction display bar 1720 "Share screen shot".

The third option bar is a search option bar 1730 for displaying "C Baike"-related content provided by the third-party application. This option bar is divided into two bars. "Role A" is displayed on the left of the first bar, and the LOGO of the search source "C Baike" is displayed on the right. Search content (such as basic introduction, personality and temperament and current living conditions) is displayed in the second bar. The option bar may not display full searched content. For example, the body includes not more than four lines, and the remaining portions are hidden.

The fourth option bar is a News & Gossip option bar 1740 for displaying D News-related content provided by the third-party application. The option bar is divided into two bars. The first bar displays "Actress a" on the left, and displays the LOGO of the search source "D News" on the right. The second bar displays entries of search content.

The fifth option bar is a TV program option bar 1760 for displaying "B TV station"-related content, which is searched by the third-party application by identifying the TV station logo of the video play source or the content display layer. This option bar is divided into two bars. The first bar displays "B TV station" on the left, and displays the search source "Program guide" on the right. The second bar displays the details of the program guide, including, but not limited to, a time list and titles of programs played at corresponding time points.

The sixth option bar is a video content option bar 1770 for displaying "Video"-related content in which this role involves, which is searched by the third-party application by identifying a role in the played video. This option bar is divided into two bars. The first bar displays another popular video in which this role participates on the left, and displays the search source "Video" on the right. The second bar displays video pictures.

The seventh option bar is a shopping option bar 1780 for displaying "F online shopping website"-related content, which is searched by the third-party application by identifying clothes and jewels of the role in the video and same or similar to the clothes and jewels of the character. This option bar is divided into two bars. The first bar displays "Buy It" on the left, and displays the LOGO of the search source "F online shopping website" on the right. The second bar displays commodity pictures.

The eighth option bar is a built-in shopping application option bar 1790 for searching content which are the same or similar to the clothes and jewels of the role in the video in related option bars based on the shopping application. This option bar is divided into two bars. The first bar displays a commodity name which is the same or similar to the clothes and jewels of the role on the left, and displays the search source "Juxianggou" on the right side. The second bar displays a commodity cover picture on the left, and displays the commodity name and the commodity price on the right.

The ninth option bar is a screen QR code option bar 1798 provided by the third-party application and used for converting a screen shot into a screen QR code. This option bar is divided into two bars. The first bar displays "Identify screen QR code" on the left, and displays the search source "QR code". The second bar displays a QR code screen shot.

The tenth option bar is a new function introduction option bar 1799 "Coming Soon", which indicates a new function is coming soon.

As mentioned above, the content displayed in the option bars on the screen shot content display layer 170 depend on the content acquired from the screen shot. The plurality of option bars also provide customized information of the respective applications. The screen shot content display layer 170 is formed by combining application option bars, such as: one or more function option bars and one or more content option bars. There is one function option bar, namely a function indication bar, such as: Screen shot share 1720 and Input a search keyword by voice. There are at least two content option bars. The first bar is a navigation bar configured to display an icon of an application and an application name, and the user can select to activate the application, such as C Baike, D News and E Weibo. The second bar is a content region that displays related recommended content found in the above application. The content region can be updated.

Figure 12:
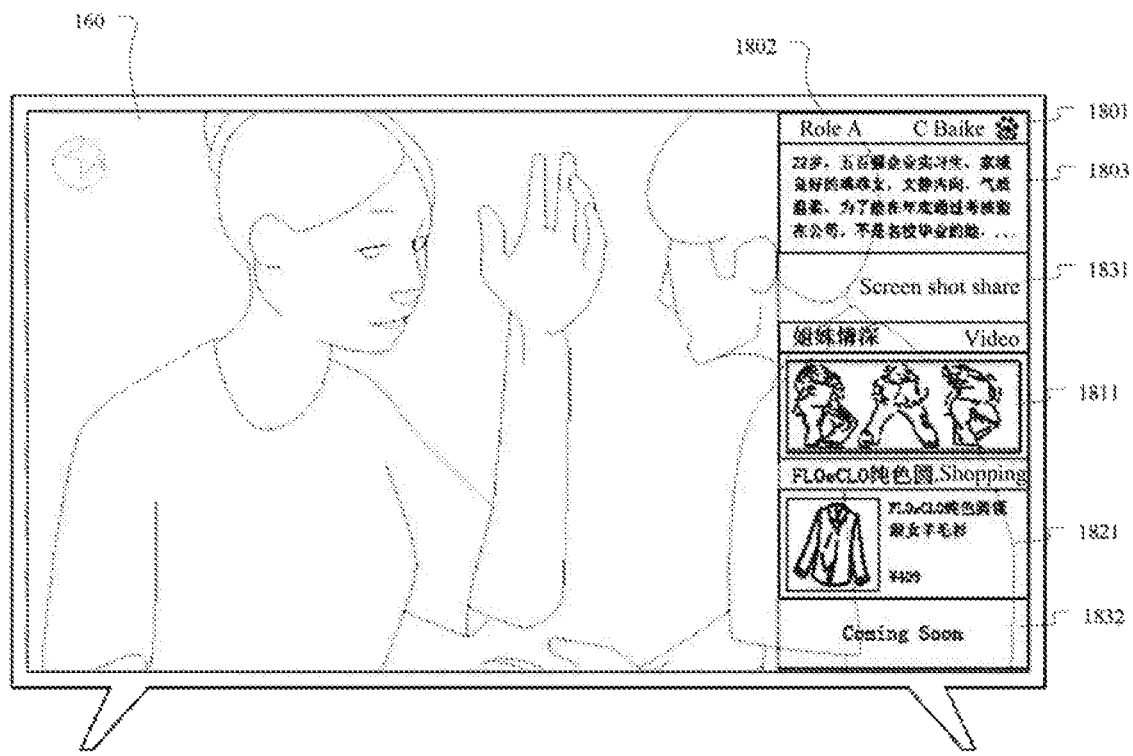
FIG. 12 illustrates another example GUI for selecting and triggering a screen shot.

Further, in some examples, as shown in FIG. 12, the content displayed in the option bars of the screen shot content display layer 170 includes at least one type of the following items: plain text, images and both text and image.

For example, for option bars in plain text, each text option bar can be divided into an upper bar and a lower bar. The name 1801 of the search source is displayed on the right of the first bar, such as: C Baike, D News, E Weibo and F shopping, and the title, theme or search keyword 1802 of a search result is displayed on the left of the first bar. The second bar displays a searched body 1803. The body is generally in a text form, and includes not more than four lines. The exceeding part is expressed by ellipsis at the end of the fourth line. The user can set the number of lines, font, color and the size of the body text in the system. This display mode is more suitable for C Baike presentation and E Weibo presentation.

For another example, for option bars in images, the option bar can be divided into an upper bar and a lower bar. The name 1801 of the search source is displayed on the right of the first bar, such as: C Baike, D News, E Weibo and F shopping, and the title, theme or keyword 1802 of a search result is displayed on the left of the first bar. The second bar displays not more than three found pictures 1811. For another example, for option bars in both image and text, the option bar can be divided into an upper bar and a lower bar. The name 1801 of the search source is displayed on the right of the first bar, such as: C Baike, D News, E Weibo and F shopping, and the title, theme or keyword 1802 of a search result is displayed on the left of the first bar. The second bar displays searched pictures and picture introductions 1821. If it is displayed that the entry is from F shopping, F shopping is displayed on the right side of the first bar, and the title of F shopping is displayed on the left side; and a picture of a F shopping commodity is displayed on the left of the second bar, and basic information (such as size, color and price) of the commodity is displayed on the right side of the second bar. In this embodiment, the GUI of the option bar may be at least one type of plain text, images and both text and image.

In some examples, the option bars of the screen shot content display layer 170 also display function option bars. As shown in FIG. 12, the function option bar card is half the height of the content option bar, is plain text by default, has a size consistent with the size of the title of the content option bar (such as Screen shot share 1831 and New function introduction icon "Coming Soon" 1832), and can also be freely designed (such as Input a search keyword by voice).

As previously described, the GUI can present a display object with an option bar. The user selects the option bar to browse various types of search content, and when the option bar is selected through the remote controller, the gesture or the touch on the screen, information of the selected information type in the current option bar is presented to the user. For example, when selected, the option bar makes a list of a description, a summary and a related text or a picture descriptor. The content profile is displayed in the content display layer, and the user can move the focus frame of the option bar onto an icon or a user interface pattern through the remote controller, the gesture or the touch on the screen. When moving the focus frame, the user can select the content corresponding to the option bar through the remote controller, gesture or touch on the screen again, and will read more detailed content associated therewith, as shown in FIGS. 15A to 15D.

Figure 13:
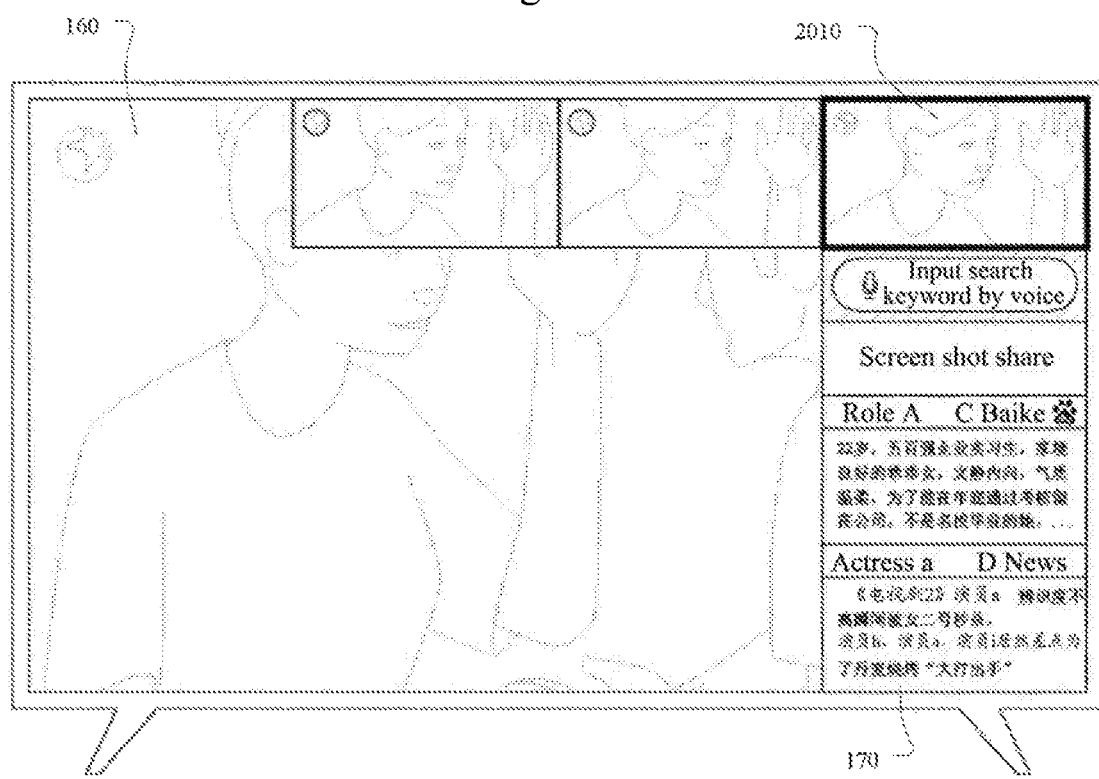
FIG. 13 illustrates an example GUI for selecting a screen shot image option bar.

As shown in FIG. 13, when the user moves the focus frame to select the screen shot display bar 1710, the screen shot is displayed on the screen shot content display layer 170, and three continuously captured shot thumbnails spread and extend from right to left to the currently-played content display layer 160 for user selection, and the user can also pre-configure the number of continuously captured thumbnail images. On one hand, the user can re-select one of the above multiple screen shot images for the search operation again, so that the user can accurately obtain a desired image during the screen shot operation. On the other hand, the user can watch, access, and/or post social content related to the selected screen shot from his/her social network.

When the user selects the "Screen shot share" option bar 1720, the screen shot can be transmitted to other clients through "intranet" and "external network", such as: a mobile phone and a tablet computer.

The user installs an application associated with the smart TV 100 on another client, for example, the Hisense assistant APP is downloaded and installed on another client, and then the "intranet" performs transmission through a network link between the client and the smart TV. At this time, a detail page of screen shot on the client provides prompts such as "if your phone and the TV are in the same network, you can directly open the application, such as a TV micro assistant associated with the smart TV" for the user to obtain the screen shot. If the application of the mobile phone is running in the background, the mobile will pop a prompt for the user upon receiving a push notification from the TV. If the application is not running in the background, the user needs to open the application. If the TV is connected, the mobile phone can request for the screen shot information on its own initiative and determines whether this information "has been read" by the user. If NO, a prompt is popped out to the user.

Figure 14:
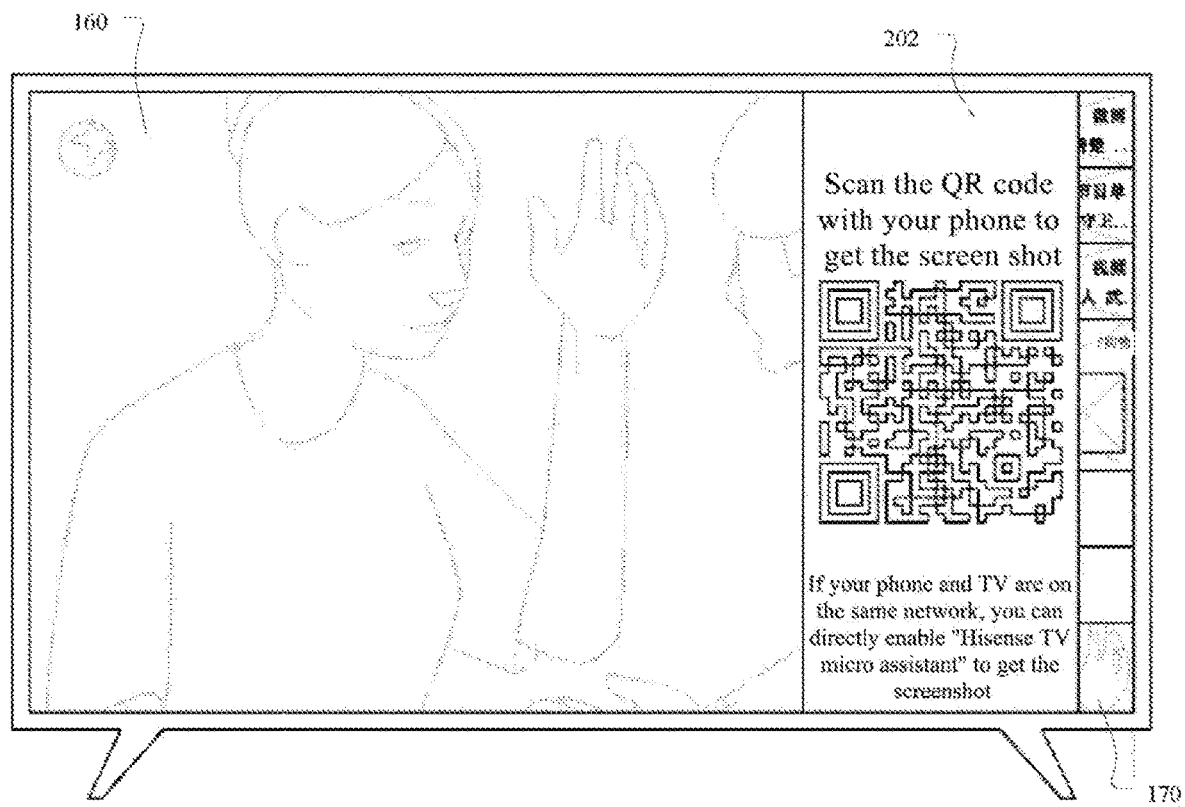
FIG. 14 illustrates an example GUI for selecting a "Screen shot share" option bar under an external network.

By the "external network", images are uploaded to a server, and a user obtains a screen shot by opening a webpage with this screen shot. The opening of the webpage can be realized by scanning a corresponding QR code. FIG. 14 illustrates an exemplary GUI for selecting the "Screen shot share" option bar through the external network. When the user selects the "Screen shot share" option bar, the "external network" uploads the images to the server, and the GUI includes the currently-played content display layer 160, the screen shot content display layer 170, and a QR code window 202 overlaying on the option bar. The QR code window displays a QR code of webpage where the screen shots store, and the user obtains the screen shots by opening the webpage with the QR code information. If the client is a mobile phone running Android system, the user can directly align a scanning region with the QR code in the display layer for scanning to download the images. If it is a mobile phone running iOS system, the scanning region is aligned with the display layer of the TV and a long press is made, thereby realizing the purpose of downloading the images.

For the window information 202, the user will be required to connect any type of device to the TV 100 or a TV 100-associated network, so as to extract stored or established media such as images and videos to the TV 100. Once the scanning is done, the mobile phone can store the content displayed through the media center silo.

Figure 15A:
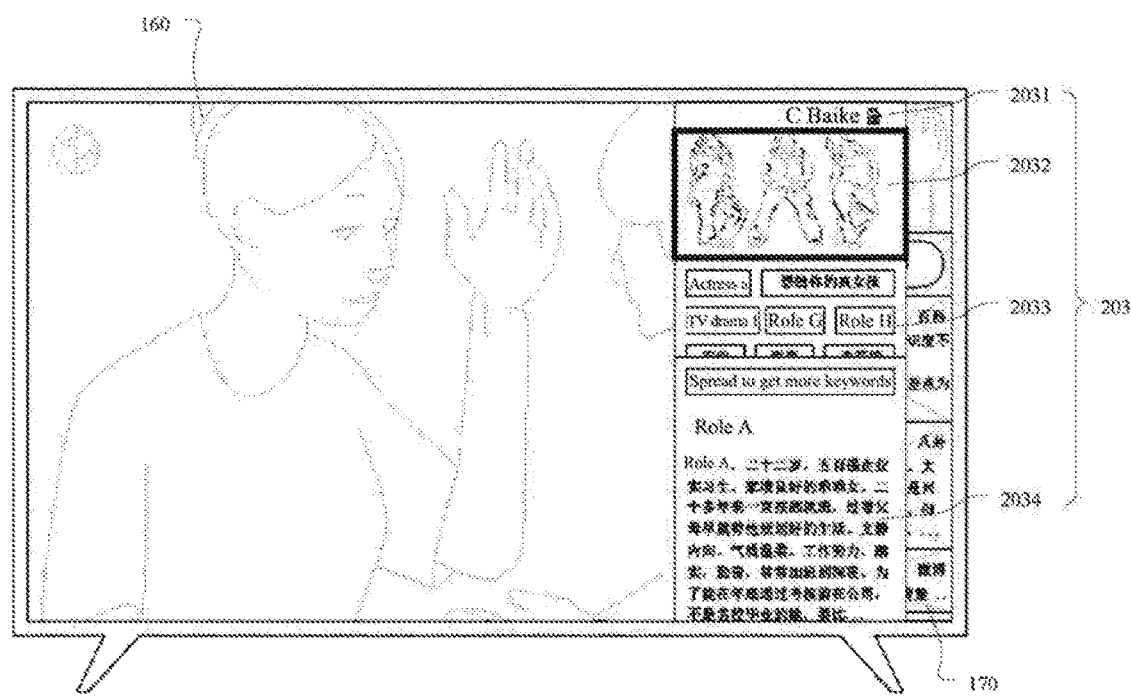
FIG. 15A illustrates an example GUI for selecting a "Baidu Baike" option bar.
Figure 15B:
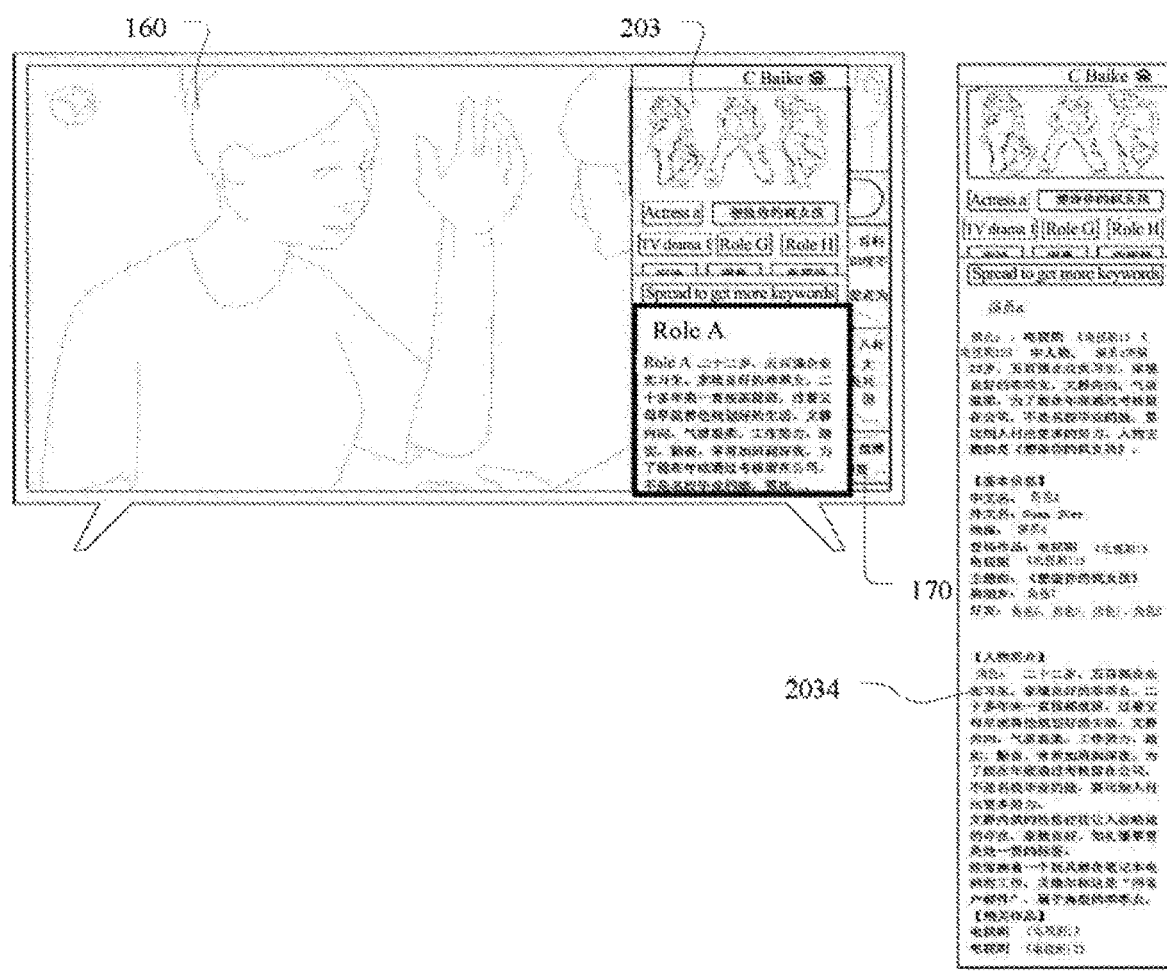
FIG. 15B illustrates an example GUI for selecting a description bar under the "Baidu Baike" option bar.

FIG. 15A illustrates an example GUI for selecting the "C Baike" option bar by the user. In the illustrated embodiment, a C Baike information window 203 is displayed on the option bars in the screen shot content display layer 170. The C Baike information window 203 overlays the screen shot content display layer 170, such as: a Logo bar 2031, an album bar 2032, an associated word bar 2033 and an entry detail bar 2034. The Logo bar 2031 displays the C Baike Logo, and the album bar 2032 displays screen shots, item pictures and albums. The associated word bar 2033 displays a tag or a meaning item, and content not completely displayed in the detail bar 2034 at the bottom of the screen are replaced with an ellipsis. When the user selects the detail bar 2034, a text introduction for introducing the screen shot and related information is displayed. As shown in FIG. 15B, the user can browse content of interest in a sliding manner by clicking the remote controller, making a gesture or touching the screen.

Displaying the associated word bar 2033 during playing of the video of the TV drama 1 is taken as an example, such as: TV drama 1, role G, role H, role I, role J and role K. The entry detail bar 2034 includes an overview, basic information and the body of the entry. The user obtains relatively comprehensive introduction information from a screen shot page to learn more related resources.

Figure 15C:
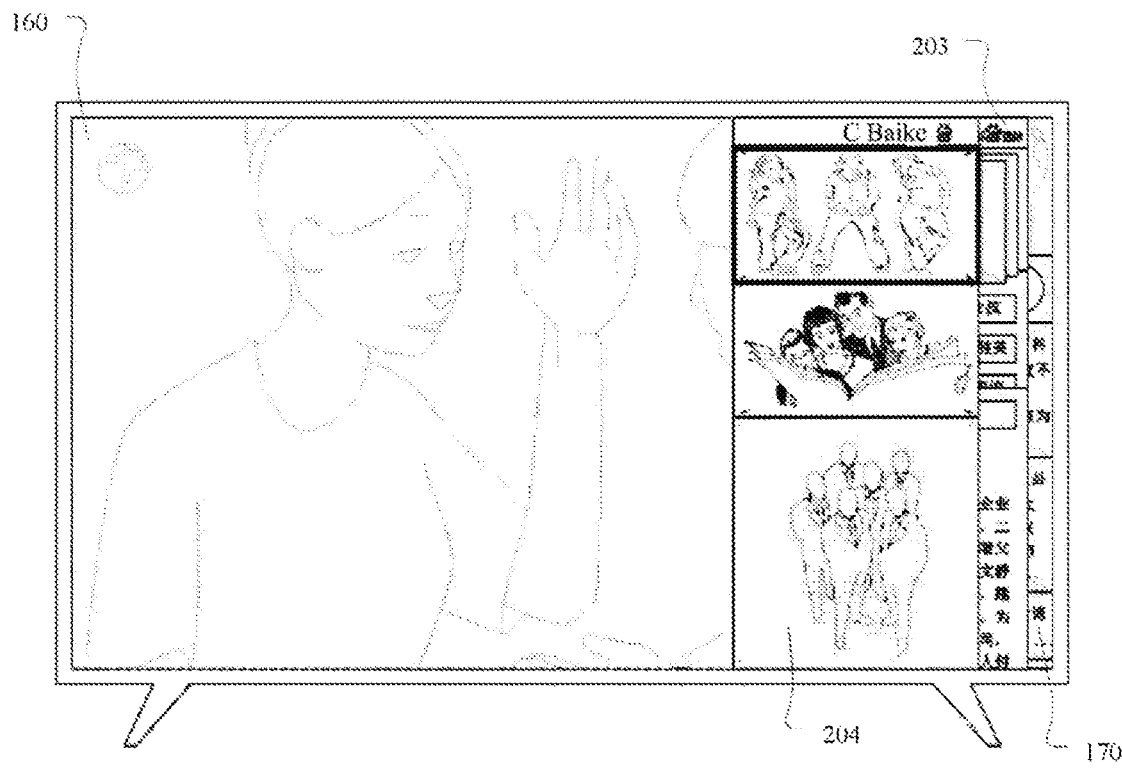
FIG. 15C illustrates an example GUI for selecting an album bar under the "Baidu Baike" option bar.
Figure 15D:
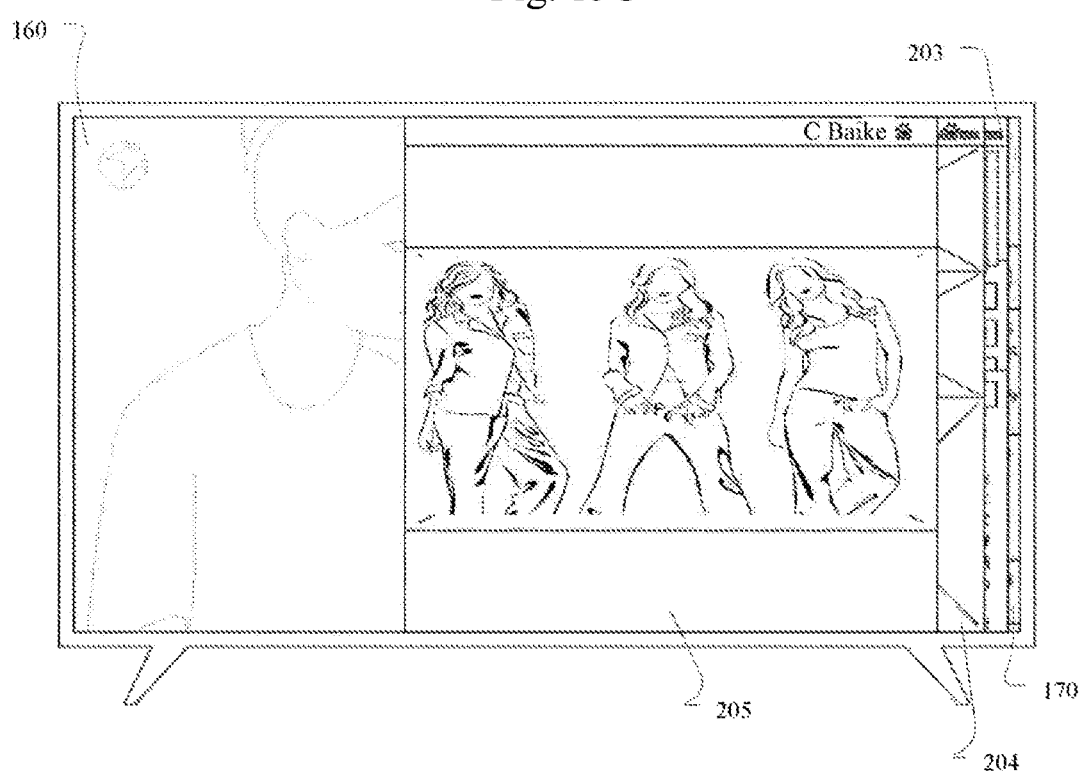
FIG. 15D illustrates an example GUI for selecting a picture in the album bar under the "Baidu Baike" option bar.

FIG. 15C illustrates a scenario where a user moves the focus frame to the album bar 2032, and selects the album bar 2032, and a new image list window 204 overlays on the C Baike information window 203 for displaying related image lists, and the focus frame can be moved up and down in the image list window 204 to select pictures that you want to view further. Once the user focuses on any of the pictures in the picture list window 204, another GUI for interacting with the selected picture is provided to the user, and an image window 205 covers part of the image list window 204 and displays a single image. If the image is displayed in its entirety, it is viewed as a full-screen square, as described with reference to FIG. 15D.

In some embodiments, in a scenario where content in Baike is not complete, the content may not include any one or more of the album bar, the keyword bar, the Logo bar and the entry detail bar. For example, no albums and keywords are displayed, and only the entry detail bar is displayed, or no related word bar is displayed, and the album bar and the entry detail bar are displayed.

Figure 16A:
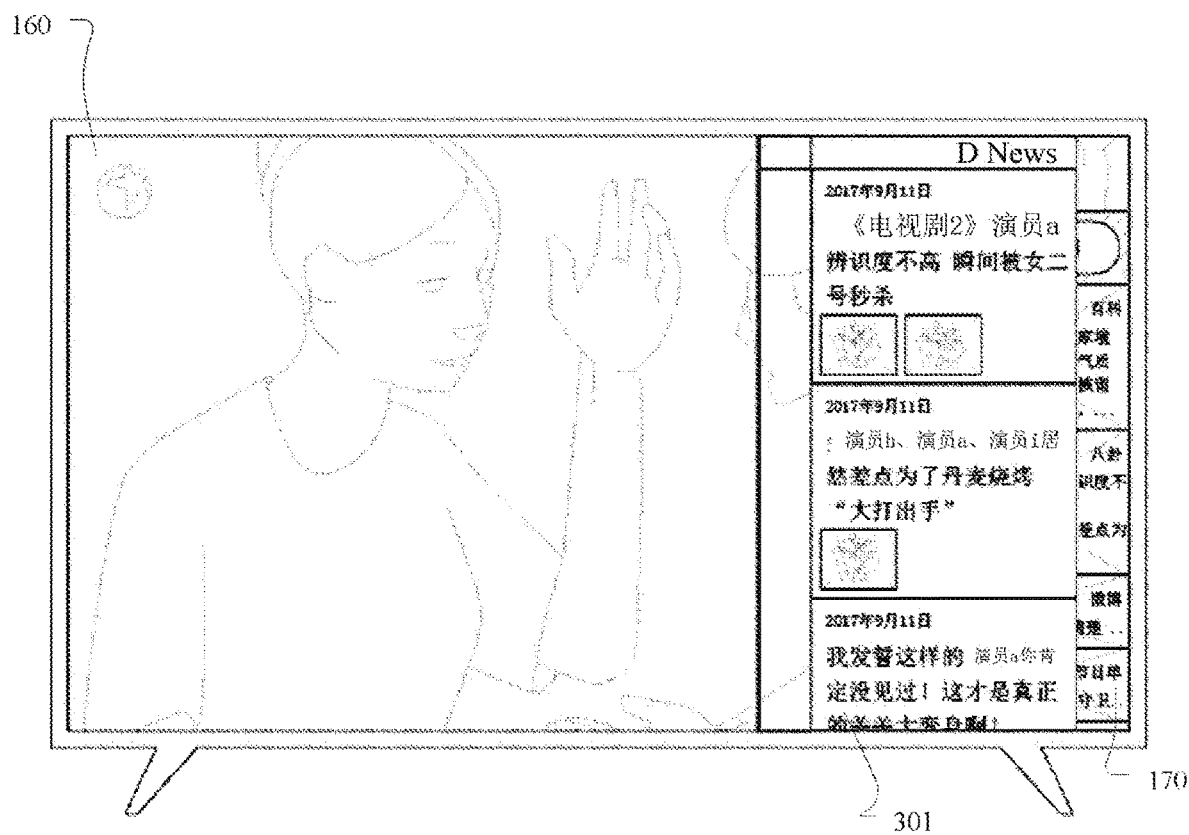
FIG. 16A illustrates an example GUI for selecting a "News" option bar.

FIG. 16A illustrates a GUI example where the news option bar 1740 is selected by the user. In the example, the GUI comprises a news event list window 301, which floats above the screen shot content display layer 170. Furthermore, the news event list includes a plurality of news event option bars, each of which describes a news event, including a date, a title (for example: the title is set to include no more than five lines, portions beyond the five lines of the title are hidden, and "..." is used at the end of the fifth line to indicate that the title is hidden), and a picture (for example: you can select to display or not display a picture in setting configuration, and if you select to display a picture, three pictures can be displayed in the form of thumbnail at most).

Figure 16B:
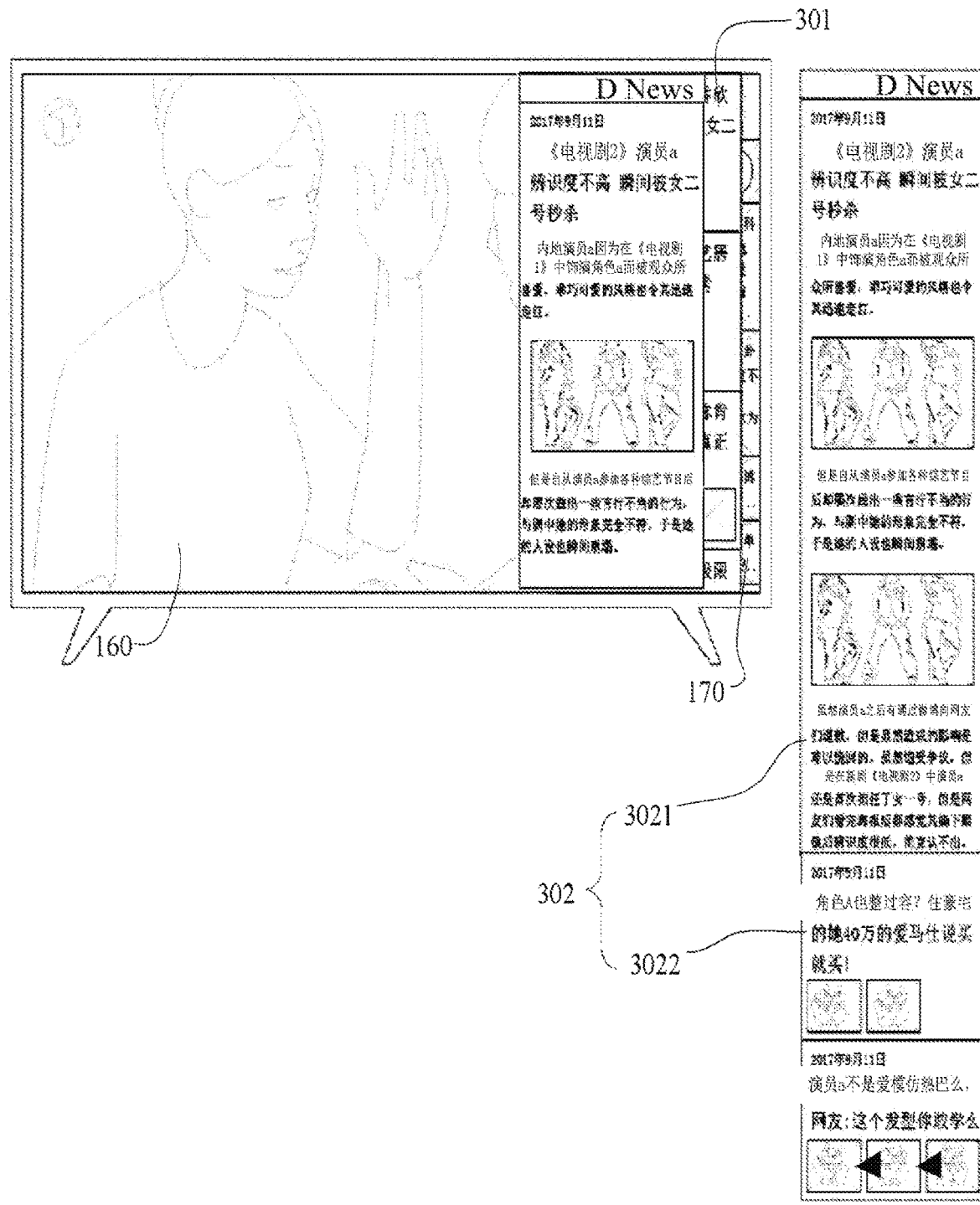
FIG. 16B illustrates an example GUI for selecting a news event confirm option bar under the "News" option bar.

FIG. 16B illustrates a scenario where a user selects a specific news event option bar, namely the news event window 302, and then the news event window 302 floats above the news event list window 301 in response to the user's selection. Here, news events selected by the news event option bar 3021 spread fully, including the titles, post date, texts and pictures of all the news records, while the unselected news event option bars 3022 still only displays the title and part of the pictures. The not displayed parts can be viewed by scrolling the list.

Figure 17A:
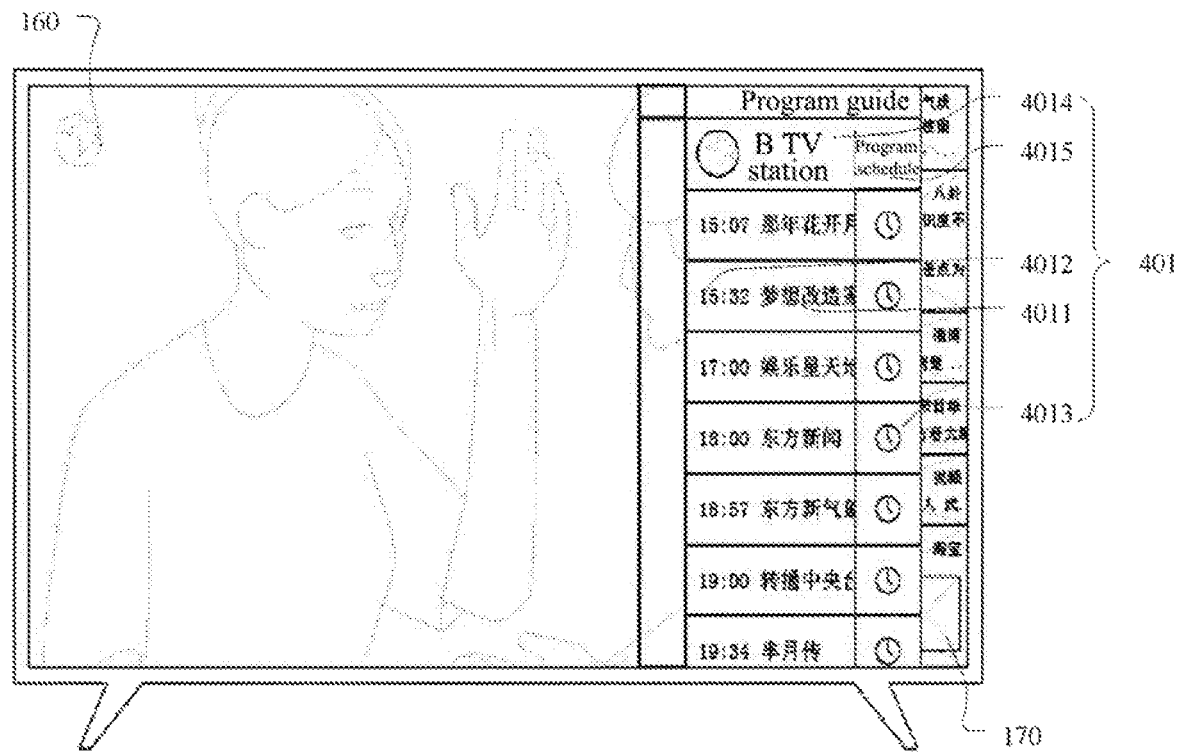
FIG. 17A illustrates an example GUI for selecting a "Program guide" option bar.

FIG. 17A illustrates an example GUI where a user selects the "program guide" option bar. In the example, the GUI includes a program guide list window 401. The program list window 401 floats above the screen shot content display layer 170. When a TV program channel is identified, a program guide list of the TV program channel is displayed, such as: names of programs to be played at the next time period or being played. "B TV station" is taken as an example. The program guide list window 401 displays program teasers to be played by the B TV in the next time period, including two columns, one column showing names 4011 and play time 4012 of programs to be played in the next period, and the other column showing program schedule icons 4013. When the program schedule icon of a desired program is chosen by a user, a reminder will be sent to the user when a scheduled time corresponding to the desired program reaches. The program guide list window 401 presents introduction lists of all the programs in a multi-line form.

Figure 17B:
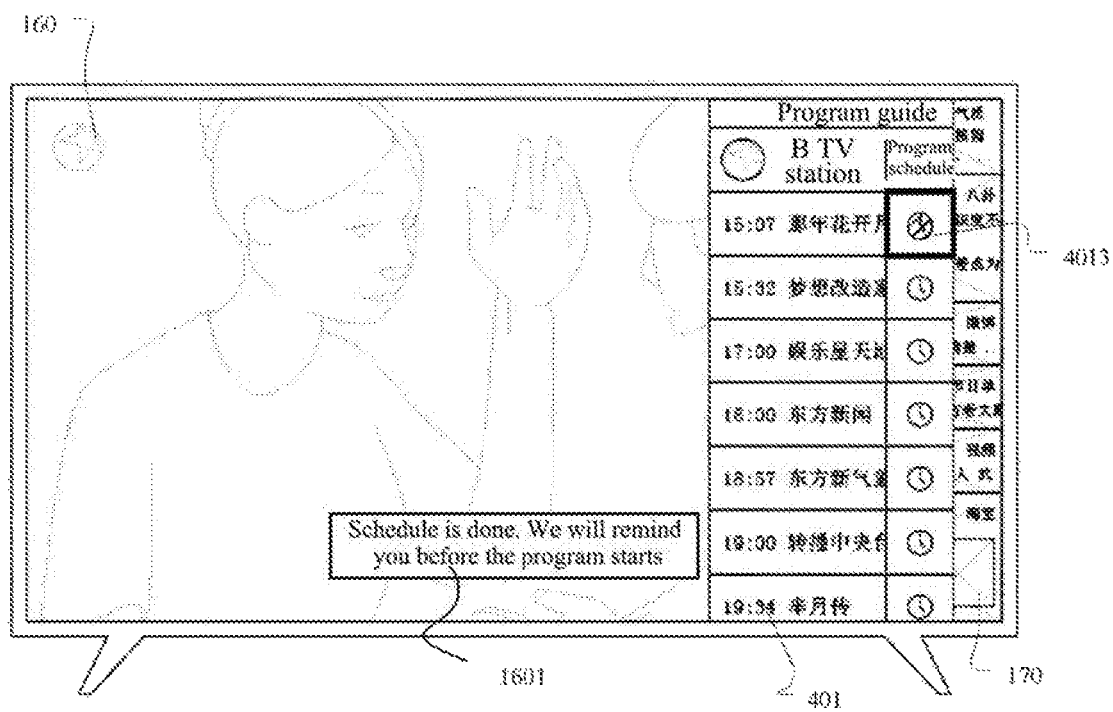
FIG. 17B illustrates an example GUI for a program schedule option bar.

FIG. 17B illustrates a GUI example where a user selects the program schedule option bar 4013. When the user selects and confirms the program schedule icon 4013, the content display layer shows a schedule reminding bar 1601 indicating that a reminder will be sent to the user before the program starts.

Figure 17C:
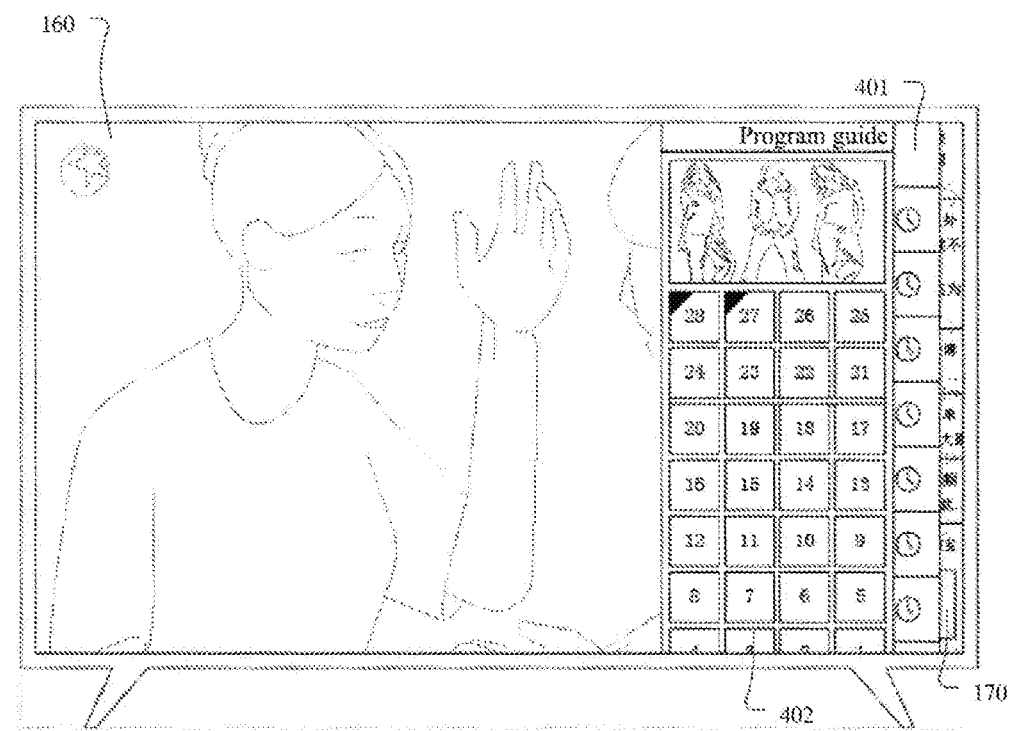
FIG. 17C illustrates an example GUI for selecting a program name option bar.

FIG. 17C shows a GUI example where a user selects the program name option bar 4013. In the example, a third-party video application is activated to store video content that had been played in the past. A new program episode number list window 402 floats above the program guide list window 401 for displaying the number of episodes of a program that had been played in the past, and the user can select to play the program. When a specific episode is selected, the currently-played content display layer 160 displays a skip reminding bar 1602 "skip after 5 seconds" to activate another video application silo (e.g., a video on demand application, or a TV live broadcast application), and the selected program is played through the video application, or the user can select "Back" to continue to play the program of the current silo, as described with reference to FIG. 17D.

After the user selects controls on the above GUI, the smart TV 100 can provide the user with the silo content conveniently and quickly, such as: playing TV broadcast signals, presenting a menu for VOD or providing previous video displayed in the VOD application, displaying one or more images or menus to select images in the media center, displaying menus or applications previously executed in the application silo, or displaying other types of silo content. Thus, based on the silo and the content displayed by the silo, the user can perform logical and situation interaction with the TV 100.

Figure 18:
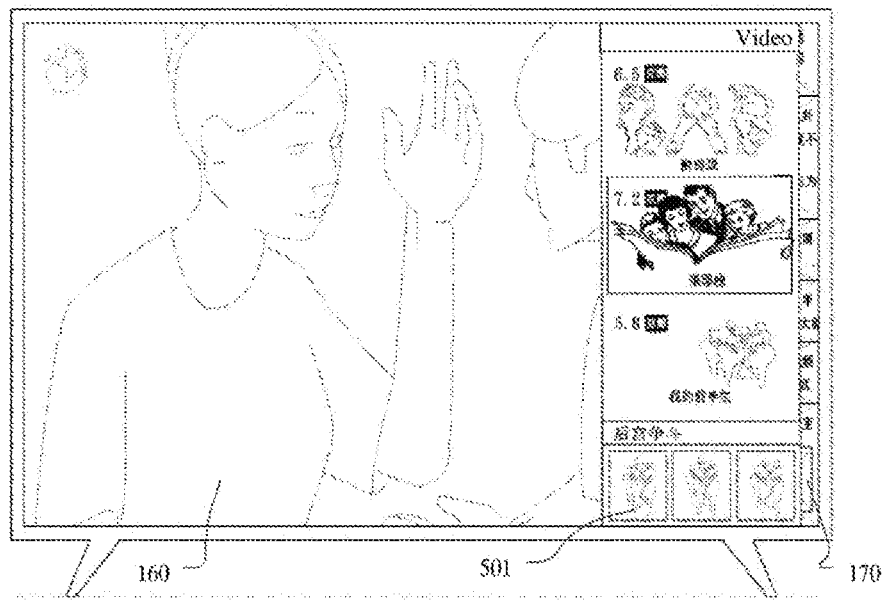
FIG. 18 illustrates an example GUI for selecting a video on demand option bar.

FIG. 18 illustrates a GUI example where a video on demand option bar is selected by a user. In the example, the GUI includes a video option bar list window 501, which floats above the screen shot content display layer 170, and the video option bar includes rating scores, a movie poster and a movie name. Under this option bar, the video on demand (VOD) silo is activated, and the video option bar list window 501 is displayed as a plurality of video option bars that are highly similar to such videos, or video content, in which the user is highly interested, of currently-provided media content, such as: war films, murder suspense films, musicals and comedies that are favored by the user.

In some examples, each line of the video option bar list includes video information related to a currently-played video. The video content most related to the currently-played video is located at the topmost end of the video option bar list. The video option bar list window 501 is a scrolling video option bar list (after the last related content is displayed, the user can skip to the first related content without going back to the first display content in order) or a sliding video option bar list.

Figure 19A:
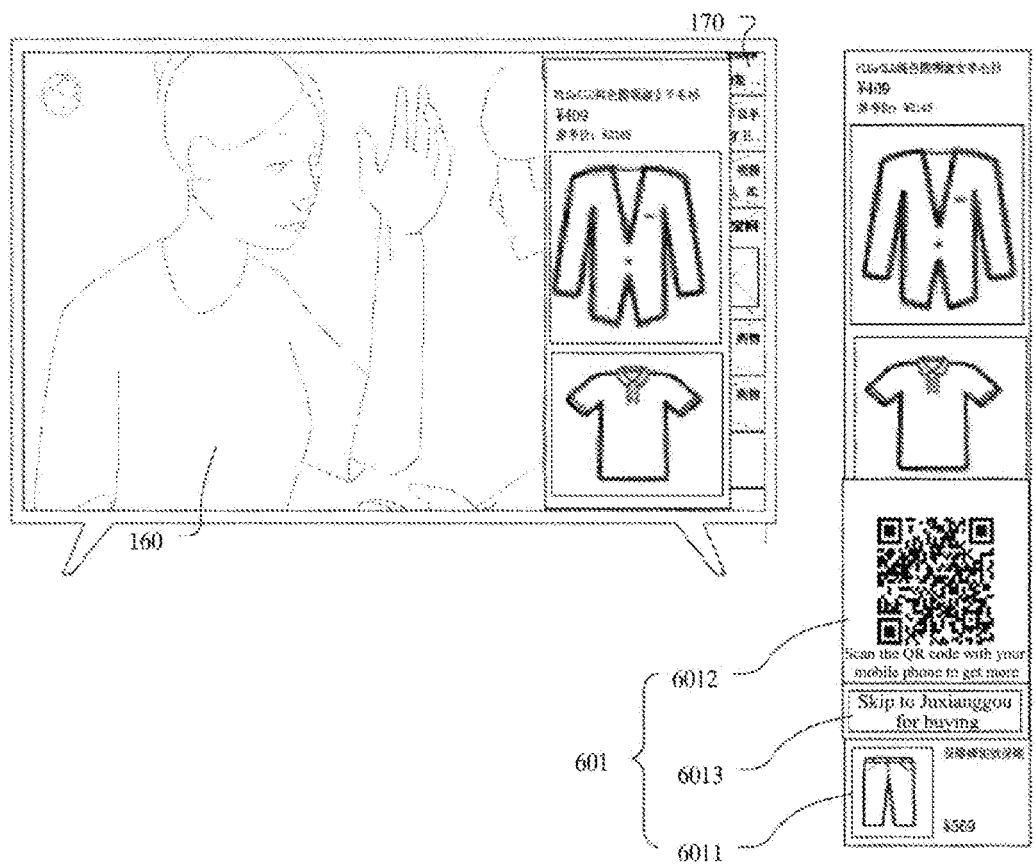
FIG. 19A illustrates an example GUI for selecting a shopping option bar.

FIG. 19A illustrates a GUI example for selecting the shopping option bar 1790. In the example, the GUI includes a shopping information list window 601, which floats above the screen shot content display layer 170. The shopping information list window 601 includes a plurality of commodity introduction sub-option bars 6011, a "Scan QR code" sub-option bar 6012, and a shopping application skip sub-option bar 6013. In some examples, when the user selects the commodity introduction option bar, the commodity introduction option bar is folded, and the shopping information list window 601 specifically displays commodity details (including dimensions, sizes, colors and specifications).

In some examples, when the user selects the "Scan QR code" option bar, the QR code is magnified to the entire shopping information list window 601 and presented in square, and more commodity information is obtained from the mobile phone through the mobile phone scanning.

Figure 19B:
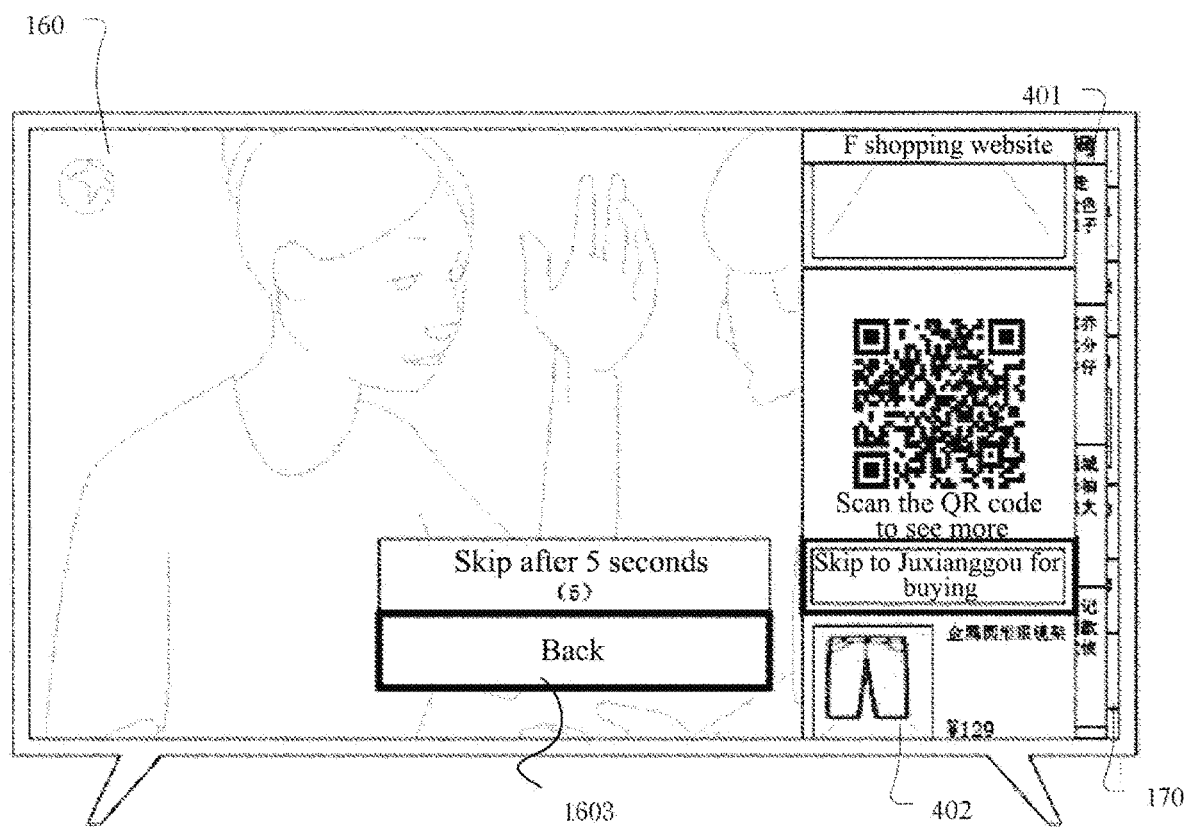
FIG. 19B illustrates an example GUI for selecting a system-provided shopping application option bar.

In some examples, when the user selects the shopping application skip option bar 6013, the system shopping application (such as Juxianggou) is in a to-be-activated state, and the skip option bar 1603 is displayed at the bottom of the currently-played content display layer 160, including a prompt for indicating skip (such as skip after 5 seconds) and a prompt for indicating going backward. When the user selects the prompt for indicating skip, the system activates the shopping application and skips to a TV shopping page to facilitate shopping on TV, as described with reference to FIG. 19B.

Figure 20:
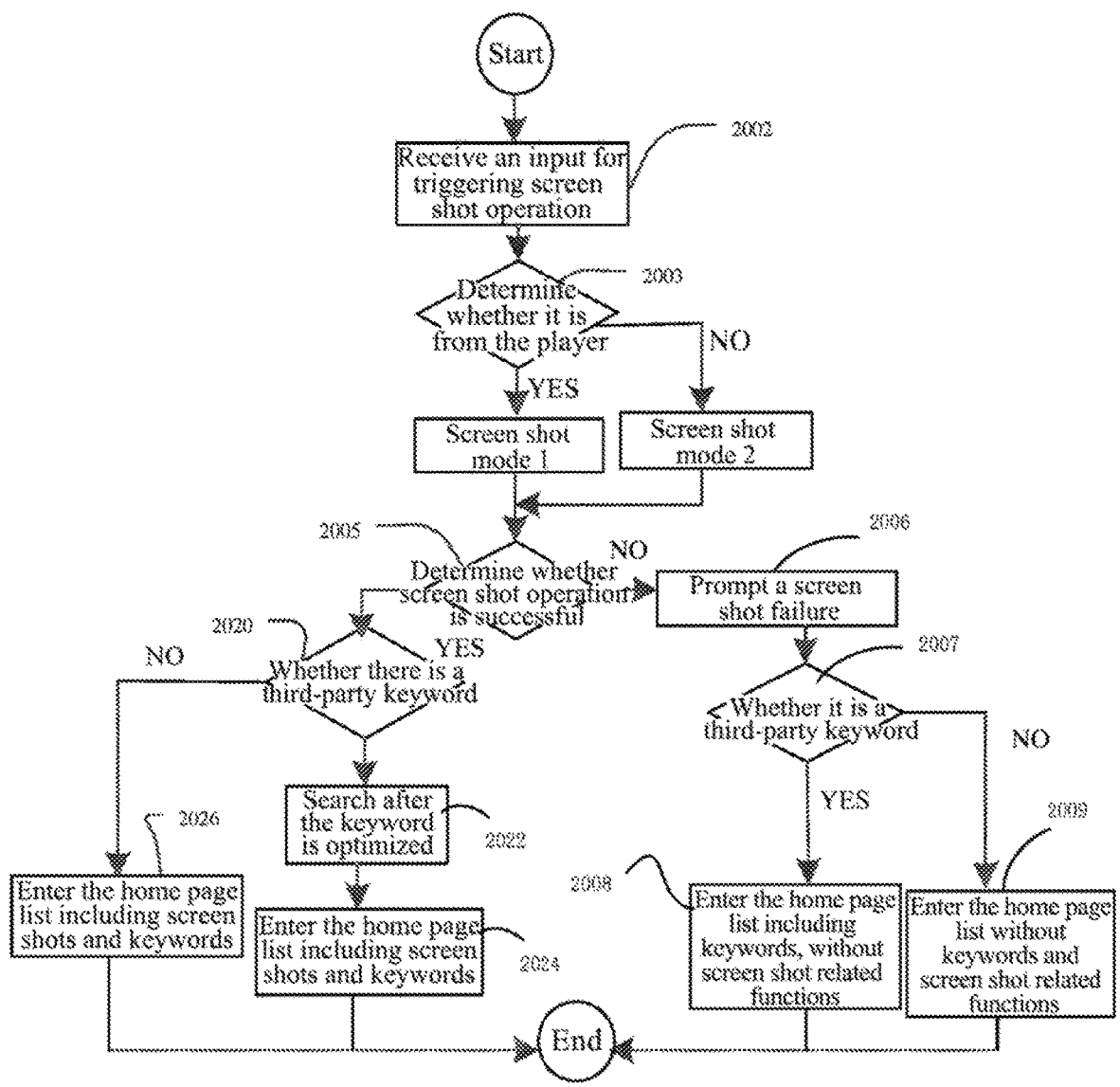
FIG. 20 illustrates an example flow diagram of selecting a screen shot to obtain a screen shot and keyword GUI.

As shown in FIG. 20, some embodiments provide an example of a method 2000 for displaying an application through screen shot capturing. Although FIG. 20 shows a general execution order of the method 2000, the method 2000 may include more or fewer steps, or the steps may be arranged in an order different from that of the method 2000 as shown in FIG. 20. The method 2000 is a set of computer-executable instructions that can be executed by a computer system or processor, encoded or stored on a computer-readable medium, or specifically embodied as circuits in an application specific integrated circuit (ASIC) or a field programmable gate array (FPGA) that can perform the method. In the following, the method 2000 will be explained with reference to the system, components, modules, data structures, user interfaces and the like illustrated in FIGS. 1 to 21.

In Step 2002, the driver receives a screen shot signal, from the remote controller, a gesture, or a touch on the screen. The screen shot signal will be transmitted to the input event transmitter. The input event transmitter 508 determines whether the signal is from a player according to information from the driver 420.

In Step 2003, if the signal is from the player, the screen shot operation is performed by a screen shot mode 1, if the signal is not from the player, the operation is performed by a screen shot mode 2.

In Step 2005, whether the screen shot operation is successful is determined. If the screen shot operation is successful, the operation of Step 2020 is performed, and otherwise, the operation of Step 2006 is performed.

In Step 2006, "Screen shot failure" is prompted. Then, Step 2007 is executed, in which whether there is third-party keyword. If YES, the home page list is continued, but there is no screen shot related function, and the screen shot event is ended in Step 2008. If NO, the currently-displayed page still continues, no keywords is displayed on screen shots and sidebars, so that no functions and content can be provided, and the screen shot event is ended in Step 2009.

Figure 21:
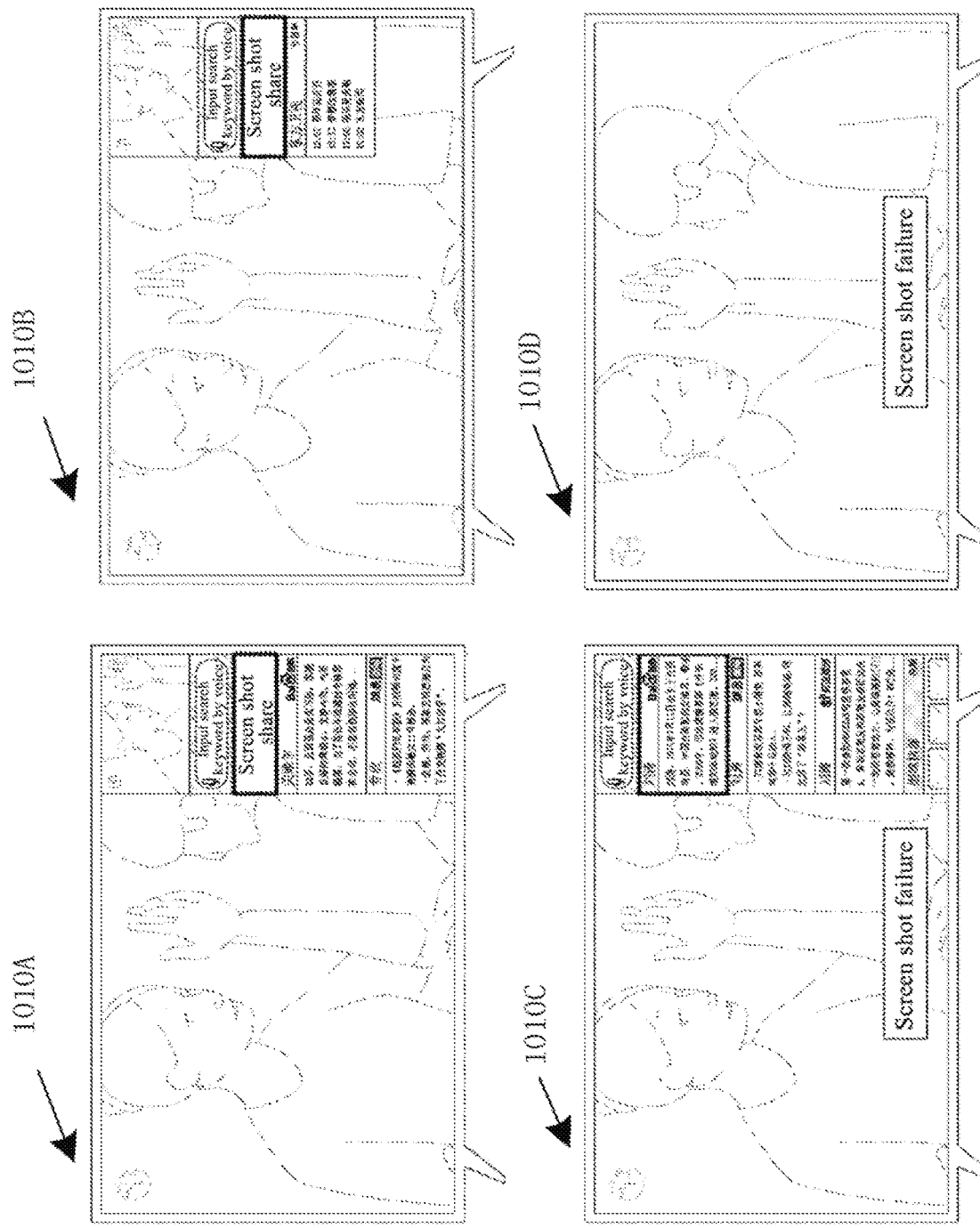
FIG. 21 illustrates an example GUI on which a user triggers a screen shot capturing instruction.

In Step 2020, whether there is a third-party keyword is determined. If NO, Step 2026 is executed to step into the home page list, only a screen shot is acquired, a TV station logo may be identified, and only screen shot related information is provided. If YES, Step 2022 is executed to optimize keywords and/or search the optimized keywords, and then Step 2024 is executed to normally step into the home page list. Keywords and sidebar information of the keyword option bar are displayed. FIG. 21 shows four different exemplary GUIs (1010A, 1010B, 1010C, or 1010D), on which a user triggers a screen shot capturing instruction.

Figure 22:
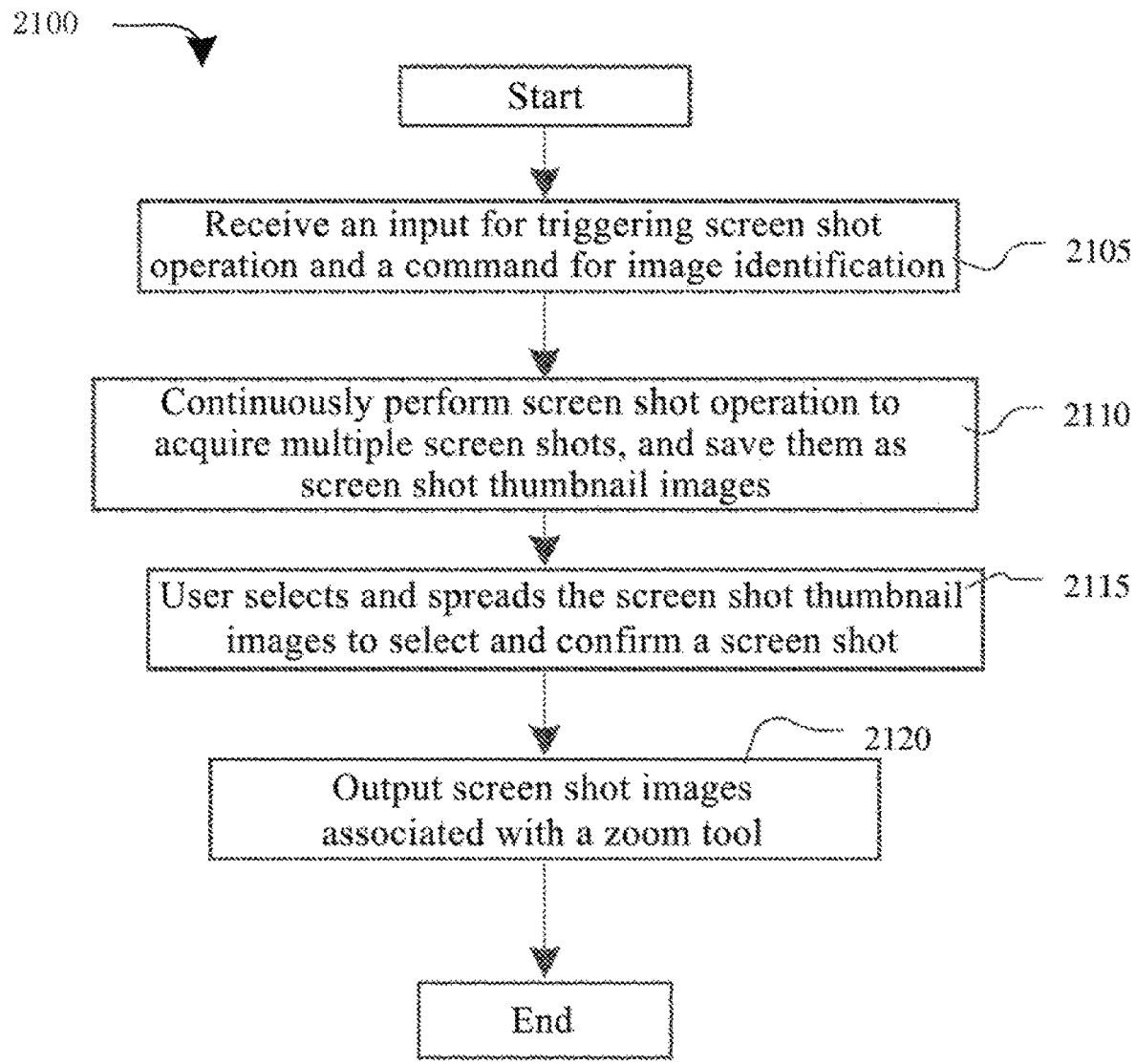
FIG. 22 describes a flow diagram of a screen shot capturing process according to the present disclosure.

FIG. 22 illustrates a process 2100 for screen shot capturing according to some embodiments. As shown in the figure, the process 2100 begins by receiving (at 2105) a command for uploading the screen shot to a photo sharing website. The application can receive the command via a remote controller button, a gesture or a touch on the screen or the like.

The process then determines (at 2110) to capture multiple screen shots before and after the time point of the command, and display them on the screen shot content display layer 170 in thumbnail, and not all the screen shot images are displayed on the sidebar, but only one thumbnail is displayed. When the user selects thumbnails of the screen shots (at 2115), the thumbnail on the sidebar is spread to the currently-played content display layer 160, and all of the screen shot images are presented to the user to provide options. After the user selects a specific screen shot, the process determines that the image (2120) is stored in an image storage region (such as a photo album) of the smart TV 100, and creates a log.

Figure 23:
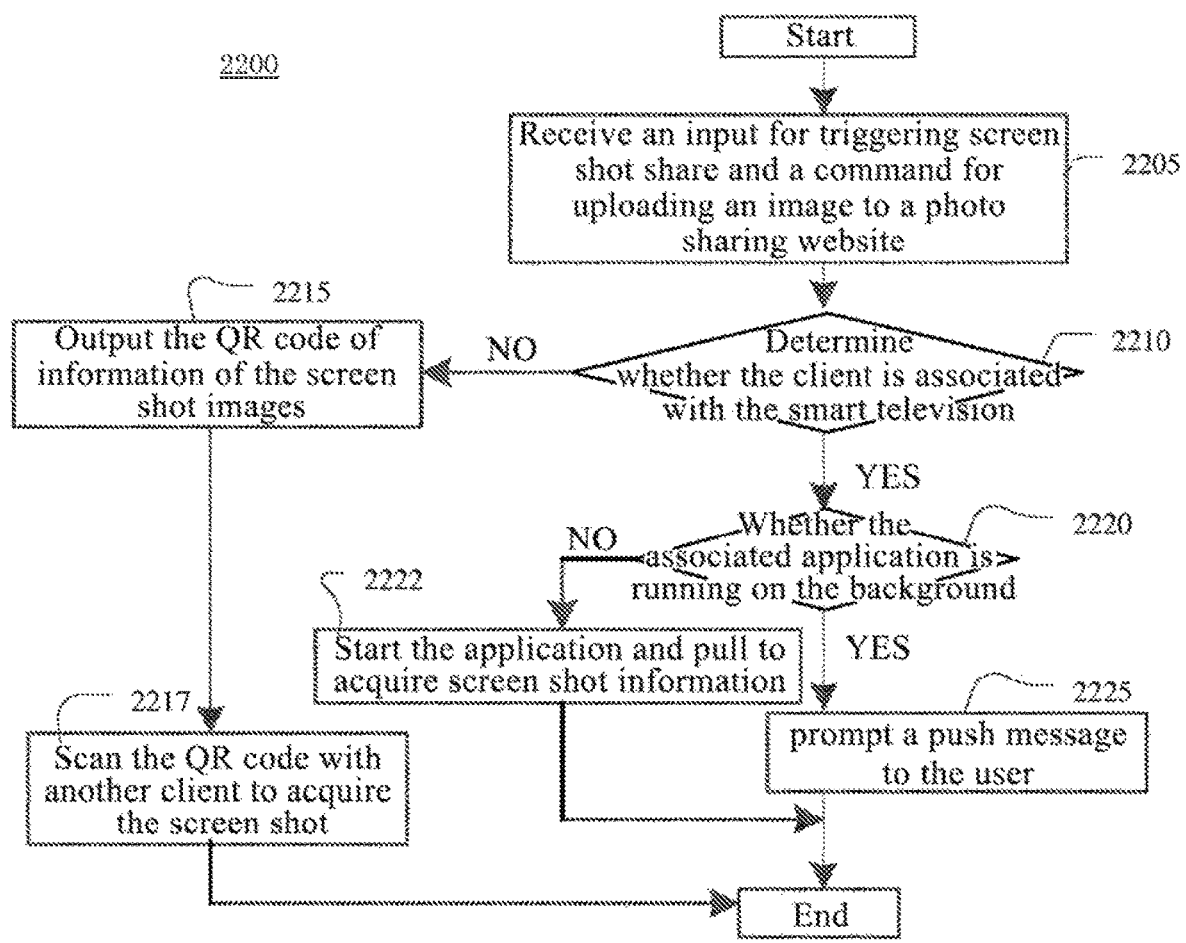
FIG. 23 describes a flow diagram of a process of acquiring a screen shot image at a client according to the present disclosure.

FIG. 23 illustrates a process 2200 for sharing a screen shot to another client according to certain embodiments. Although FIG. 14 refers to a website that shares screen shots, this can be a "photo sharing" website or a social media application (such as a chat tool). As shown in the figure, the process 2200 begins by receiving (at 2205) an input for triggering screen shot share and a command for uploading an image to a photo sharing website. The application can receive the command via a user interaction such as a remote controller button, a gesture or a touch on the screen or the like.

The process then determines (at 2210) whether another client is associated with the smart TV, that is, an application associated with the smart TV is installed in the client such that the smart TV and the client can directly exchange data. An application for data exchange between the user and the client is specially installed in the smart TV. The user installs the application associated with the smart TV 100 on another client (for example, the Hisense assistant APP is downloaded and installed on another client), and then the "intranet" performs transmission through the built network link. At this time, the other client shares a detail page of screen shot to explain "if your phone and the TV are in the same network, you can directly open the application (such as: "Hisense TV micro assistant") associated with the smart TV" to the user to capture a screen shot.

When another client of the user is associated with the smart TV 100, the process determines (at 2220) whether the associated application is running in the background. The user may possibly have opened the associated application. In the application interface or when the application is running in the background, namely when the TV transmits a screen shot message, the user can receive it immediately. The process determines (at 2225) that the TV will prompt a push message to the user, and transmits a screen shot image to the client to prompt the user to receive the message. At this point, the process is ended, and the user receives the image shared by the smart TV on the other client. Otherwise, when the associated application is not opened, the user in the process 2222 needs to initiate the application and pull to acquire screen shot information, and then the process is ended.

When another client of the user is not associated with the smart TV 100, the process 2215 outputs a QR code with screen shot information in the screen shot content display layer 170, and the client scans the QR code on the smart TV 100 through a website that shares screen shots or a social media application (such as a chat tool) and then reduces the QR code into image information. The process is ended.

Figure 24A:
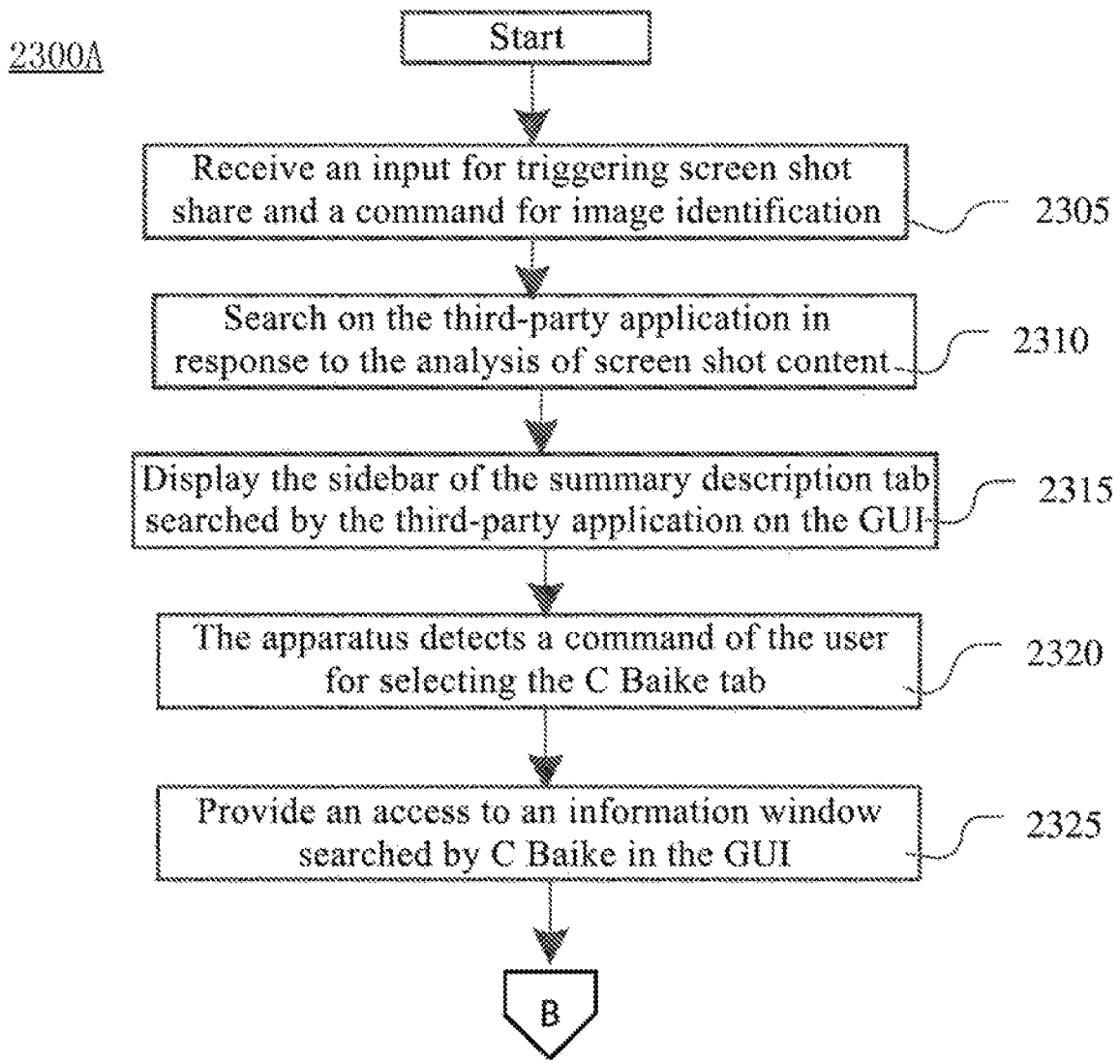
FIGS. 24A to 24B are flow diagrams of checking content in C Baike according to some embodiments.
Figure 24B:
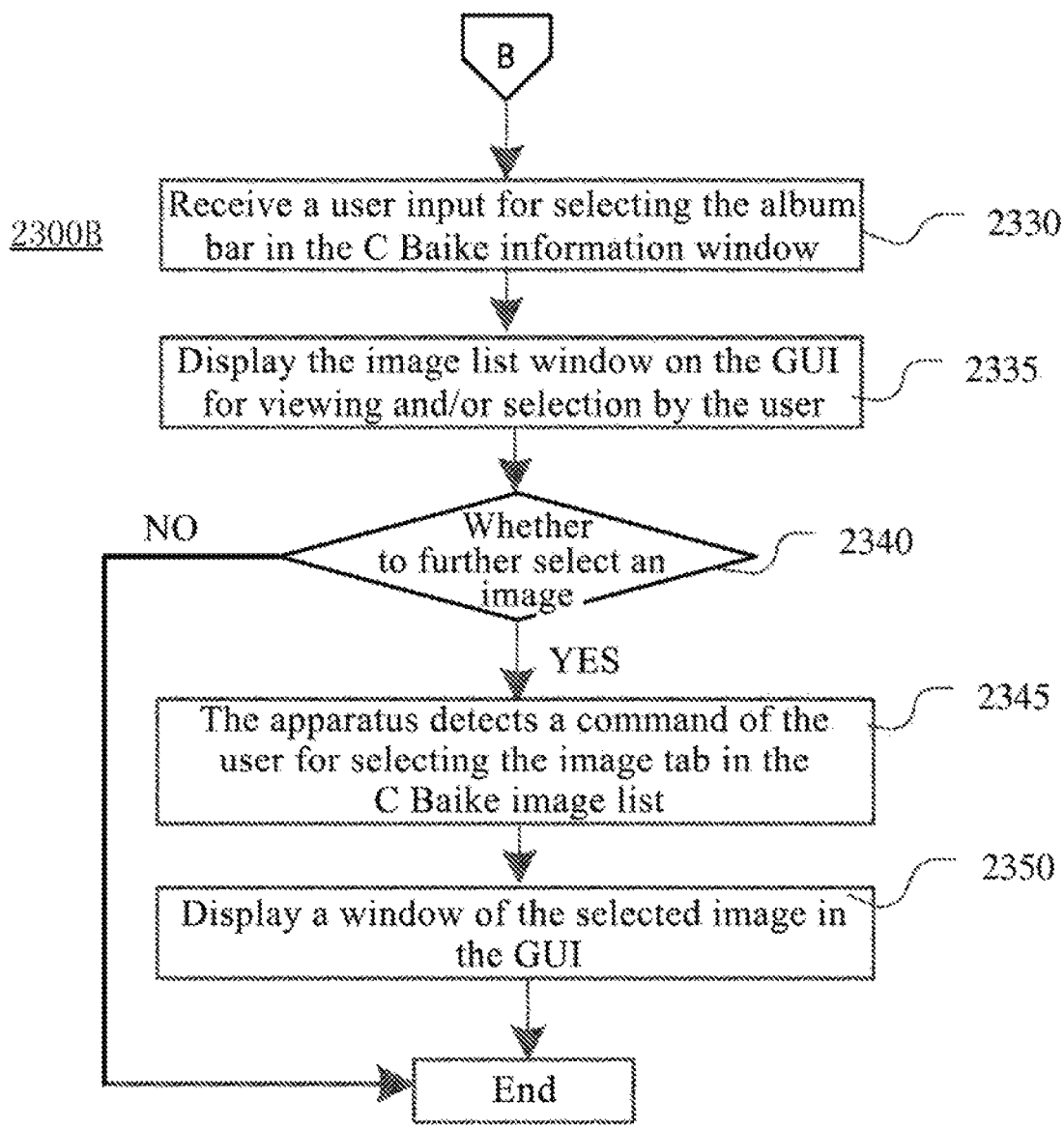

FIGS. 24A to 24B are flow diagrams of an exemplary process (2300A and 2300B) for selecting C Baike. As shown in the figure, the process 2300A begins by receiving (at 2305) an input for triggering screen shot sharing and a command for image identification. The application can receive the command via a user interaction such as a remote controller button, a gesture or a touch on the screen or the like.

The apparatus searches in the third-party application in response to (at 2310) analysis of a screen shot content or an identified image, and generates a GUI including display objects for displaying as search results (at 2315). The display object has an option bar available to the user and configured to provide accesses to different third-party applications. This option bar generally describes the search content of the third-party applications. The option bars presented in the sidebar form a list such that the user can browse and view the content in a sliding or waterfall manner.

In some examples, (at 2320) the apparatus detects that the user selects a webpage third-party application (such as C Baike, FIG. 15A), and then provides a new window (at 2325) in the sidebar of the GUI to provide an access to the information window for C Baike searching. The information window 203 is a side information window floating in the screen shot content display layer 170, and corresponds to any one or more of the album bar, the keyword bar and the entry detail bar. In some embodiments, in a case where content in C Baike is incomplete, any one or more of the album bar, the keyword bar and the entry detail bar may not be included. For example, no albums and keywords are displayed, and only the entry detail bar is displayed, or no associated word bar is displayed, and the album bar and the entry detail bar are displayed.

In the illustrated example, the user selects the focus frame of a description bar 2034, resulting in presentation of the GUI as shown in FIG. 15B. In some examples, the album bar 2032, the keyword bar 2033 and the Logo bar 2031 does not change their positions, and the content of the entry detail bar will all be spread, and then slide up with the selection of the user.

In the illustrated example, when the user selects the focus frame of the album bar 2032, the GUI of FIG. 15C is displayed. The process 2330 receives a user input for selecting the album bar in the C Baike information window, and then provides an image list window 204 (at 2335) in the sidebar of the GUI to provide an access to an image list found in C Baike. The image list window 204 is a side information window floating in the screen shot content display layer 170, includes thumbnails of at least three images, and can be slid to view images not shown below (for example, the GUI as shown in FIG. 15C).

In some examples, the user can view the thumbnails only in the image list window without further selecting the images. In some examples, the user can exit from the image list window 204 to the previous option bar or exit the screen shot content display layer 170 to browse the video content played in the currently-played content display layer 160 in full screen.

When a user wants to further select an image (at 2340), the apparatus detects (at 2345) a command of the user for selecting the image option bar in the image list window, and displays a selected image window 205 in the GUI. The image window 205 floats above the image list window 204, and displays a single image. If the image is displayed completely, it is viewed as a full-screen square, as described with reference to FIG. 15D.

Figure 25:
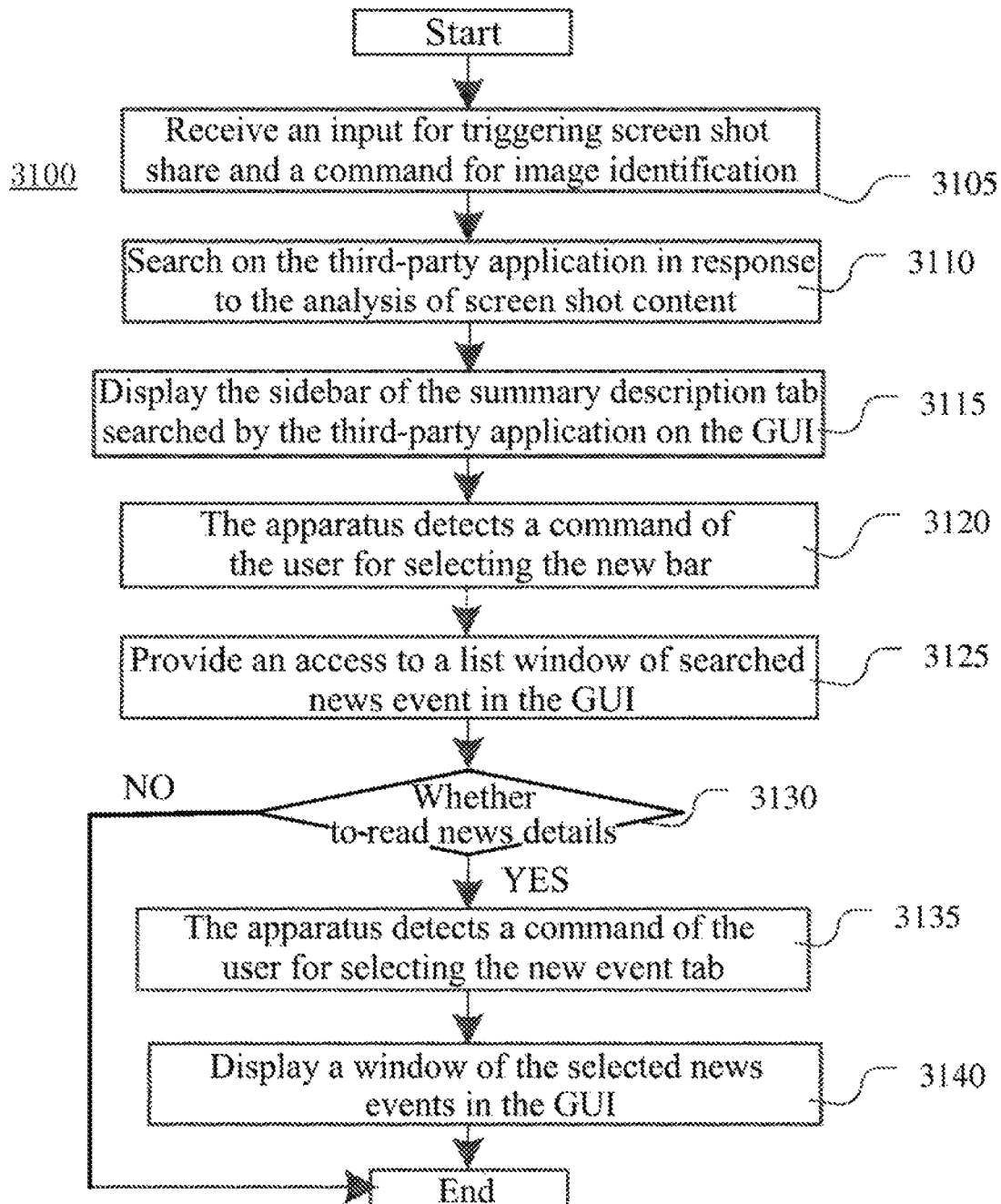
FIG. 25 describes a flow diagram of browsing a GUI under a news option bar according to the present disclosure.

FIG. 25 is a flow diagram of an exemplary process 3100 for selecting the news option bar. As shown in the figure, the process 3100 begins by receiving (at 3105) an input for triggering screen shot sharing and a command for image identification. The application can receive the command via a user interaction such as a remote controller button, a gesture or a touch on the screen or the like.

The apparatus searches in the third-party application in response to (at 3110) analysis of a screen shot content or an identified image, and generates a GUI including display objects for displaying as a search result (at 3115). The display object has an option bar available to the user and configured to provide accesses to different third-party applications. This option bar generally describes the search content of the third-party applications. The option bars presented in the sidebar form a list such that the user can browse and view the content in a sliding or waterfall or scrolling manner.

In some examples, (at 3120) the apparatus detects that the user selects a webpage third-party application (such as D News, FIG. 16A), and then provides a new window (at 3125) in the sidebar of the GUI to provide an access to the news event list window. The news event list window 301 is a side information window floating on the screen shot content display layer 170, and corresponds to a plurality of news event option bars. A news event option bar describes a news event, specifically including a date, a title (the title is set to include no more than five lines, portions beyond the five lines of the title are hidden, and " . . . " is used at the end of the fifth line to indicate that the title is hidden), and an image (you can select to display or not display an image during setting, and if you select to display an image, three images can be displayed in a thumbnail form at most).

In some examples, the user can only read headline news and/or introductions at the news event list window without further selecting to read news. In some examples, the user can exit from the news event list window 301 to the previous option bar or exit the screen shot content display layer 170 to browse the video content played in the currently-played content display layer 160 in full screen.

When the user wants to read details of a news event (at 3130), the apparatus detects (3135) a command of the user for selecting a command of the news event option bar in the news event list window, and displays a selected image window 302 in the GUI (at 3140). In the illustrated example, the user selects the focus frame corresponding to the first news event option bar, resulting in presentation of the GUI as shown in FIG. 16B. A news event window 302 is activated, and floats above the news event list window 301. News events described by the selected news event option bar 3021 are all spread, including the titles, post time, texts and images of all the news records, while the unselected news event option bar 3022 still only displays the title and part of the images. The not displayed parts can be viewed by scrolling the list.

Figure 26A:
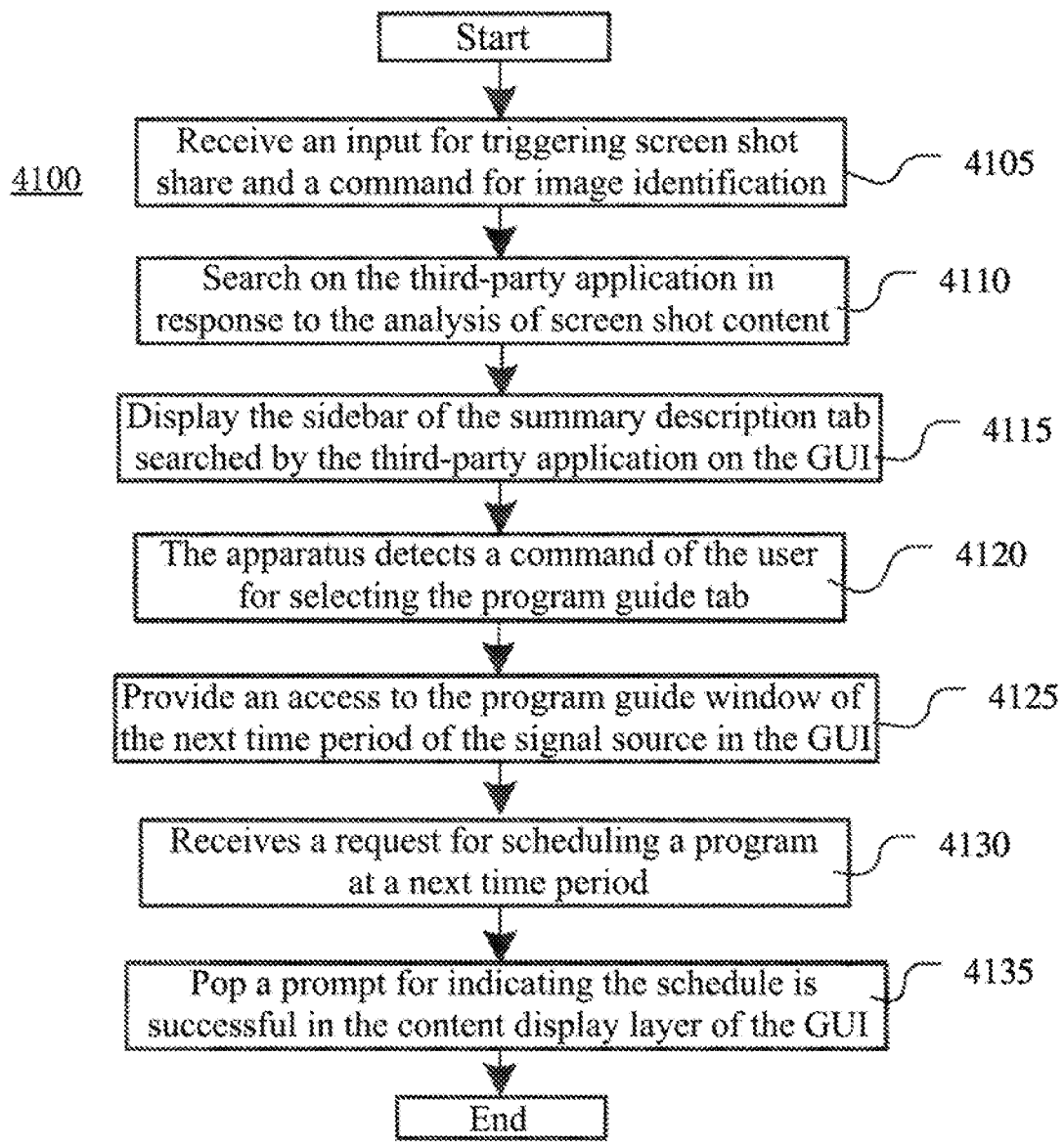
FIG. 26A describes a flow diagram of a program schedule process under a program guide according to the present disclosure.
Figure 26B:
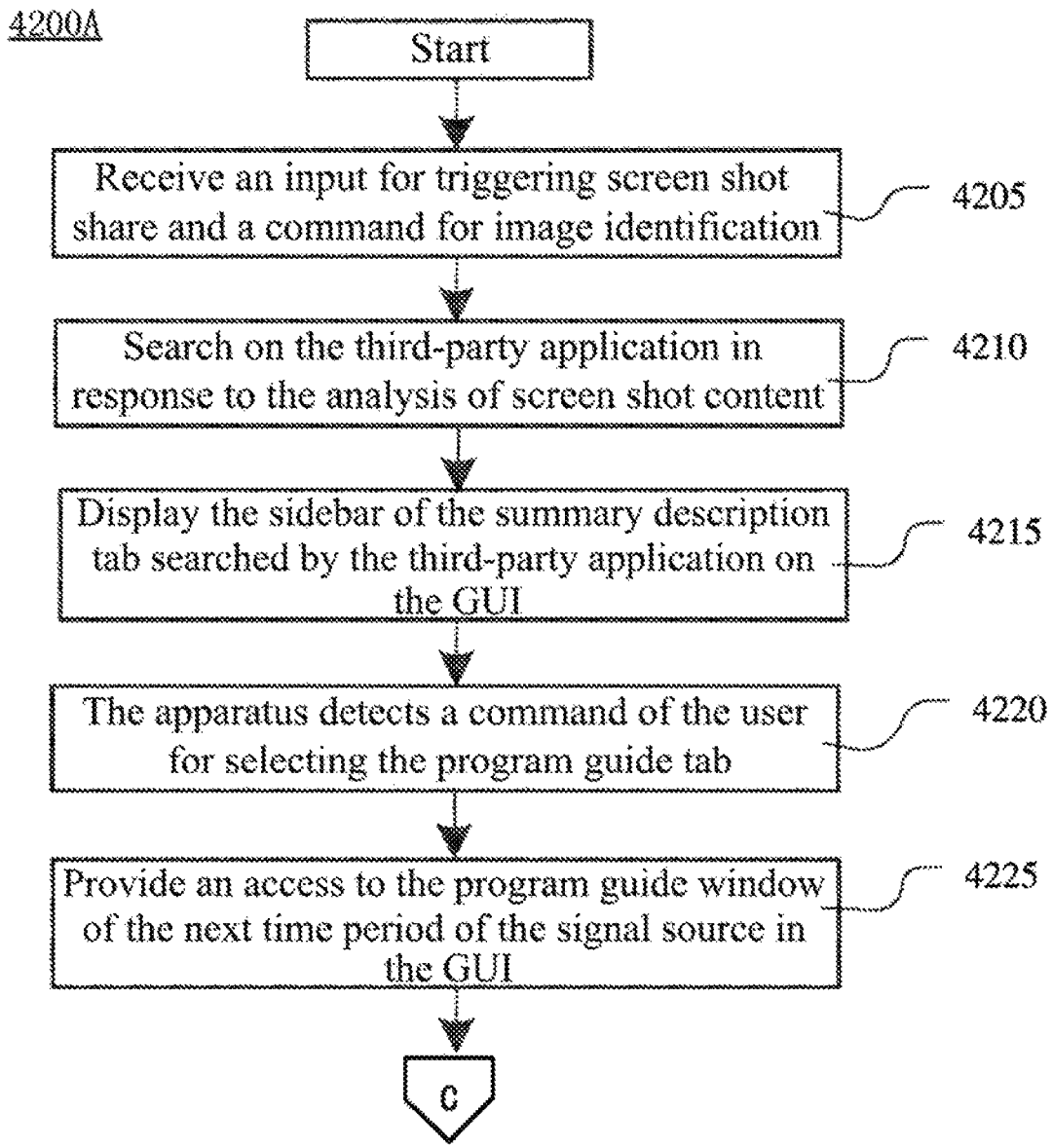
FIGS. 26B to 26C are flow diagrams of a process of playing updated programs under the program guide.
Figure 26C:
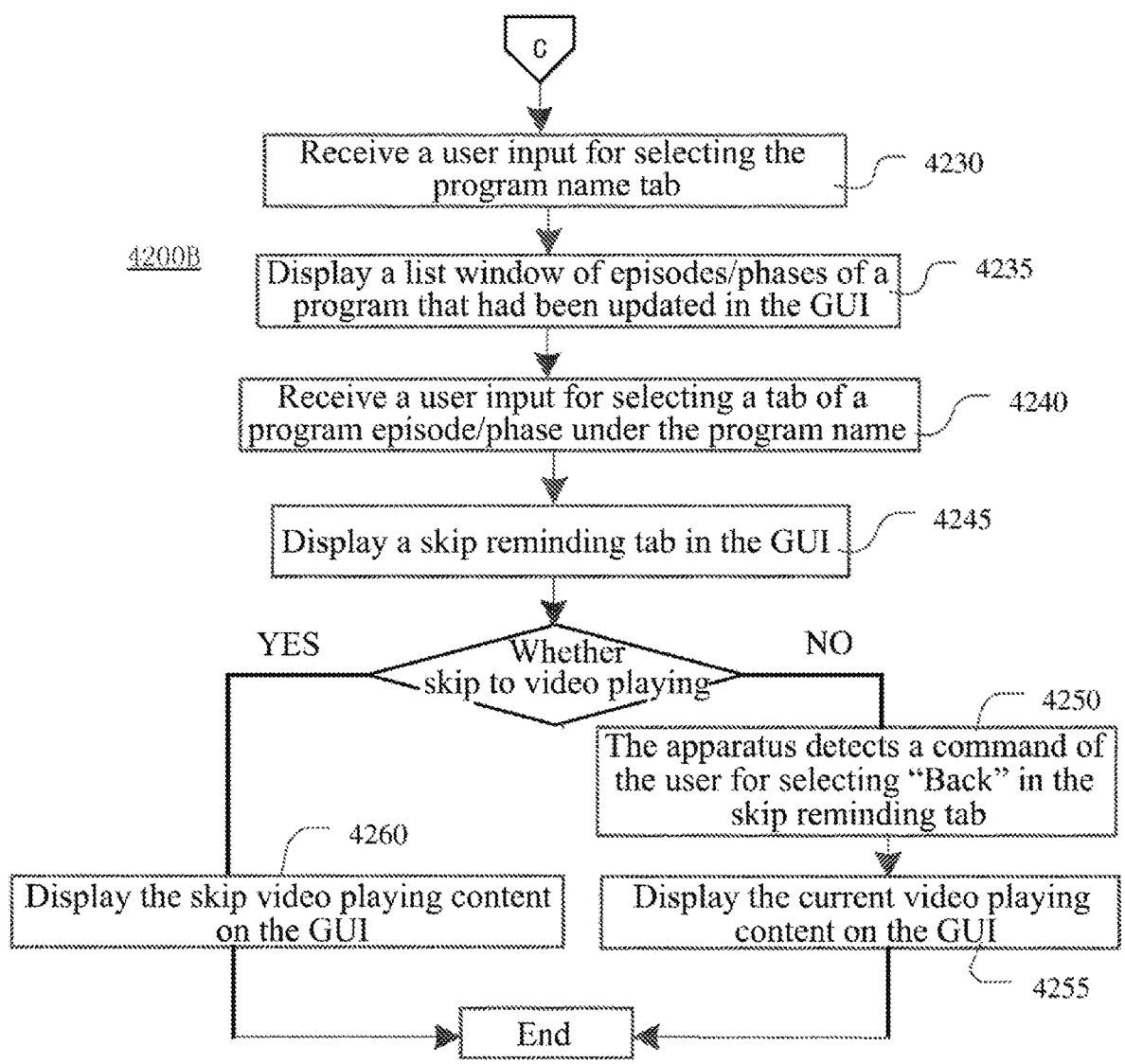

FIGS. 26A to 26C are flow diagrams of an exemplary process 4100 for selecting the program guide option bar. FIG. 26A describes a flow diagram of a program schedule process under a program guide according to the present disclosure. The process 4100 begins by receiving (at 4105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 4110) analysis result of a screen shot content or an identified image, and generates a GUI including a display object for displaying based on a search result (at 4115). The display object has at least one different available option bar for a user to access in the third-party application. These option bar include general descriptions with respect to the search content from the third-party application. The option bars presented in the sidebar form a list such that a user can browse and view the content in a sliding, scrolling or waterfall manner.

In some examples, (at 4120) the apparatus detects that the user selects a TV program third-party application, and then provides a new program guide window (at 4125) in the sidebar of the GUI, which provides an access to the program option bar. When the third-party application identifies that a video played in the currently-played content display layer 160 is from a satellite TV video channel, the TV station logo is analyzed, and then a program guide to be played in the satellite TV corresponding to the TV station logo is displayed, as shown in FIG. 16A. The program guide list window 401 is a side information window floating on the screen shot content display layer 170, and corresponds to a plurality of program option bars. Each of the program option bars includes an option bar for a program name and an option bar for schedule.

The apparatus receives (at 4130) a request for scheduling a program at a next time period, and then pops a prompt for indicating the schedule is successful in the content display layer of the GUI (as shown in FIG. 17B) (at 4135). In some examples, the user can select to exit from the program guide window 401 to the screen shot content display layer 170, or exit the from screen shot content display layer 170 such that the video content in the currently-played content display layer 160 is played in full screen.

In some examples, when a user wants to check a updated program series of a program name, the user selects the program name in the program option bar in the program guide window 401, the apparatus receives (at 4230) instructions associated with the selected program name option bar. Here, the third-party video application is activated to store video content that had been updated in the past. In the exemplary GUI as shown in FIG. 17C, a new program episode number list window 402 floats above the program guide list window 401 for displaying the episode number of the program that had been played in the past (at 4235). The two topmost marked option bars are video content for program preview.

When selecting a certain specific episode, the apparatus (at 4240) receives a user input for selecting a program episode option bar under the program name. The received user input can be a click on a remote controller button, a gesture or a touch on the screen. The currently-played content display layer 160 of a main display panel (at 4245) displays the skip reminder 1602 "skip after 5 seconds" and then skips to play a program selected by another silo (and the third-party video application), and the video content of a selected past program is displayed (at 4260) in the GUI.

In some embodiments, the apparatus detects (at 4250) a user command, which is selecting "Back" in the skip reminder bar, and then the GUI (at 4255) exits from the screen shot content display layer 170 and continues to play the program of the current silo, as described with reference to FIG. 17D.

Figure 27:
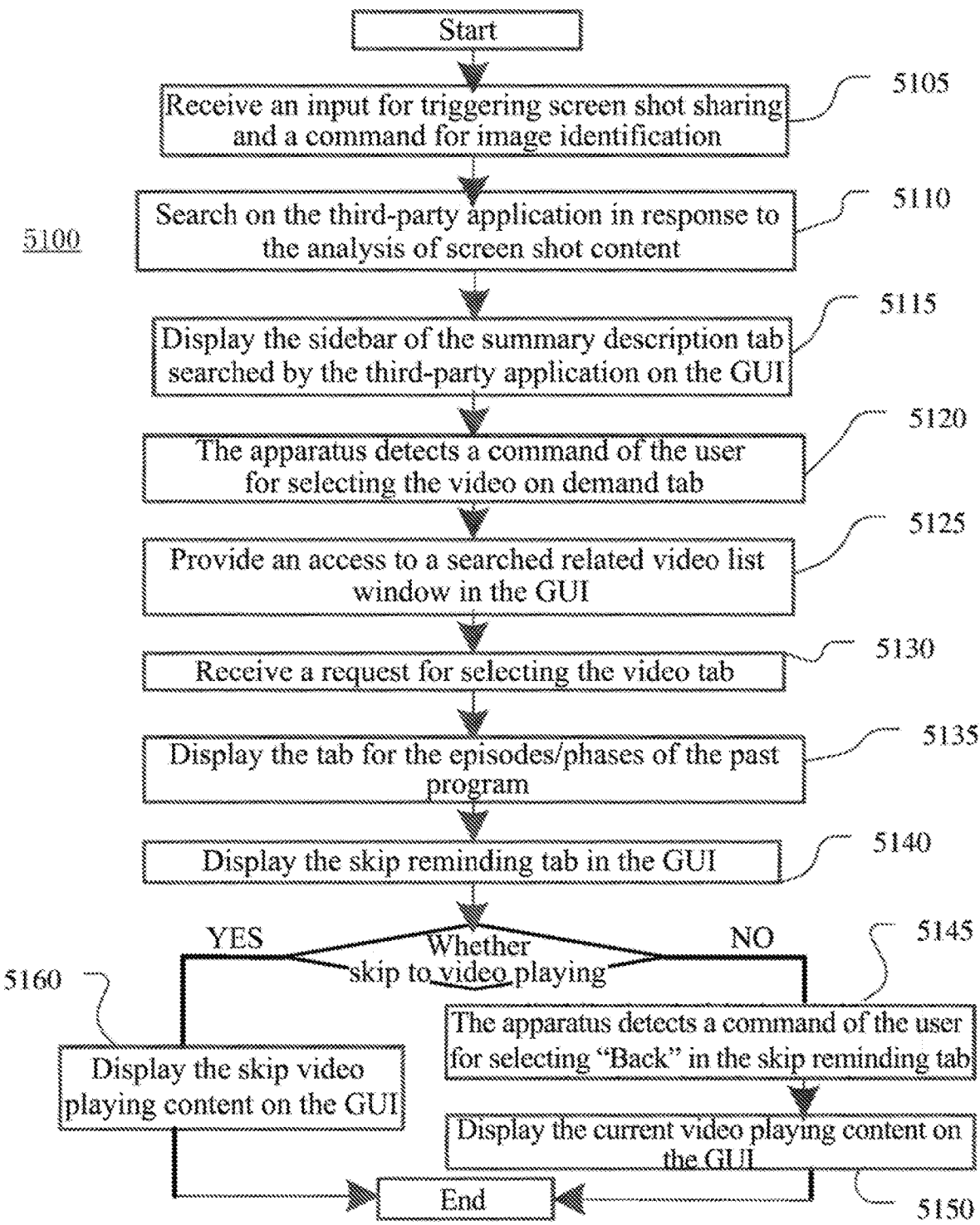
FIG. 27 is an exemplary process flow diagram of selecting video on demand under a video playing application.

FIG. 27 is a flow diagram of an exemplary process for selecting video on demand in a video playing application. As shown in FIG. 27, the process 5100 is to receive (5105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 5110) analysis result of a screen shot content or an identified image, and generates a GUI including a display object for displaying based on a search result (at 5115). The display object has one or more different available option bars for the user to access to the third-party application. The option bars includes general descriptions with respect to the search content of the third-party application. The option bars presented in the sidebar form a list such that the user can browse and view the content in a sliding or waterfall manner.

In some examples, when the apparatus detects (at 5120) that the user selects a video third-party application (a video application built in the smart TV, such as Juhaokan; or skipping to another video play application, such as iQiyi and PPTV, FIG. 18), a new window (such as a video option bar list window, at 5125) is provided in the sidebar of the GUI to provide an access to the searched related video list window. The video option bar list window 501 is a side information window floating on the screen shot content display layer 170, and includes a rating score, a movie poster and a movie name. Under this option bar, the video on demand silo is activated, and the video option bar list window 501 is displayed as a plurality of video option bars that are highly related to such videos, or the video option bar list window 501 is displayed as a certain type of videos which the user is more interested among currently-provided media content (such as: war movies, murder suspense films, musicals and comedies that are favored by the user). The video option bar list window 501 is a scrolling video option bar list (after the last related content is displayed, the user can skip to the first related content without going back to the first display content in order) or a sliding video option bar list.

Figure 17D:
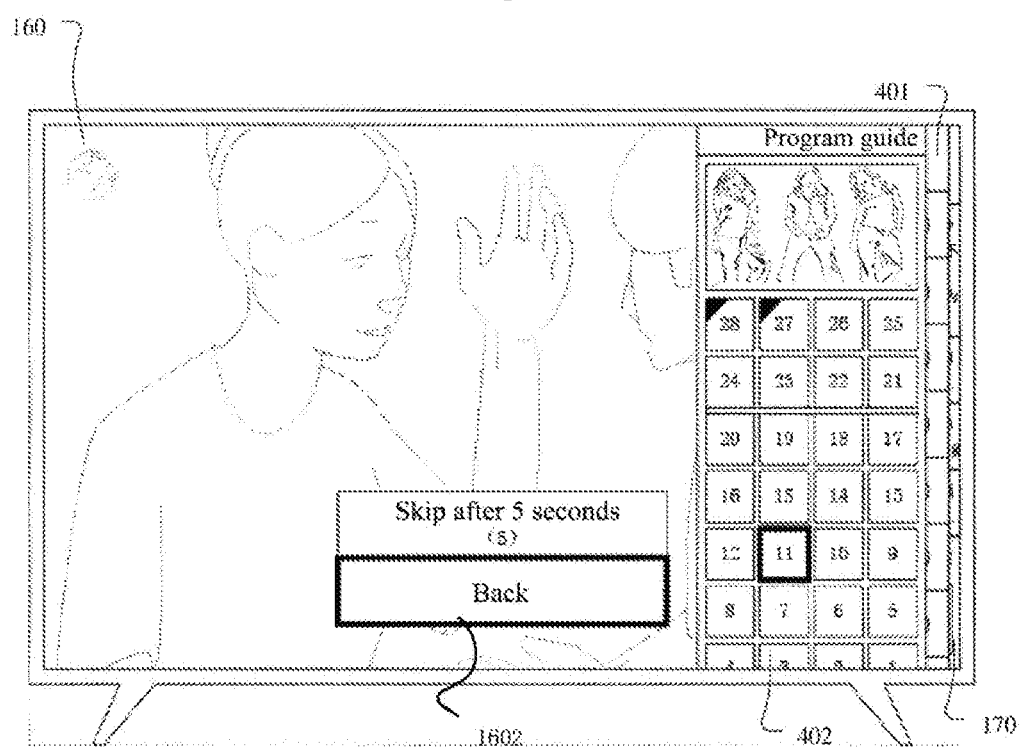
FIG. 17D illustrates an example GUI for selecting a previous program for playing.

In the illustrated example, when the apparatus receives a request for selecting a focus frame of the video option bar (at 5130), the GUI similar to that of FIG. 17D is displayed. When a certain specific episode is selected (at 5135), the apparatus receives a user input for selecting a program episode option bar under the program name. The received user input can be a click on a remote controller button, a gesture or a touch on the screen. The currently-played content display layer 160 of a main display panel (at 5140) displays a skip reminder bar 1602 "skip after 5 seconds" and then skips to play a program from another silo (and the third-party video application), and the video content of a selected past program is displayed (at 5160) in the GUI.

In some embodiments, the apparatus detects (at 5145) a user command, which is selecting "Back" in the skip reminder option bar, and then the GUI (at 5150) exits from the screen shot content display layer 170 and continues to play the program of the current silo. In some examples, the user can exit from the video option bar list window 501 to the previous option bar or exit the screen shot content display layer 170 to browse the video content currently played in the currently-played content display layer 160 in full screen.

Figure 28A:
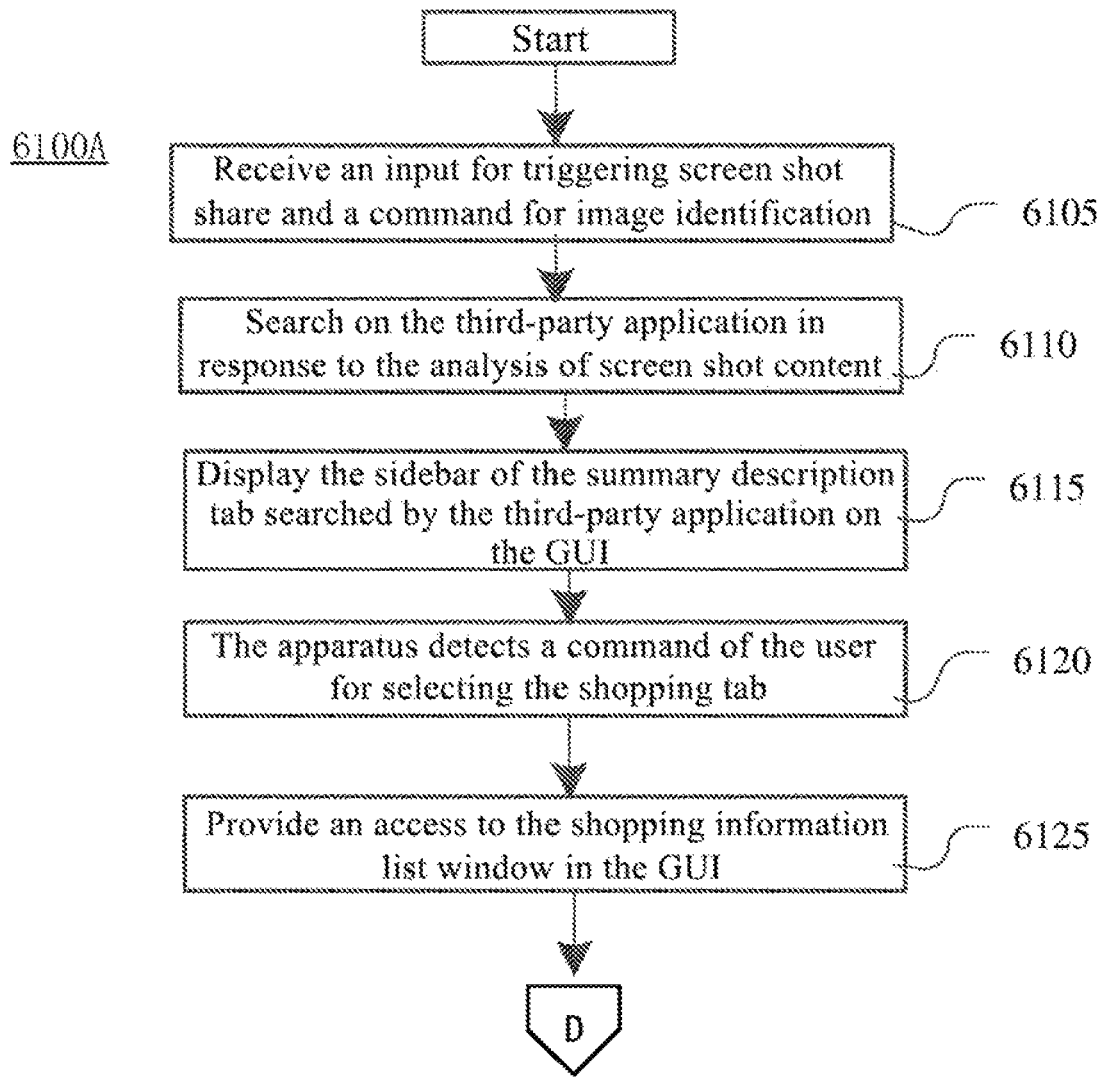
FIGS. 28A to 28B describe a flow diagram of browsing a GUI under a shopping option bar according to the present disclosure.

FIG. 28A is a flow diagram of an exemplary process 6100A for selecting a shopping third-party application. As shown in FIG. 28, the process 6100A is to receive (at 6105) an input for triggering screen shot sharing and a command for image identification. The application can receive the command via a set of user interactions such as pressing a remote controller button, a gesture or a touch on the screen or through certain transformations.

The apparatus searches on a third-party application in response to (at 6110) analysis result of a screen shot content or an identified image, and generates a GUI including a display object for displaying based on a search result (at 6115). The display object has one or more different available option bar for the user to access to the third-party application. The option bars include general descriptions with respect to the search content of the third-party application. The option bars presented in the sidebar form a list such that the user can browse and view the content in a sliding or waterfall manner.

Figure 28B:
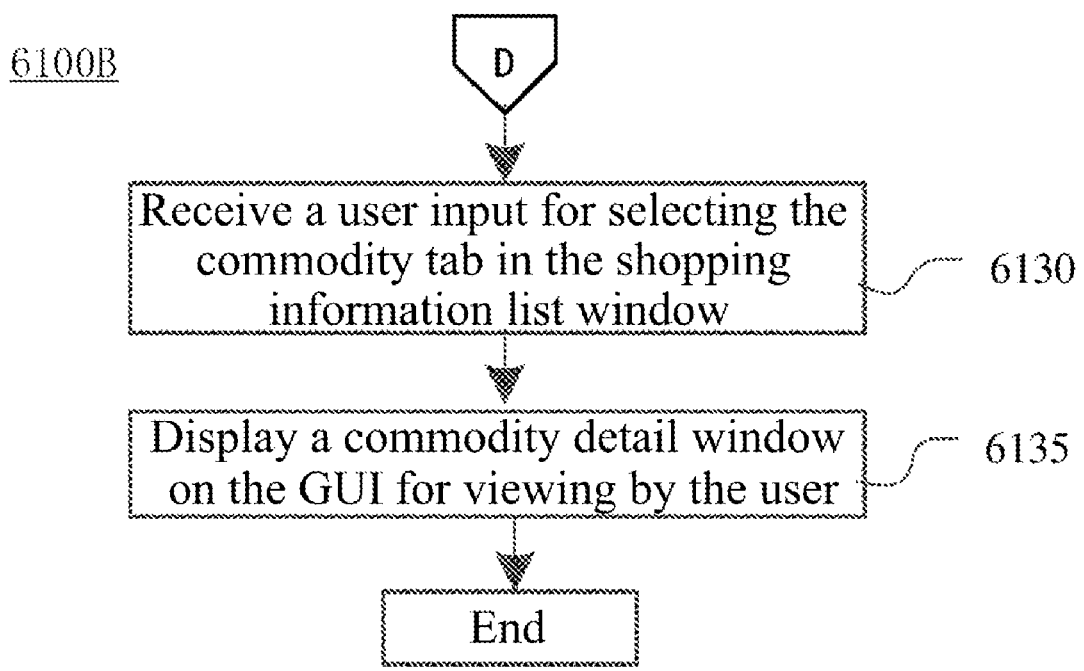

In some examples, as shown in FIG. 28B (6100B), when the apparatus detects (at 6120) that the user selects a shopping third-party application (a shopping application built in the smart TV, such as Juxianggou; or skipping to another shopping application, FIG. 19), a new window (such as a shopping information list window, at 6125) is provided in the sidebar of the GUI to provide an access to the searched related commodity list window. The shopping information list window 601 is a side information window floating on the screen shot content display layer 170, and corresponds to a commodity introduction option bar 6011 (displaying of specific content depends on specific cooperation), a "Scan QR code" option bar 6012 and a shopping application skip option bar 6013. Under this option bar, the shopping application is activated, and the shopping information list window 601 is a scrolling option bar list (after the last related content is displayed, the user can skip to the first related content without going back to the first display content in order) or a sliding video option bar list.

In some examples, when the user selects a commodity option bar, the apparatus receives (at 6130) a user input for selecting the commodity option bar in the shopping information list window, and the commodity option bar is spread, and the shopping option bar list window 601 in the GUI specifically display (at 6135) associated commodity details (including dimensions, sizes, colors and specifications).

Figure 28C:
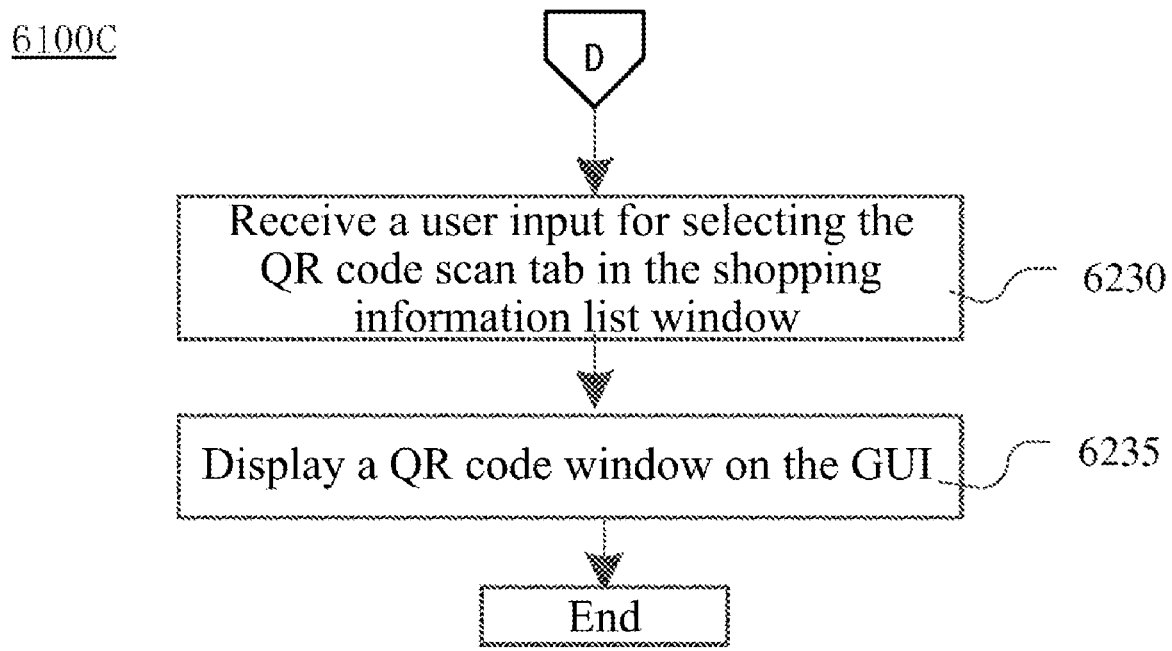
FIG. 28C describes a flow diagram of acquiring a GUI of shopping information at a client according to the present disclosure.

FIG. 28C describes a flow diagram (6100C) of acquiring a GUI of shopping information at a client according to the present disclosure. In some examples, the apparatus detects (at 6230) that the user selects the "Scan QR code" option bar, a QR code window is displayed (at 6235) on the GUI. A QR code is magnified to the entire shopping option bar list window 601 and presented as a square. The QR code on the smart TV 100 is scanned by a client, and more commodity information is obtained from the client.

Figure 28D:
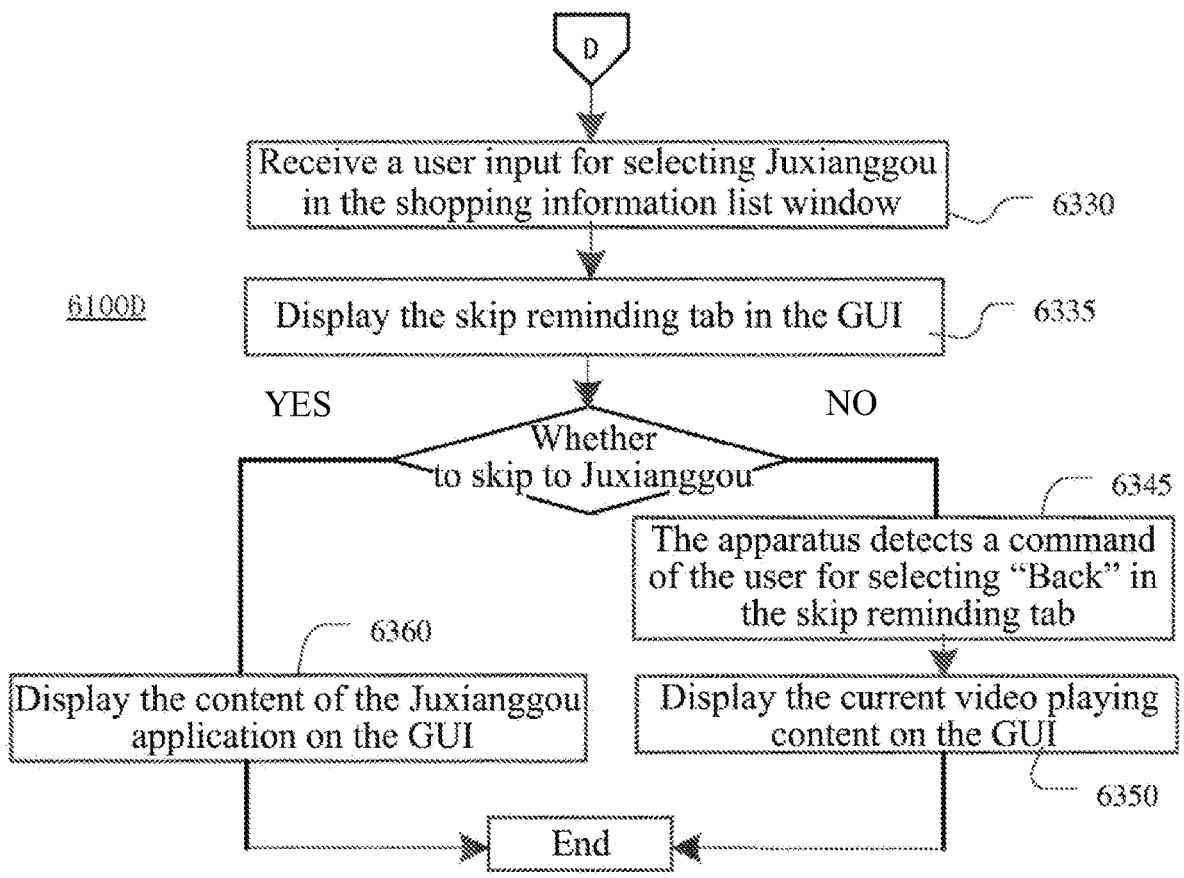
FIG. 28D is an exemplary flow diagram of entering a system-provided shopping application.

FIG. 28D is an exemplary flow diagram (6100D) of entering a built-in shopping application. In some examples, the apparatus receives (at 6330) a user input for selecting a shopping application Juxianggou in the shopping information list window. When the user selects the skip option bar 6013, the system shopping application (such as Juxianggou) is in a to-be-activated state, and the skip reminder option bar 1603 is displayed (at 6335) at the bottom of the currently-played content display layer 160 of the GUI, including a skip prompt (such as skip after 5 seconds) and a back prompt. The system shopping application is activated and skipped to a TV shopping page. Juxianggou application content is displayed on the GUI, so as to facilitate shopping on TV, as described with reference to FIG. 19B (at 6360).

In some embodiments, the apparatus detects (at 6345) a user command, which is selecting "Back" in the skip reminder option bar, and then the GUI (at 6350) exits from the screen shot content display layer 170 and continues to play the program of the current silo. In some examples, the user can exit from the video option bar list window 501 to the previous option bar or exit the screen shot content display layer 170 to browse the video content currently played in the currently-played content display layer 160 in full screen.

The exemplary systems and methods of the present disclosure have been described with reference to an entertainment system. However, in order to avoid any unnecessary ambiguity with respect to the present disclosure, the foregoing description omits some known structures and devices. Such omissions shall not to be construed as limiting the scope of the claims. Specific details are particularly provided to facilitate understanding of the present disclosure. However, it should be understood that the present disclosure may be implemented in a variety of ways beyond the specific details described in the present disclosure.

Moreover, the exemplary aspects, examples, and/or configurations illustrated in the present disclosure show that various components of the system are arranged together, but some system components can be located at a remote end of a distributed network (such as an LAN and/or the Internet), or located in a dedicated system. Therefore, it should be understood that the components of the system may be combined into one or more devices, such as a set top box or a television, or other devices arranged on a particular node side by side of a distributed network (such as an analog and/or digital telecommunications network, a packet switched network, or a circuit switched network). In accordance with the above description and for the reason of computational efficiency, the components of the system may be located anywhere within the distributed component network without affecting the operation of the system. For example, different components may be located in switchboards (such as a PBX, a media server and a gateway), one or more communication devices, one or more user sites, or some combinations of the above. Similarly, one or more functional portions of the system may be distributed between a telecommunication device and an associated computing device.

Moreover, it should be understood that the various connections between these elements may be wired or wireless, or any combinations thereof, or any other known or later developed elements that are capable of providing data and/or communicating data with the connected elements. These wired or wireless connections may also be secure connections that may transmit encrypted information. A transmission medium for connection may be, for example, any suitable electronic signal carrier, including a coaxial cable, a copper wire and an optical fiber, and may be an acoustic wave or a light wave such as an acoustic wave or a light wave generated during radio wave and infrared data transmission.

In addition, although some flow diagrams have been discussed and illustrated in a particular order, it should be understood that such order may be changed, adding some steps and omitting some steps without substantially affecting the disclosed examples, configurations and aspects of operations.

A series of changes and modifications to the present disclosure may be obtained. It is possible to provide only certain features of the present disclosure without providing other features.

In another embodiment, the system and method of the disclosure can be implemented in combination of a special-purpose computer, a programmed microprocessor or microcontroller and peripheral integrated circuit component, ASIC or other integrated circuit, a digital signal processor, a hard-wired electronic circuit or logic circuit (e.g., a discrete component circuit), a programmable logic apparatus or gate array (e.g., PLD, PLA, FPGA, PAL), any comparable tools and etc. In general, any apparatus or tools which can implement the method of the disclosure can be used for implementing every aspect of the disclosure. The exemplary hardware applicable to disclosed embodiments, configuration and methods include a computer, a handheld device, a phone (e.g., a mobile phone, a phone enabling the Internet, a digital phone, an analogue phone, a mixture thereof and others), and other known hardware in the art. Some of these devices include a processor (e.g., one or more microprocessors), a memory, a nonvolatile storage, an input device, an output device and etc. moreover, other software execution processes can be applicable to implement the methods of the disclosure. These execution processes include but not limited to a distribution process or a distribution process for components/objects, a parallel process or a virtual machine process.

In another embodiment, the methods of the disclosure can be easily implemented in combination of softwares developed in the object-used or object-oriented software environment which can provide convenient source codes applicable to various computer or platforms of work stations. Alternatively, the system of the disclosure can be implemented partially or completely in the hardware using the standard logic circuit or VLSI device. Whether a software or hardware is used for implementing the system of the disclosure, depends on a system requirement of speed and/or efficiency, a specific-purpose function and special software/hardware, or a currently-used microprocessor/micro-computer system.

In another embodiment, the methods of the disclosure can be implemented partially in software which can be stored in a storage medium, and can be executed in a programmed general-purpose computer configured with controller and storage device, a specific-purpose computer and a microprocessor. In these examples, the system and methods of the disclosure can be implemented as a program embed in a personal computer (e.g., an applet or CGI script), resources stored in a server or a computer work station, a routine program embed in a specific-purpose measurement system and system components. Moreover, the system and methods of the disclosure can be further implemented through physically integrating the system and methods of the disclosure into a software and/or hardware system.

Although components and functions in some aspects, embodiments and/or configuration are described according to some specific standards and protocols, the aspects, embodiments and/or configuration are not limited to the standards and protocols. Other standards and protocols not mentioned in the disclosure deemed to be included in the disclosure. Moreover, the standards and protocols mentioned and not mentioned in the disclosure are substituted with the latest and more effective equivalents having substantially same functions. The equivalents having substantially same functions and substituting the standards and protocols deemed to be included in the disclosure.

This disclosure includes details of described components, methods, processes, system and/or apparatus in various aspects, examples and/or configurations, includes various aspects, embodiments, configuration examples, subgroups and/or subsets thereof. A person skilled in the art can know how to produce and use disclosed aspects, embodiments and/or configurations after understanding the disclosure. The disclosure can provide apparatuses and processes to improve performance, achieve convenience and/or reduce implementation cost and etc. in a case of lacking items described and/or introduced in various aspects, examples and/or configurations, or in a case of lacking items used in prior apparatuses or processes.

The above discussion is for introduction and description, and does not intend to limit the disclosure to one or more disclosed forms. In aforementioned description details, for example, every features in the disclosure are divided into one or more aspects, examples and/or configurations so that the structure of the disclosure is much more clear. The features of aspects, examples and/or configurations in this disclosure can be combined in other aspects, examples/configurations than aforementioned parts. The disclosed methods should not be explained to be a purpose, that is, each of the claims needs more features than features explicitly listed in each claim. In contrast, inventive aspects claimed in following claims exist in all features of aforementioned single aspect, example and/or configuration. Therefore, following claims are included in the description details in aforementioned manner, and each of the claims independently exists as a single embodiment of the disclosure.

Furthermore, although the description above includes one or more aspects, examples and/or configurations, as well as certain variations and modifications, other variations, combinations and modifications are still within the scope of the present disclosure as if they are within the skill and knowledge scope of persons skilled in the art after the skilled understand the present disclosure. Applicants intend to cover an allowable scope including substitutive aspects, examples and/or configurations. Those aspects, examples and/or configurations in the claims include substitutive, interchangeable and/or equivalent structures, functions, scopes or steps, whether or not these substitutive, interchangeable and/or equivalent structures, functions, scopes or steps have been disclosed in the present disclosure and applicant has no intention to dedicate any patentable subject matter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A smart television, comprising:
   a screen;
   a memory configured to store computer instructions;
   a processor in communication with the memory and the screen, and configured to execute the computer instructions to cause the smart television to:
   while the screen is displaying a video, in response to an instruction input for screen shot, display a graphical user interface on the screen, wherein the graphical user interface comprises a currently-played content display layer for continuing displaying the video, and a screen shot content display layer presented in an expandable manner comprising a screen shot display bar for displaying screen shot images acquired from current screen shot, a first keyword bar for indicating a name of a first object recognized in a screen shot image, a screen shot share bar, and a QR code information display bar for displaying QR code information generated based on the screen shot image, the screen shot display bar is configured to display thumbnails of screen shot images, the thumbnails are unfolded so that the screen shot images are available for selection;
   update presentation of the screen shot content display layer in response to a first screen shot image being selected from the screen shot images via a remote control, the updating comprising: updating a recognized object associated with the first screen shot image, a name of the recognized object, a screen shot share bar corresponding to the first screen shot image and a QR code information display bar corresponding to the first screen shot image, a first option bar for activating a webpage application associating with the recognized object in the first screen shot image;
   in response to a selection on the screen shot share bar corresponding to the first screen shot image via the remote control, display QR code information of the first screen shot image in the QR code information display bar, so that a smart terminal in communication with the smart television acquires the first screen shot image by scanning the QR code information, wherein the QR code information contains URL information corresponding to the first screen shot image;
   in response to a selection on the first option bar for activating the webpage application associating with the recognized object, provides a first information window in a sidebar of the graphical user interface to provide an access to the first information window for the webpage application, wherein the first information window for the webpage application comprises an album bar, and the album bar is available for selection via a focus frame;
   in response to the focus frame of the album bar being selected via the remote control, provide a second information window in the sidebar of the graphical user interface to provide an access to an image list found in the webpage application.

2. The smart television according to claim 1, wherein the screen shot share bar is configured to share one or more screen shot images with the smart terminal in communication with the smart television.

3. The smart television according to claim 1, wherein the QR code information of the first screen shot image and the first screen shot image are uploaded to a third party server together.

4. The smart television according to claim 2, wherein the processor is further configured to execute the computer instructions to cause the smart television to:
   transmit the first screen shot image to the smart terminal according to a transmission protocol between the smart terminal and the smart television in response to a selection on the screen shot share bar.

5. The smart television according to claim 1, wherein the processor is further configured to execute the computer instructions to cause the smart television to:
   present recommended content associated with the first object on the graphical user interface, the recommended content comprises content matched with the first object, a profile of the recommended content and/or a resource or type of the recommended content.

6. The smart television according to claim 1, wherein the processor is further configured to execute the computer instructions to cause the smart television to:
   present a plurality of option bars available for selection on the graphical user interface, and in response to a selection on a second option bar among the option bars, activating a service or an application associated with the second option bar.

7. The smart television according to claim 6, wherein the option bars comprise a content option bar, the content option bar comprises an application navigation bar configured to present an application icon or an application name, and a display bar configured to display a content region recommended by the application.

8. The smart television according to claim 7, wherein the application is any one of a webpage application, a video application, a TV program application and a shopping application.

9. A method for displaying a graphical user interface of a smart television, comprising:
   while a screen of the smart television is displaying a video, in response to an instruction input for screen shot, displaying a graphical user interface on the screen, wherein the graphical user interface comprises a currently-played content display layer for continuing displaying the video, and a screen shot content display layer presented in expandable manner comprising a screen shot display bar for displaying screen shot images acquired from current screen shot, a first keyword bar for indicating a name of a first object recognized in a screen shot image, a screen shot share bar, and a QR code information display bar for displaying QR code information generated based on the screen shot image, the screen shot display bar is configured to display thumbnails of screen shot images, the thumbnails are unfolded so that the screen shot images are available for selection;
   updating presentation of the screen shot content display layer in response to a first screen shot image being selected from the screen shot images via a remote control, the updating comprising: updating a recognized object associated with the first screen shot image, a name of the recognized object, a screen shot share bar corresponding to the first screen shot image and a QR code information display bar corresponding to the first screen shot image, a first option bar for activating a webpage application associating with the recognized object in the first screen shot image;

in response to a selection on the screen shot share bar corresponding to the first screen shot image via the remote control, displaying QR code information of the first screen shot image in the QR code information display bar, so that a smart terminal in communication with the smart television acquires the first screen shot image by scanning the QR code information, wherein the QR code information contains URL information corresponding to the first screen shot image;

in response to a selection on the first option bar for activating the webpage application associating with the recognized object, provides a first information window in a sidebar of the graphical user interface to provide an access to the first information window for the webpage application, wherein the first information window for the webpage application comprises an album bar, and the album bar is available for selection via a focus frame;

in response to the focus frame of the album bar being selected via the remote control, provide a second information window in the sidebar of the graphical user interface to provide an access to an image list found in the webpage application.

10. The method according to claim 9, wherein the screen shot share bar is configured to share one or more screen shot images with the smart terminal in communication with the smart television.

11. The method according to claim 9, wherein the QR code information of the first screen shot image and the first screen shot image are uploaded to a third party server together.

12. The method according to claim 10, further comprising:

transmitting the screen shot image to the smart terminal according to a transmission protocol between the smart terminal and the smart television in response to a selection on the screen shot share bar.

13. The method according to claim 9, further comprising:
presenting recommended content associated with the first object on the graphical user interface, the recommended content comprises a content matched with the first object, a profile of the recommended content and/or a resource or type of the recommended content.

14. The method according to claim 9, further comprising:
presenting a plurality of option bars available for selection on the graphical user interface, and in response to a selection on a second option bar among the option bars, activating a service or an application associated with the second option bar.

15. The method according to claim 14, wherein the option bars comprise a content option bar, the content option bar comprises an application navigation bar configured to present an application icon or an application name, and a display bar configured to display a content region recommended by the application.

16. The method according to claim 15, wherein the application is any one of a webpage application, a video application, a TV program application and a shopping application.

* * * * *